United States Patent
Shinozaki et al.

(10) Patent No.: US 10,472,885 B2
(45) Date of Patent: Nov. 12, 2019

(54) DAYLIGHTING MEMBER, METHOD OF MANUFACTURING DAYLIGHTING MEMBER, DAYLIGHTING DEVICE, AND DAYLIGHTING DEVICE INSTALLATION METHOD

(71) Applicant: Sharp Kabushiki Kaisha, Sakai, Osaka (JP)

(72) Inventors: Daisuke Shinozaki, Sakai (JP); Tsuyoshi Kamada, Sakai (JP); Shun Ueki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/317,134

(22) PCT Filed: Jun. 15, 2015

(86) PCT No.: PCT/JP2015/067165
§ 371 (c)(1),
(2) Date: Dec. 8, 2016

(87) PCT Pub. No.: WO2015/194499
PCT Pub. Date: Dec. 23, 2015

(65) Prior Publication Data
US 2017/0114590 A1    Apr. 27, 2017

(30) Foreign Application Priority Data
Jun. 16, 2014    (JP) .................................. 2014-123749

(51) Int. Cl.
*E06B 9/24*    (2006.01)
*B29D 11/00*    (2006.01)
(Continued)

(52) U.S. Cl.
CPC .......... *E06B 9/24* (2013.01); *B29D 11/00788* (2013.01); *E06B 3/6715* (2013.01);
(Continued)

(58) Field of Classification Search
CPC ...................................................... F21S 11/007
See application file for complete search history.

(56) References Cited

U.S. PATENT DOCUMENTS 1,943,995 A * 1/1934 Weld ........................ C03B 13/12
359/455
4,673,609 A * 6/1987 Hill .................... B32B 17/10247
219/203
(Continued)

FOREIGN PATENT DOCUMENTS

JP    60-83727 U    6/1985
JP    08-248210 A    9/1996
(Continued)

OTHER PUBLICATIONS

Official Communication issued in International Patent Application No. PCT/JP2015/067165, dated Aug. 25, 2015.

*Primary Examiner* — Christopher E Mahoney
(74) *Attorney, Agent, or Firm* — Keating & Bennett, LLP

(57) ABSTRACT

A daylighting film (1) according to an aspect of the present invention includes a first base (2) that has optical transparency, multiple daylighting units (3) which are formed on at least a first surface (2a) of the first base (2) and each of which has the optical transparency, an opening space (9) which is provided between each of the multiple daylighting units (3), and a mark (5) which is provided on at least any one of the first surface (2a) side of the first base (2) and the second surface (2b) side that is opposite in direction to the first surface (2a), and which indicates information relating a daylighting film (1).

15 Claims, 48 Drawing Sheets

(51) Int. Cl.
  *F21S 11/00* (2006.01)
  *G02B 5/00* (2006.01)
  *G02B 5/02* (2006.01)
  *E06B 3/67* (2006.01)
  *E06B 9/28* (2006.01)
  *E06B 9/42* (2006.01)

(52) U.S. Cl.
  CPC ............... *E06B 9/28* (2013.01); *E06B 9/42* (2013.01); *F21S 11/007* (2013.01); *G02B 5/00* (2013.01); *G02B 5/02* (2013.01); *E06B 2009/2405* (2013.01); *E06B 2009/2417* (2013.01)

(56) References Cited

U.S. PATENT DOCUMENTS

| | | | | |
|---|---|---|---|---|
| 2003/0211337 | A1* | 11/2003 | Muraoka | B32B 7/12 |
| | | | | 428/432 |
| 2008/0030859 | A1 | 2/2008 | Usami | |
| 2011/0216414 | A1 | 9/2011 | Suzuki et al. | |
| 2012/0019936 | A1* | 1/2012 | Blessing | B29D 11/00278 |
| | | | | 359/742 |
| 2014/0133030 | A1* | 5/2014 | Gardiner | G02B 5/045 |
| | | | | 359/592 |
| 2015/0042935 | A1 | 2/2015 | Yamamoto et al. | |
| 2015/0219830 | A1* | 8/2015 | Nohara | F21V 33/006 |
| | | | | 362/607 |
| 2015/0285454 | A1* | 10/2015 | Aizenberg | E06B 9/24 |
| | | | | 359/226.3 |
| 2016/0273724 | A1* | 9/2016 | Sakuragi | E06B 3/66 |
| 2017/0130920 | A1* | 5/2017 | Tsujimoto | F21S 11/007 |

FOREIGN PATENT DOCUMENTS

| | | |
|---|---|---|
| JP | 2000-312983 A | 11/2000 |
| JP | 2008-040025 A | 2/2008 |
| JP | 2011-203716 A | 10/2011 |
| JP | 2013-155569 A | 8/2013 |
| JP | 2013-225008 A | 10/2013 |
| JP | 2013-228528 A | 11/2013 |
| JP | 2014-056098 A | 3/2014 |
| JP | 2014-089374 A | 5/2014 |
| JP | 2014-089376 A | 5/2014 |
| WO | 2013/146353 A1 | 10/2013 |

\* cited by examiner

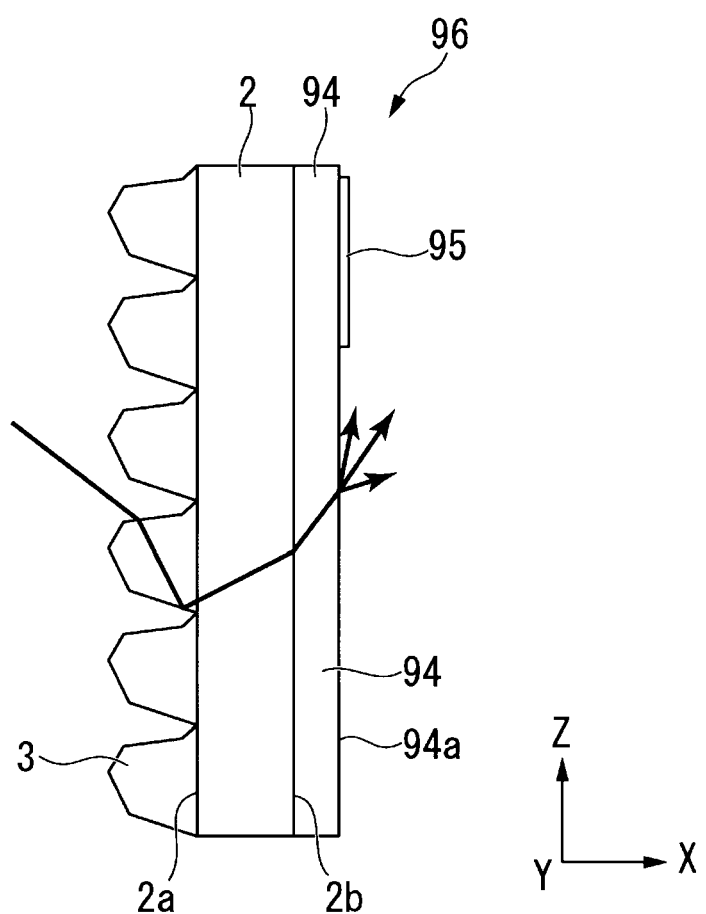

| UPWARD | ⇡ △ ⇧ |
|---|---|
| DOWNWARD | ⇣ ▽ ⇩ |
| FOR EAST-FACING WINDOW | E |
| FOR WEST-FACING WINDOW | W |
| FOR SOUTH-FACING WINDOW | S |
| FOR SPRING | Spr |
| FOR SUMMER | Sum |
| FOR AUTUMN | Aut |
| FOR WINTER | Win |
| OTHERS | Longitude Latitude |

DAYLIGHTING MEMBER, METHOD OF MANUFACTURING DAYLIGHTING MEMBER, DAYLIGHTING DEVICE, AND DAYLIGHTING DEVICE INSTALLATION METHOD

TECHNICAL FIELD

The present invention relates to a daylighting member, a method of manufacturing a daylighting member, a daylighting device, and a daylighting device installation method.

This application claims the benefit of Japanese Priority Patent Application No. 2014-123749 filed on Jun. 16, 2014, the entire contents of which are incorporated herein by reference.

BACKGROUND ART

For example, as a technology for allowing outdoor natural light (sunlight) to efficiently travel indoors through a window glass pane, it is proposed that a daylighting film (daylighting member) is used (for example, refer to PTL 1).

The daylighting film results from forming multiple bodies (protrusion portions) in the shape of a prism on one surface of a film (base) that has optical transparency. By being attached to a window glass pane, the daylighting film radiates light towards an indoor ceiling, a side wall, or a floor while changing a propagation direction of light that is incident on the window glass pane, using the bodies in the shape of a prism.

Furthermore, because the light that is directed towards the ceiling reflects off the ceiling and radiates the inside of a room, the light substitutes illumination light. Therefore, in a case where the daylighting film that functions in this manner is used, an energy saving effect can be expected in which lighting fixtures in a building consumes less energy during the daytime.

CITATION LIST

Patent Literature

PTL 1: Japanese Unexamined Patent Application Publication No. 2008-40025

SUMMARY OF INVENTION

Technical Problem

When the daylighting member is attached to the window glass pane, there is a problem in which it is difficult to determine a direction of attachment the daylighting member with respect to the window glass pane. In a case where multiple daylighting units, which constitute the daylighting member, each are so minutely constituted that the multiple daylighting units each are several tens to several hundreds μm in size, it is difficult for a user to recognize the vertical direction or the front and rear sides of the daylighting member with visual observation. When a method of installation the daylighting member with respect to the window glass pane is used in an erroneous manner, not only a function of securing sufficient daylighting is difficult to perform, but also there occurs a bad effect in which much of glare light that causes a person in a room to feel dazzled is produced.

An object of an aspect of the present invention, which was made in view of the problems in the related art, is to provide a daylighting member, a method of manufacturing the daylighting member, a daylighting device, and a daylighting device installation method.

Solution to Problem

According to an aspect of the present invention, there is provided a daylighting member including: a base that has optical transparency; multiple first daylighting units which are formed on at least a first surface of the base and each of which has the optical transparency; an opening space which is provided between each of the multiple first daylighting units; and an index which is provided on at least any one of the first surface side of the base and the second surface side that is opposite in direction to the first surface, and which includes information relating a daylighting member.

In the daylighting member according to the aspect of the present invention, the index may be an index indicating a direction of installation with respect to an installation-occurring object.

The daylighting member according to the aspect of the present invention may have a constitution in which the multiple first daylighting units and the opening spaces are provided on the second surface of the base.

The daylighting member according to the aspect of the present invention may have a constitution in which a filling material with which some of opening spaces between each of the first daylighting units in a surface direction of the first surface are filled is further included and in which the index is constituted to be formed by the filling material.

The daylighting member according to the aspect of the present invention may have a constitution in which any one of transparent resin, colorized resin, and scatterer-containing resin is used as the filling material.

The daylighting member according to the aspect of the present invention may have a constitution in which a protection member is provided on the base through an adhesive agent, and in which the index is constituted to be provided on one portion of the protection member.

The daylighting member according to the aspect of the present invention may have a constitution in which the index is constituted as the adhesive agent with which some of the opening spaces in a surface direction of the base is filled, between each of the multiple first daylighting units.

The daylighting member according to the aspect of the present invention may have a constitution in which in the surface direction of the base, the index is provided in a second area that is different from a first area on which the multiple first daylighting units are formed.

The daylighting member according to the aspect of the present invention may have a constitution in which the index is formed by the second area of which the periphery is surrounded by the multiple first daylighting units.

The daylighting member according to the aspect of the present invention may have a constitution in which the index is constituted by any one among a concavity and convexity portion that is different from that in the first daylighting unit, a notch portion that results from cutting off a portion of the base, an ink material with which the base is coated, and an attachment seal that is attached on the base.

The daylighting member according to the aspect of the present invention may have a constitution in which the index is constituted by some of the first daylighting units of which surfaces are colored, among the multiple first daylighting units.

The daylighting member according to the aspect of the present invention may have a constitution in which the index is a data code that includes at least any one of a bar code and a two-dimensional code in which the information is stored.

The daylighting member according to the aspect of the present invention may have a constitution in which multiple second daylighting units that have a different light control characteristic than the multiple first daylighting units are further included and in which the index is constituted by the multiple second daylighting units.

The daylighting member according to the aspect of the present invention may have a constitution in which the index further includes at least one piece of information among information for a maker, information for a building contractor, and information for a user, in addition to the direction of the installation with regard to the installation-occurring object.

The daylighting member according to the aspect of the present invention may have a constitution in which multiple third daylighting units that have a different light control characteristic than the multiple first daylighting units, and the opening space that is formed between each of the multiple third daylighting units are provided on the second surface of the base.

The daylighting member according to the aspect of the present invention may have a constitution in which the second surface side is caused to have light scattering properties.

According to another aspect of the present invention, there is provided a method of manufacturing the daylighting member, including: a step of supplying ultraviolet-curable resin on a mold that has a concavity and convexity shape on at least the main surface side; a step of positioning a base on the mold through the ultraviolet-curable resin; a step of transferring the concavity and convexity shape of the mold to the ultraviolet-curable resin by radiating ultraviolet light from the base side and thus curing the ultraviolet-curable resin; a step of separating the mold from the ultraviolet-curable resin and forming multiple first daylighting units in a convexity shape and an opening space between each of the multiple daylighting units on one surface of the base; and a step of providing on the base an index indicating a direction of installation.

According to still another aspect of the present invention, there is provided a method of manufacturing the daylighting member, including: a step of transferring a concavity and convexity shape of a mold to a thermoplastic resin and forming multiple first daylighting units in a convexity shape and an opening space between each of the multiple first daylighting units on one surface of the thermoplastic resin by performing thermal pressing on the thermoplastic resin using the mold that has the concavity and convexity shape on at least the main surface side; and a step of providing an index indicating the direction of installation with respect to the installation-occurring object, to the thermoplastic resin.

In the method of manufacturing the daylighting member according to the aspect of the present invention, as a mold, a mold may be used that takes the concavity and convexity shape which corresponds to the multiple first daylighting units, and a concavity and convexity shape that corresponds to a second daylighting unit that has a different light control characteristic than a flat surface that corresponds to the index, or than the first daylighting unit.

According to still another aspect of the present invention, there is provided a daylighting device including the daylighting member and a support member that supports the daylighting member, in which outdoor light is allowed to travel indoors through the daylighting member.

The daylighting device according to one aspect of the present invention may have a constitution in which an accommodation mechanism, which folds and accommodates the support member that supports the daylighting member, in such a manner that the support member is able to be taken out and put in, is further included.

The daylighting device according to the aspect of the present invention may have a constitution in which a winding mechanism that winds the support member that supports the daylighting member, in such a manner that the support member is able to be taken out and put in is further included.

According to still another aspect of the present invention, there is provided a daylighting device installation method, in which, based on the index in the daylighting device described above, the daylighting device is installed in such a manner that light is emitted upwards in the vertical direction from a daylighting member and the daylighting device is installed on an installation-occurring object.

Advantageous Effects of Invention

With a daylighting member according to an aspect of the present invention, a user can determine a direction (the vertical direction or the front and rear sides) of installation of the daylighting member with an index being provided on a daylighting member as a marker, and can install the daylighting member on an installation-occurring object in the right direction for use. Accordingly, a function of securing sufficient daylighting is performed, and glare light that causes a person in a room to feel dazzled can be removed.

BRIEF DESCRIPTION OF DRAWINGS

FIG. 11B is a second diagram illustrating the modification example of the integral element of the daylighting film.

DESCRIPTION OF EMBODIMENTS

Figure 1:
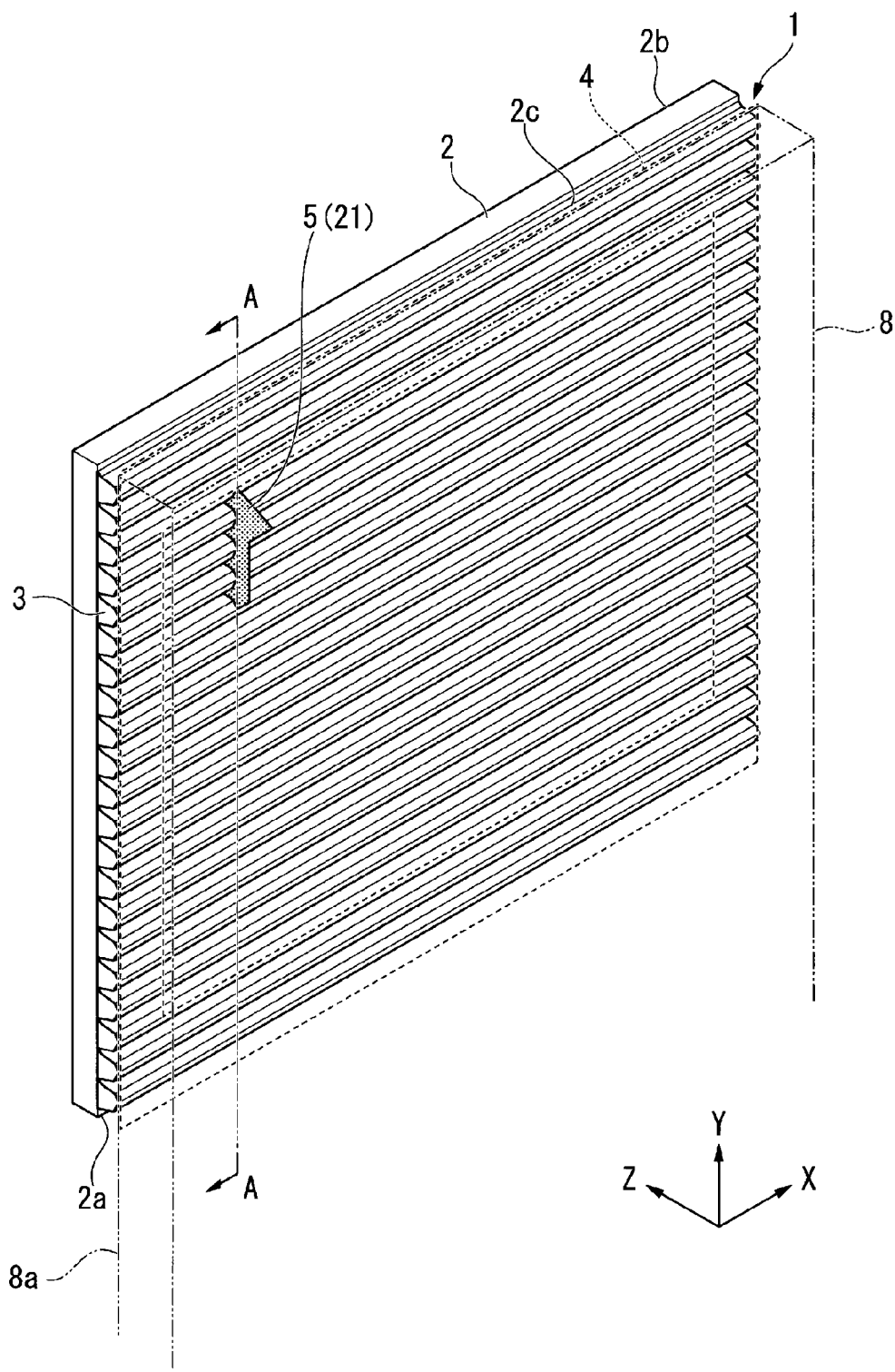
FIG. 1 is a diagram illustrating a constitution of an entire daylighting member according to a first embodiment.

Embodiments of the present invention will be described below referring to the drawings. Moreover, in each of the drawings, which are below referred to for description, a scale of each member is approximately changed in order for each member to be set to be recognizably enlarged.

Furthermore, in some cases, in cross-sectional diagrams, a hatching illustration is omitted in order for a constitution to be easy to view.

First Embodiment

Figure 2:
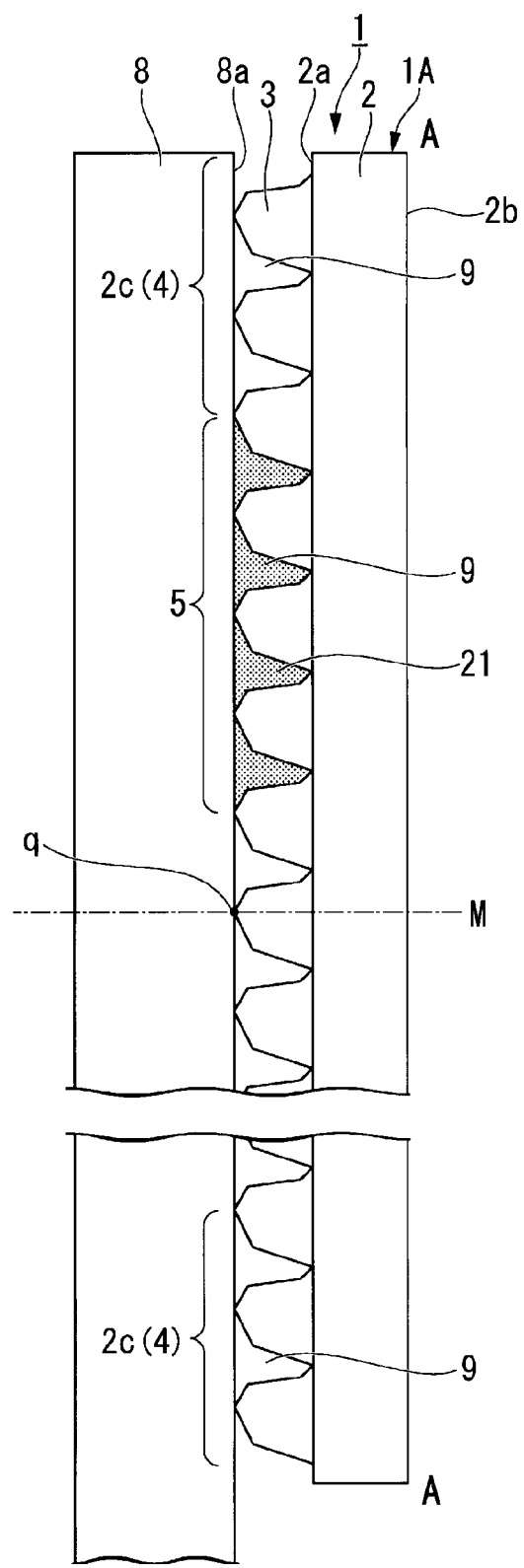
FIG. 2 is a cross-sectional diagram taken along line A-A in FIG. 1.
Figure 3A:
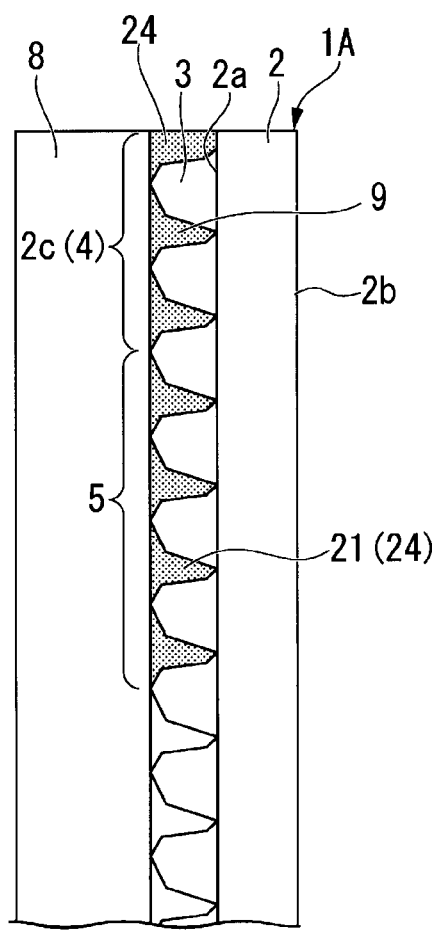
FIG. 3A is a first diagram illustrating an example of an integral-element constitution according to the first embodiment.
Figure 3B:
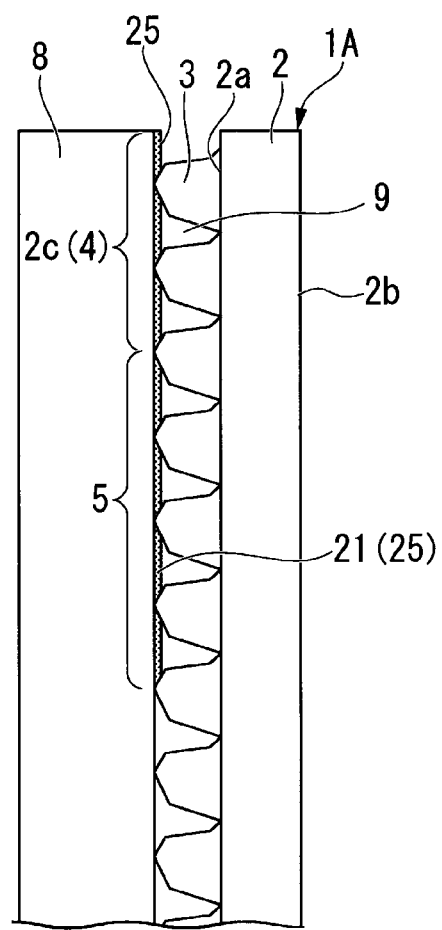
FIG. 3B is a second diagram illustrating the example of the integral-element constitution according to the first embodiment.
Figure 3C:
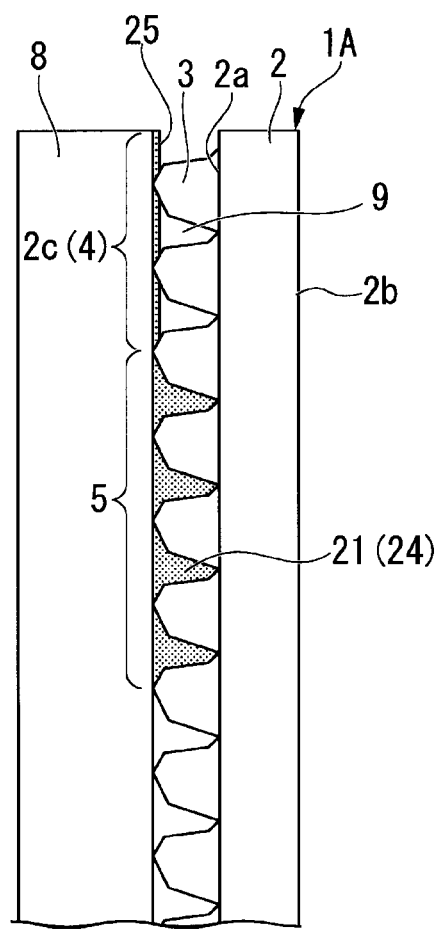
FIG. 3C is a third diagram illustrating the example of the integral-element constitution according to the first embodiment.
Figure 4:
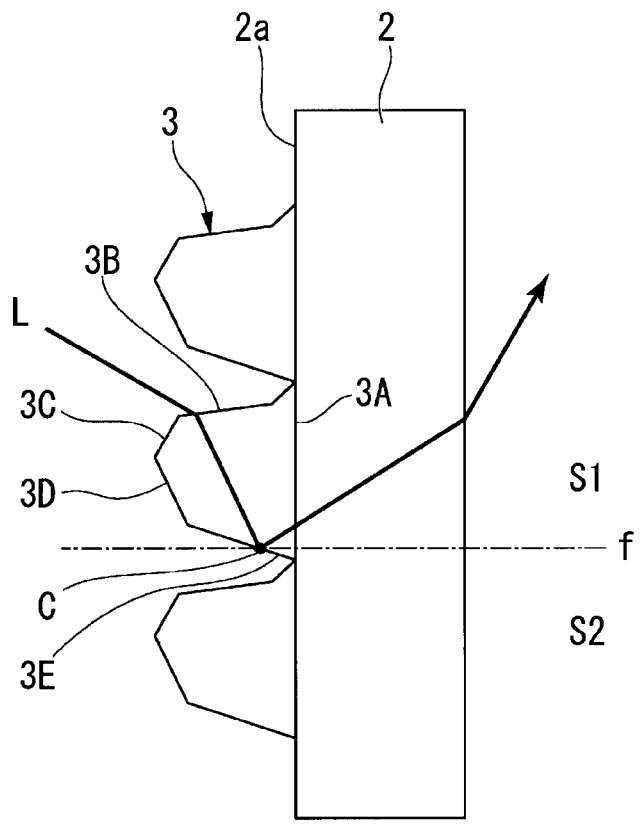
FIG. 4 is a diagram illustrating light passing through a daylighting unit.

FIG. 1 is a diagram illustrating a constitution of an entire daylighting member according to a first embodiment of the embodiment. FIG. 2 is a cross-sectional diagram taken along line A-A in FIG. 1. FIGS. 3A to 3C are diagrams each illustrating an example of an integral-element constitution according to the first embodiment. FIG. 4 is a diagram illustrating light passing through a daylighting unit.

For example, a daylighting film according to the first embodiment is an example of the daylighting member that sunlight is allowed to travel indoors in the shape in which the daylighting member is pasted to a window glass pane that is an attachment-occurring object (an installation-occurring object).

A case where a user pastes the daylighting film to the window glass pane for himself/herself will be described below.

As illustrated in FIGS. 1 and 2, a daylighting film (daylighting member) 1 according to the present embodiment includes a film body 1A that has a first base 2 and multiple daylighting units (first daylighting units) 3, an adhesive portion 4, and a mark (index) 5. The multiple daylighting units 3 are provided on a first surface 2a of the first base 2. An opening space 9 is provided between each of the multiple daylighting units 3.

At this point, the vertical direction when viewed from above the surface of the drawing, and the vertical direction (the Y direction) of the daylighting film 1 that is paste-joined to a window glass pane (installation-occurring object) 8 are aligned with each other, and the daylighting film 1 is paste-joined to an indoor-side surface 8a of the window glass pane 8. The mark (index) 5 indicating a direction of installation (direction of paste-joining) with respect to the window glass pane 8 is provided on the daylighting film 1 according to the present embodiment.

As the first base 2, for example, a base with optical transparency is used that is formed of thermoplastic polymer, resin such as thermosetting resin or photopolymeric resin, or the like. The base with optical transparency is used that is formed of acrylic polymer, olefin polymer, vinyl polymer, cellulose polymer, amide polymer, fluorine polymer, urethane polymer, silicone polymer, imide polymer, or the like. Specifically, it is preferable that the base with optical transparency is used, for example, such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) film.

According to the present embodiment, as an example, a PET film with a thickness of 100 μm is used. It is preferable that a total light transmittance of the first base 2 is equal to or greater than 90% in compliance with JIS K7361-1. Accordingly, sufficient transparency can be obtained.

The thickness of the first base 2 is arbitrary. The first base 2 is not limited to the shape of a film, and may be plate-shaped. The first base may have a lamination structure in which multiple bases are laminated on top of one another.

The daylighting unit 3, for example, is constituted as an organic material that has optical transparency and slow acting properties, such as acrylic resin, epoxy resin, or silicone resin. A transparent resin mixture can be used that results from mixing the resin described above with a polymerization initiator, a coupling agent, a monomer, or an organic solvent. In addition, the polymerization initiator may contain various additive components, such as a stabilizer, an inhibitor, a plasticizer, a fluorescent brightener, a mold releasing agent, a chain transfer agent, or other photopolymerizable monomer.

According to the present embodiment, as an example of the daylighting unit 3, polymethylmethacrylate (PMMA) us used. It is preferable that a total light transmittance of the daylighting unit 3 is equal to or greater than 90% in compliance with JIS K7361-1. Accordingly, sufficient transparency can be obtained.

As illustrated in FIG. 1, the daylighting unit 3 extends in a straight line in a shape-elongated manner in one direction (the direction perpendicular to the surface of the drawing that is FIG. 2), and the shape of the cross section that orthogonally intersects the longitudinal direction is a polygon. For example, as illustrated in FIG. 2, the shape of the cross section of the daylighting unit 3 is a hexagon that has six vertexes. A sum of interior angles that are formed by five of these six vertexes is smaller than 180°. The multiple daylighting units 3, the longitudinal direction of each is in parallel to one side of the first base 2 in the shape of a rectangle when viewed from the side, are arranged in close proximity to one another in the width direction.

The daylighting unit 3 according to the present embodiment, as illustrated in FIG. 2, the shape of the cross section of which is a hexagon, has a polygonal-pillar structure in which shapes of both sides are asymmetrical about a perpendicular line M on the first base 2 that passes a vertex q that is furthest positioned from the first base 2.

Moreover, the shape of the cross section of the daylighting unit 3 is not limited to this, and it is also possible that a design is changed according to the intended use of the daylighting film 1 and the like.

Air occupies the daylighting unit 3 that is provided between each of the opening spaces 9 that are adjacent to one another in the width direction. Therefore, a refractive index of the opening space 9 is approximately 1.0. By setting the refractive index of the opening space 9 to 1.0, a critical angle is minimized in an interface between the opening space 9 and the daylighting unit 3. According to the present embodiment, air occupies the opening space 9, but an inert gas such as nitrogen may occupy the opening space 9. Alternatively, the opening space 9 may be in a pressure-reduced state.

Moreover, it is desirable that a refractive index of the second base 2 and a refractive index of the daylighting unit 3 are approximately the same. The reason for that is that, for example, in a case where the refractive index of the first base 2 and the refractive index of the daylighting unit 3 is greatly different from each other, when light is incident on the first base 2 from the daylighting unit 3, unnecessary light refraction or reflection occurs in an interface between the daylighting unit 3 and the first base 2. In this case, there is a concern that a defect will occur such as unavailability of a desired daylighting characteristic or a decrease in luminance.

The adhesive portion 4 is provided on a peripheral portion 2c (FIG. 1) of the first surface 2a of the first base 2, and this serves the purpose of causing the entire daylighting film 1 to adhere to the window glass pane (attachment-occurring portion) 8. An adhesive material (not illustrated) as the adhesive portion 4 is first provided from the beginning on the first surface 2a of the first base 2 as a constituent element of the daylighting film 1. The adhesive portion 4 is used as a part for adhesion to the window glass pane 8.

An optical adhesion sheet, as the adhesive material (not illustrated), may be provided on the daylighting unit 3 that is present on the peripheral portion 2c, and the opening space 9 that is present is on the peripheral portion 2c is filled with the adhesive material.

Moreover, according to the present embodiment, the multiple daylighting units 3 are formed over the entire the first surface 2a of the first base 2, but the adhesive material (not illustrated) may be directly provided on the first surface 2a without the daylighting unit 3 being formed in advance on the peripheral portion 2c.

It is desirable that a refractive index of the adhesive portion 4 is equal to the refractive index of the first base 2 or a refractive index of the window glass pane 8. Due to the refractive index of the adhesive portion 4, refraction does not occur in interfaces between the adhesive portion 4 and the first base 2 and between the adhesive portion 4 and the window glass pane 8.

The mark 5 indicating the direction of the paste-joining at the time of the installation with respect to the window glass pane 8 is provided on the first surface 2a side of the daylighting film 1 according to the present embodiment. According to the present embodiment, the mark 5 is provided in the vicinity of one corner portion of the first base 2 that takes the shape of a rectangle. The daylighting film 1 according to the present embodiment, as illustrated in FIG. 2, has multiple daylighting units 3, each with the cross section that is asymmetrical vertically about the center. Because the daylighting unit 3 is minutely structured in such a manner that the width thereof is several tens nm to several hundreds nm, the mark 5 is provided in such a manner that the user can determine the horizontal direction of the film at first glance. As illustrated in FIG. 1, the mark 5 is an arrow indicating the vertical direction of the daylighting film 1, and the direction that is indicated by the arrow is an upward direction. According to the present embodiment, an arrow that is asymmetrical horizontally about the center is used as the mark 5. For this reason, not only the vertical direction of the daylighting film 1, but also the front and rear sides of the daylighting film 1 can be determined at the same time.

According to the present embodiment, the arrow indicating the upward direction of the daylighting film 1 is used as the mark 5, and no limitation to this is imposed. Shapes other than the arrow may be used as the mark 5.

The mark 5 is constituted by filling some of the opening spaces 9, which are formed on the first surface 2a side of the first base 2, with a mark formation material 21. For example, the same material as the adhesive material that is used for the adhesive portion 4 described above may be used as the mark formation material 21. It is advantageous to use a constituent material of the daylighting film 1 in that the mark 5 can be easily formed, and a material that is used for forming the mark 5 is particularly not limited.

For example, as illustrated in FIG. 3A, in a case where the adhesive portion 4 is formed using an adhesive material (optical adhesive material) 24 in liquid form, the mark 5 may be formed using the same adhesive material 24 as the adhesive portion 4, as the mark formation material 21. Furthermore, as illustrated in FIG. 3B, in a case where the adhesive portion 4 is formed using an optical adhesive sheet 25, the mark 5 may be formed using the same optical adhesive sheet 25 as the adhesive portion 4, as the mark formation material 21. Of course, as illustrated in FIG. 3C, although the mark 5 is formed using the optical adhesive material 24 as the mark formation material 21, this poses no problem. Furthermore, although the adhesive portion 4 is formed using the optical adhesive sheet 25, this poses no problem.

The material that is used for constituting the mark 5 is not limited a material having adhesive properties, and although a material that has not adhesive properties is used, this poses no problem. Furthermore, the mark 5 may have a transparent color or may be colorized, and may be formed using transparent resin or colorized resin. Furthermore, the mark 5 may be formed using resin containing a scatterer.

A surface of the mark 5 is exposed at the first surface 2a side of the first base 2. The user can easily recognize a surface at which the surface of the mark 5 (mark formation material 21) is exposed, as a surface at which the paste-joining to the window glass pane 8 occurs. Moreover, because the multiple daylighting units 3 are formed on the first surface 2a side, the user has no difficulty in recognizing the pasting-joining surface through the feeling of surface roughness, but possibly visually checks for the presence of the mark 5 as well, and can more reliably determine the pasting-joining surface at first.

In practice, for use, the daylighting film 1 according to the present embodiment is pasted to the window glass pane 8 in a state where the side at which the surface (mark formation material 21) of the mark 5 is exposed, which is the first surface 2a on which the multiple daylighting units 3 are formed, is made to face an internal surface 8a (indoor-side surface) of the window glass pane 8 with the direction being indicated by the mark 5 in the shape of an arrow as the upward direction. The daylighting film 1 in a state of being pasted is such that the longitudinal direction of the daylighting unit 3 faces the horizontal direction and the arrangement direction of the multiple daylighting units 3 is along the vertical direction.

When pasting the daylighting film 1 to the window glass pane 8, the user straightens the position of the daylighting film 1 in such a manner that the direction which is indicated by the mark 5 in the shape of an arrow is set to be the upward direction and the mark 5, when viewed from the user side (indoor side), is at the upper right. When this is done, the surface facing the user spontaneously is towards the first base 2 side of the daylighting film 1, and the surface (the surface that does not face the user) that is opposite in direction to the surface facing the user is a paste-occurring surface with respect to the window glass pane 8.

In this manner, the user can determine the vertical direction or the front and rear sides (the paste-joining surface) of the daylighting film 1, with the mark 5 being provided in advance on the daylighting film 1 as a marker, and can use the daylighting film 1 in a state of being paste-joined to the window glass pane 8 in the right direction.

Next, a function in which the daylighting film 1 controls light is described.

In a state where the daylighting film 1 is installed on the window glass pane 8, light arriving directly from the Sun is incident on the daylighting film 1 from an obliquely upward direction. The light that is incident on the daylighting film 1 passes through the window glass pane 8 and reaches the daylighting unit 3.

At this point, for the convenience of description, a point on a surface 3E (reflective surface) of the daylighting unit 3, on which an arbitrary beam of light, among the lights that are incident on the daylighting unit 3 that is illustrated in FIG. 4, is incident is defined as an incidence point C. An imaginary line that passes through the incidence point C and orthogonally intersects the first surface 2a of the first base 2 is defined as a straight line f. Among two spaces that borders a horizontal surface including the straight line f, a space on the side on which the light being incident on the incidence point C is present is defined as a first space S1 and a space on the side on which the light being incident on the incidence point C is not present is defined as a second space S2.

For example, a light L that is incident from a surface 3B of the daylighting unit 3 totally reflects off the surface 3E of the daylighting unit 3, propagates in the oblique direction, that is, towards the first space S1 side, and is emitted from a surface 3A of the daylighting unit 3. The light L that is emitted from the daylighting unit 3 passes through the first base 2, and is emitted from the daylighting film 1 towards an indoor ceiling. The light is emitted from the daylighting film 1 towards the ceiling reflects off the ceiling and illuminates the inside of a room, and thus substitutes for illumination light. Therefore, in a case where the daylighting film 1 that functions in this manner is used, an energy saving effect can be expected in which lighting fixtures in a building consumes less energy during the daytime.

Figure 5:
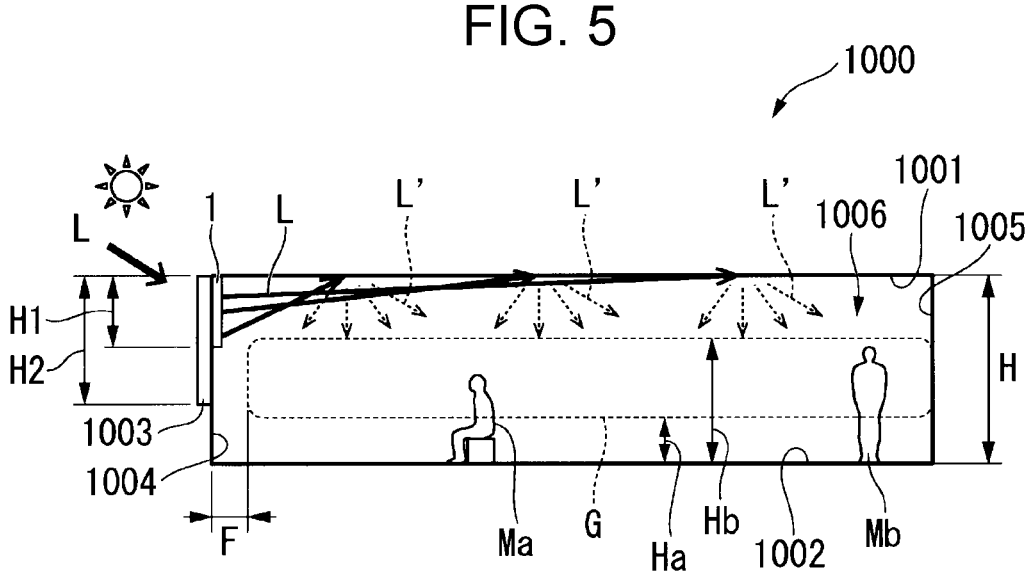
FIG. 5 is a schematic diagram illustrating an example of a room model.

At this point, a daylighting characteristic of the daylighting film 1 that uses a room model 1000 that is illustrated in FIG. 5 is described. FIG. 5 is a schematic diagram illustrating an example of the room model 1000.

The room model 1000, for example, is a model in which the daylighting film 1 is assumed to be used in an office. Specifically, the room model 1000 that is illustrated in FIG. 5 results from simulating a case where the light L is incident on a room 1006 that is surrounded by a ceiling 1001, a floor 1002, a front side wall 1004 to which a window glass pane 1003 is attached, and a rear side wall 1005 that faces the front side wall 1004, from outdoors through the window glass pane 1003 from the obliquely upward direction. The daylighting film 1 is pasted to the upper portion side of an internal surface of the window glass pane 1003 (which is equivalent to the window glass pane 8 described above).

In the room model 1000, it is assumed that a height dimension H (dimension from the ceiling 1001 to the floor 1002) of the room 1006 is 2.7 m, that a perpendicular dimension H2 of the window glass pane 1003 from the ceiling 1001 is 1.8 m, and that a perpendicular dimension H1 of the daylighting film from the ceiling 1001 is 0.6 m.

In the room model 1000, a person Ma sits on a chair in the direction of the center of the room 1006, and a person Mb stands on the floor 1002 in the direction of the back side the room 1006. It is assumed that a lower limit Ha of a height from the floor 1002 of the eyes of the person Ma sitting on the chair is 0.8 m, and that an upper limit Hb of a height from the floor 1002 of the eyes of the person Mb standing on the floor 1002 is 1.8 m.

An area G where the persons Ma and Mb in the room 1006 feels dazzling (which is referred to as a glare area) is in a range of the heights Ha and Hb of the eyes of the persons Ma and Mb in the room. Furthermore, the light L from outdoors is radiated directly to an area F through the lower portion side of the window glass pane 1003 of the room 1006. The area F is in a range of 1 m from the front side wall 1004. Therefore, the glare area G is in a range from a position that is 1 m away from the front side wall 1004, which results from excluding the area F, to the rear side wall 1005, and is in a range of 0.8 m to 1.8 m in height from the floor 1002.

The glare area G is an area that is stipulated based on a position of the eyes in an area where the person moves. For example, although the room 1006 is brightly illuminated with light propagating towards the ceiling 1001 side, when a large amount of light reaches the glare area G, the person in the room 1006 easily feels uncomfortable.

The daylighting film 1 according to the present embodiment, it is possible that, among lights L that are incident on the room 1006 through the window glass pane 1003, luminance of a light that is directed towards the ceiling 1001 is increased relatively while reducing luminance of a light that is directed towards the glare area G. Accordingly, outdoor natural light (sunlight) can efficiently travel indoors and the person in the room can feel the brightness even in the rear side of the room, without feeling dazzled.

Moreover, the light L that reflects off the ceiling 1001 substitutes for the illumination light and brightly illuminates the room 1006 over a wide range. In this case, by turning off the lighting fixtures in the room 1006, the energy saving effect can be expected in which the lighting fixtures in the room 1006 consume less energy during the daytime.

Because the mark 5 described above is provided on the daylighting film 1 according to the present embodiment, the user can determine the vertical direction and the front and rear sides of the daylighting film 1 simply and reliably from the mark 5. In the past, the mark for determining the direction in which the installation occurs with respect to the window glass pane 8 has not been present and thus a bad effect of a glare light due to a pasting error has occurred. However, with the daylighting film 1 according to the present embodiment, it is possible that the user paste-joins the daylighting film 1 to the window glass pane 8 (the window glass pane 1003) in the right direction using the mark 5 described above. In this manner, by preventing the pasting error in the daylighting film 1, the energy saving effect described above and the like can be efficiently obtained. Furthermore, the bad effect due to the glare light does not occur by keeping the pasting error from occurring, and at the same time, damage to the daylighting film 1 and the like that occur at the time of the separation can be prevented as well.

Figure 27A:
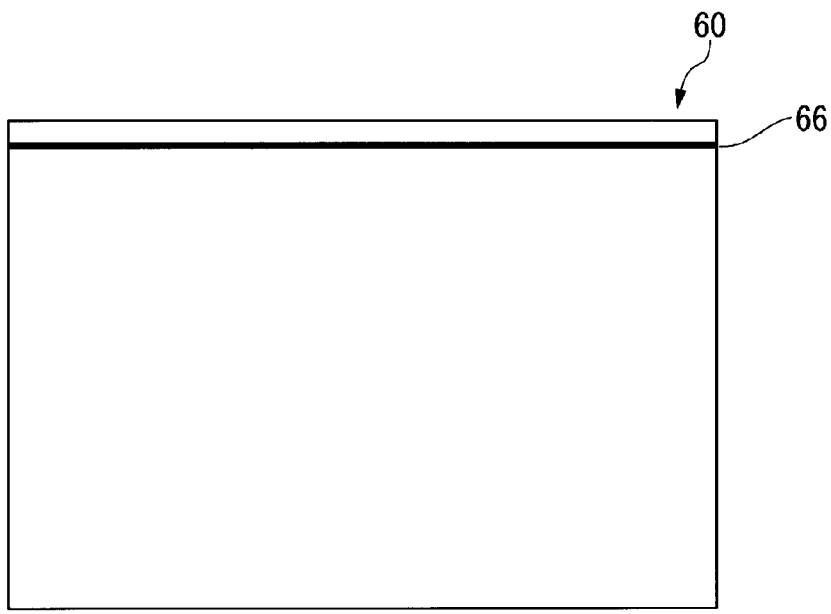
FIG. 27A is a diagram illustrating a mark in the shape of a line that appears when the daylighting film is viewed from a prescribed direction.
Figure 27B:
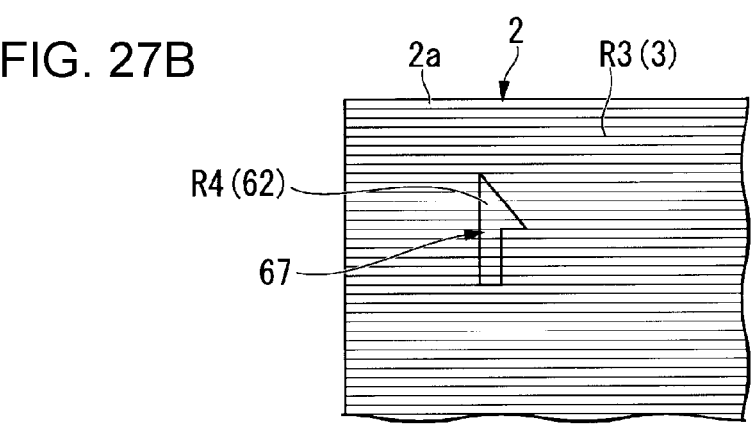
FIG. 27B is a first diagram illustrating an arrow mark as a different implementation example.
Figure 27C:
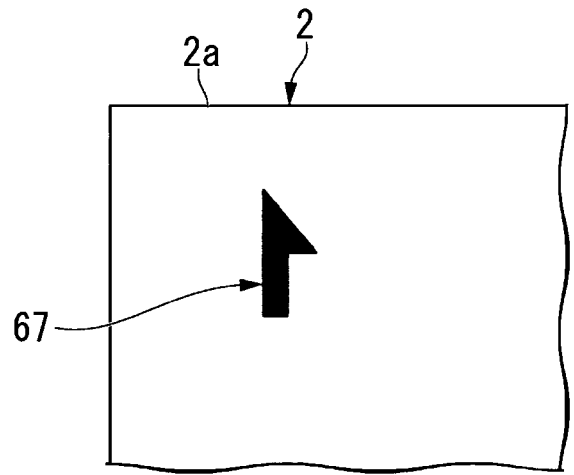
FIG. 27C is a second diagram illustrating the arrow mark as the different implementation example.

The mark 5 that is provided on the daylighting film 1 is not limited to the mark in the shape of an arrow described above, and figures other than the arrow may be used. For example, an example of the shape of the mark that indicates the vertical direction of the daylighting film 1, a shape that, as illustrated in FIGS. 27A to 27C, is asymmetrical horizontally about the center may be employed as the mark 5, in addition to the marks in the shape of an arrow that indicate "upward" and "downward", respectively. Furthermore, letters as well as graphic symbols may be used, and combination of these may be available. Moreover, as the mark 5, although a mark in the shape that, like a normal arrow that is illustrated in FIGS. 27A to 27C, is symmetrical horizontally about the center is used, this poses no problem.

In this manner, by using the mark 5 with which it is possible that the vertical direction and the horizontal direction (front and rear directions) of the daylighting film 1 are determined, because it is possible that the user easily determines the paste-joining surface at the time of the paste-joining to the window glass pane 8, a building operation can be easily performed and the pasting error can be prevented. Because of this, it is possible that a daylighting effect that is desired is reliably obtained. Furthermore, even in a case where the daylighting film 1 finds application in other embodiments, an effect of improving manufacturing efficiency and so on is obtained.

Furthermore, a position in which the mark 5 is formed may be provided on each of the opposite angles and on all of the four edge portions, as well as on one edge portion of the first base 2. Furthermore, marks that differ in shape may be mixedly present.

Moreover, the mark in the shape of an arrow, which is described above, indicates the directivity in itself, in a case where an arrow is used as the mark 5 indicating the vertical direction of the daylighting film 1, multiple marks 5 do not need to be necessarily formed on the first base 2, and only the mark may be provided on the first base 2 as described according to the present embodiment. Furthermore, a position in which the mark 5 is formed is not limited to the position described above as well.

The size and shape of the mark 5 are as large as the user can visually recognize the mark 5, but the size or shape of the mark 5 is not as large as can have an influence on an entire daylighting function.

[Method of Manufacturing the Daylighting Film]

Next, a method of manufacturing the daylighting film is described.

The daylighting film 1 according to the first embodiment, which is described above, can be manufactured with UV imprinting, thermal pressing, or the like.

(UV Imprinting Method)

First, a method of manufacturing the daylighting film with a basic structure using the UV imprinting method is described.

FIGS. 6A to 6E are diagrams each illustrating a process of manufacturing the daylighting film using the UV imprinting method. Descriptions will be provided below, suitably referring to FIGS. 1 and 2.

Figure 6A:
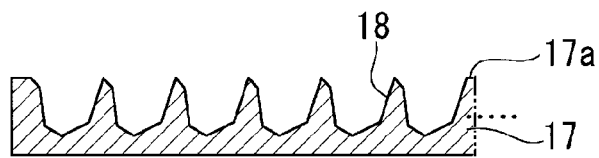
FIG. 6A is the first diagram illustrating a process of manufacturing the daylighting film using a UV imprinting method.

First, as illustrated in FIG. 6A, a mold 17 for manufacturing the daylighting film 1 is prepared. The mold 17 presents the shape of a rectangle when viewed from the side, and has multiple concavity portions 18 that correspond to shapes of the multiple daylighting units 3 (FIG. 2), respectively, on one surface (main surface) 17a side thereof.

Figure 6B:
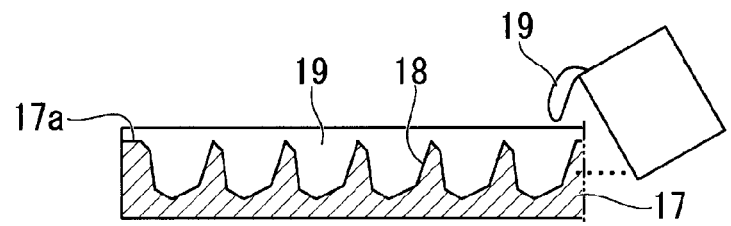
FIG. 6B is the second diagram illustrating the process of manufacturing the daylighting film using the UV imprinting method.

Next, as illustrated in FIG. 6B, an ultraviolet-curable resin 19, such as acrylic resin, polycarbonate, or polypropylene, is supplied on one surface 17a of the mold 17, and each of the concavity portions 18 is filled with the ultraviolet-curable resin 19.

Figure 6C:
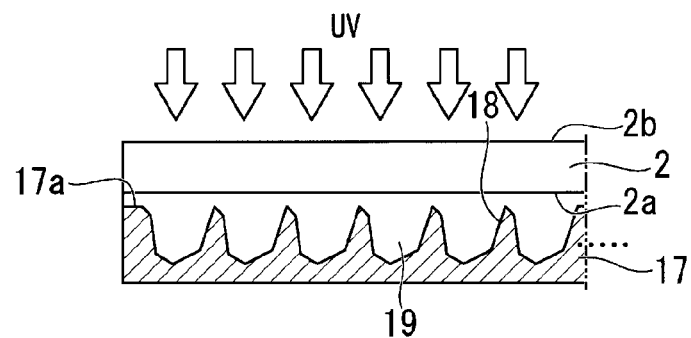
FIG. 6C is the third diagram illustrating the process of manufacturing the daylighting film using the UV imprinting method.

Next, as illustrated in FIG. 6C, the first base 2 is mounted on the one surface 17a of the mold 17 that is coated with the ultraviolet-curable resin 19, in a manner that presses against the first surface 2a side. Thereafter, a prescribed pressure is applied to the first base 2 towards the mold 17, and in this state, a UV light is radiated from the second surface 2b side of the first base 2. By applying the pressure, the ultraviolet-curable resin 19 penetrates into the concavity portion 18 without any gap by capillary action. Then, the ultraviolet-curable resin 19 cures due to the UV light that passes through the first base 2.

Figure 6D:
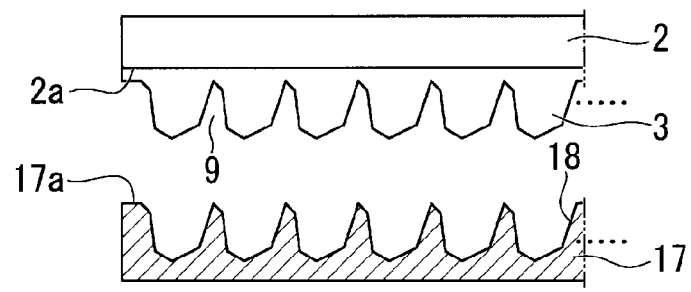
FIG. 6D is the fourth diagram illustrating the process of manufacturing the daylighting film using the UV imprinting method.

Next, as illustrated in FIG. 6D, the first base 2 is separated from the mold 17. When this is done, the multiple daylighting units 3 and opening spaces 9 that are pattern-formed by transferring a concavity and convexity shape of the mold 17 appear on the first surface 2a side of the first base 2.

Figure 6E:
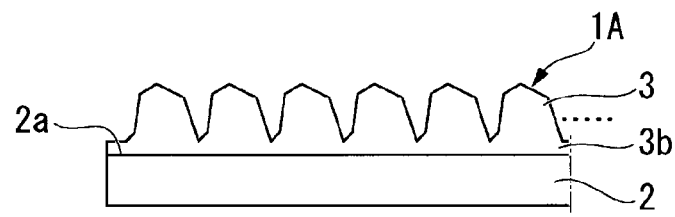
FIG. 6E is the fifth diagram illustrating the process of manufacturing the daylighting film using the UV imprinting method.

In this manner, the film body 1A as illustrated in FIG. 6E is completed. At this time, a connection portion 3b is formed on the first base 2 side of the multiple daylighting units 3. With an amount of the ultraviolet-curable resin 19 with which the concavity portions are filled or the like, it is also possible that the thickness of the connection portion 3b is made to be as small as possible, but it is preferable that a sufficient amount of resin material is also supplied to the extent to which each concavity portion 18 of the mold 17 is filled with resin material in such a manner that cavities are not formed within the daylighting unit 3. In this case, the connection portion 3b is formed. Moreover, an illustration of the connection portion 3b is omitted in each drawing that illustrates each embodiment described above.

(Thermal Pressing Method)

Next, a method of manufacturing the daylighting film with the basic structure using the thermal pressing method is described.

FIGS. 7A to 7D are diagrams each illustrating a process of manufacturing the daylighting film using the thermal pressing method. Descriptions will be provided below, suitably referring to FIG. 2.

Figure 7A:
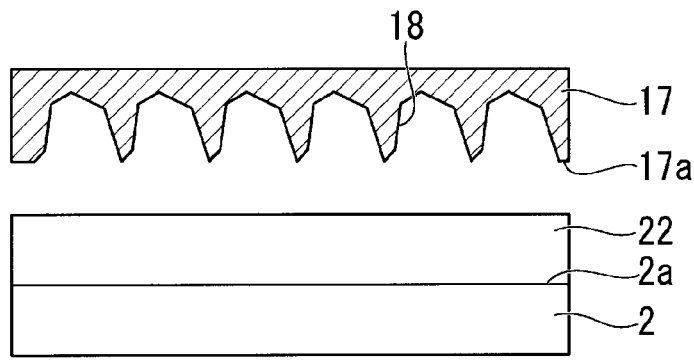
FIG. 7A is the first diagram illustrating a process of manufacturing the daylighting film using a thermal pressing method.

First, as illustrated in FIG. 7A, the first surface 2a of the first base 2 is coated with a thermoplastic resin 22. Thereafter, the mold 17 described above is prepared, and the mold 17 is positioned over the first base 2 that is coated with the thermoplastic resin 22, in a manner that faces the first base 2, in a state where the one surface 17a side on which the multiple concavity portions 18 are formed is caused to face the thermoplastic resin 22 on the first surface 2a of the first base 2.

Figure 7B:
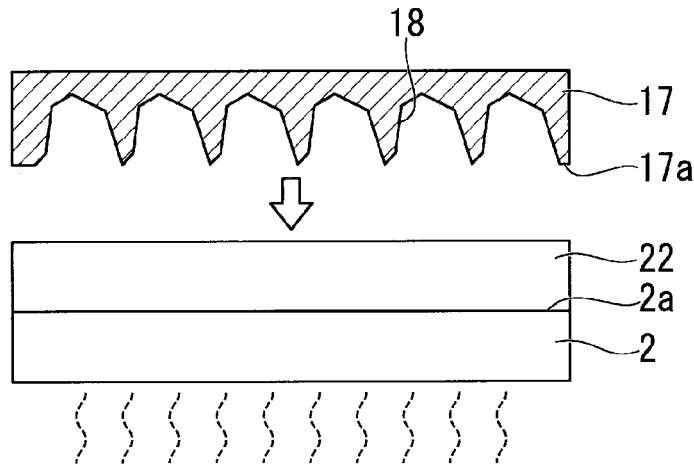
FIG. 7B is the second diagram illustrating the process of manufacturing the daylighting film using the thermal pressing method.

Next, as illustrated in FIG. 7B, the thermoplastic resin 22 increasingly heated to a high temperature for softening. Subsequently, the mold 17 is brought into contact with the thermoplastic resin 22 that is softened on the first base 2, and is pressed against the thermoplastic resin 22 with a prescribed pressure.

Figure 7C:
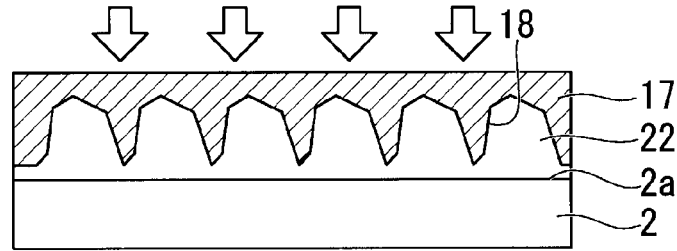
FIG. 7C is the third diagram illustrating the process of manufacturing the daylighting film using the thermal pressing method.

Next, as illustrated in FIG. 7C, the substrate is cooled to a low temperature while maintaining a pressed state, and the thermoplastic resin 22 is hardened. In this manner, the concavity and convexity shape of the surface of the mold 17 is transferred to the thermoplastic resin 22.

Figure 7D:
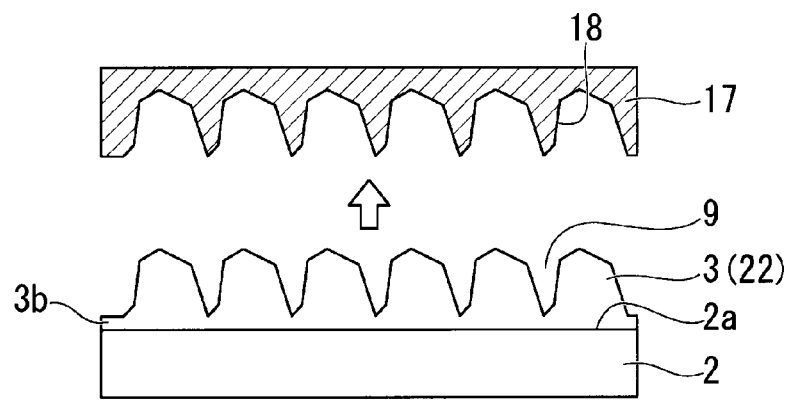
FIG. 7D is the fourth diagram illustrating the process of manufacturing the daylighting film using the thermal pressing method.

Next, as illustrated in FIG. 7D, the thermoplastic resin 22 is sufficiently cooled and then the first base 2 and the mold 17 are separated from each other. Accordingly, the multiple daylighting units 3 and the opening space 9 appear on the first surface 2a side of the first base 2.

Figure 8:
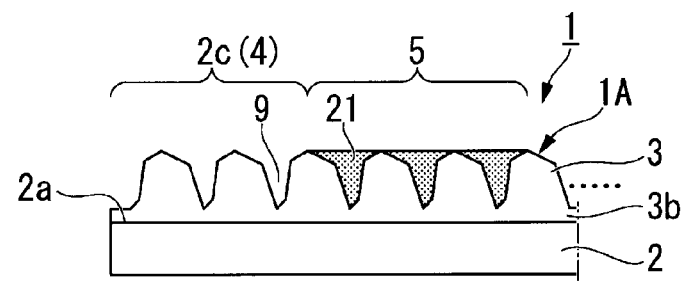
FIG. 8 is a diagram illustrating a film body that is manufactured with the UV imprinting or the thermal pressing.

FIG. 8 is a diagram illustrating a film object that is manufactured with the UV imprinting or the thermal pressing.

In a case where the daylighting film 1 according to the present embodiment, which is illustrated in FIG. 2, is manufactured, as illustrated in FIG. 8, the adhesive portion 4 and the mark 5 are formed at the same time on the first surface 2a side of the film body 1A that is manufactured with any one of the manufacturing methods described above. In this manner, the daylighting film 1 according to the present embodiment is completed.

Moreover, as one of the manufacturing methods, the method in which the first surface 2a of the first base 2 is coated with the thermoplastic resin 22 and the thermal pressing is performed is described above, but only thermoplastic resin may be used to form a base. For example, the thermal pressing may be performed on an acrylic substrate.

Figure 9A:
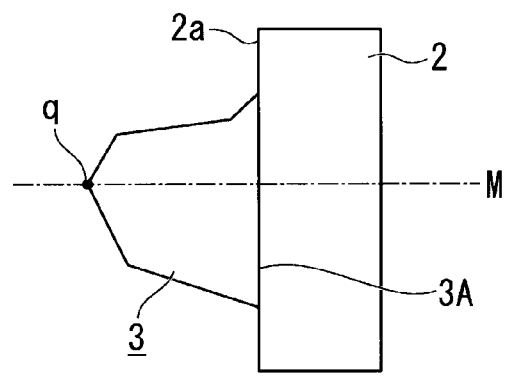
FIG. 9A is a diagram illustrating a first modification example of a daylighting unit of the daylighting film.

As illustrated in FIG. 9A, a cross section of the daylighting unit 3 in the daylighting film 1 described above, which intersects the longitudinal direction is in the shape of a hexagon. Specifically, the daylighting unit 3 has the vertex q that is furthest positioned from the surface 3A that is brought into contact with the first surface 2a of the first base 2, in the cross section that orthogonally intersects the longitudinal direction. The shape of the daylighting unit 3 is asymmetrical about the perpendicular line M on the surface 3A that passes through the vertex q. In this manner, in a case where the shape of the cross section that orthogonally intersects the longitudinal direction of the daylighting unit 3 is a polygon that has 4 or more vertexes and which is asymmetrical vertically about the center, and where a sum of interior angles that are formed all of the vertexes is smaller than 180°, the mark 5, with which both of the vertical direction and the front and rear sides of the daylighting film 1 can be determined when the daylighting film 1 is installed on the window glass pane 8, is needed.

Moreover, the shape of the cross section of the daylighting unit 3 is not limited to the hexagon, and may be a pentagon or a triangle.

Figure 9B:
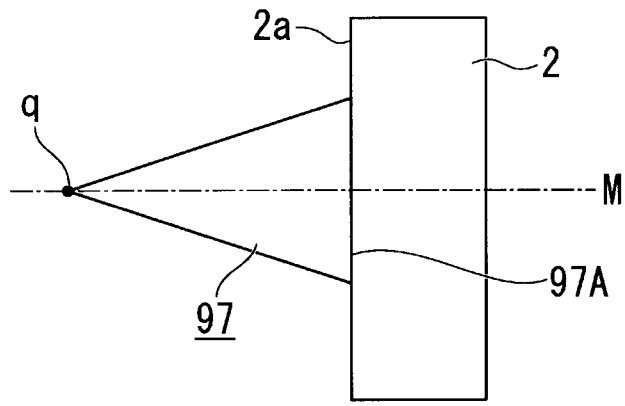
FIG. 9B is a diagram illustrating a second modification example of the daylighting unit of the daylighting film.

For example, like that of a daylighting unit 97 that is illustrated in FIG. 9B, the shape of the cross section that orthogonally intersects the longitudinal direction may be an isosceles triangle. In this manner, in a case where the shape of the daylighting unit is symmetrical about the perpendicular line M on a first side 97A that passes through the vertex q, because the vertical direction does not need to be determined, the mark with which only the front and rear sides can be determined may be used.

Figure 9C:
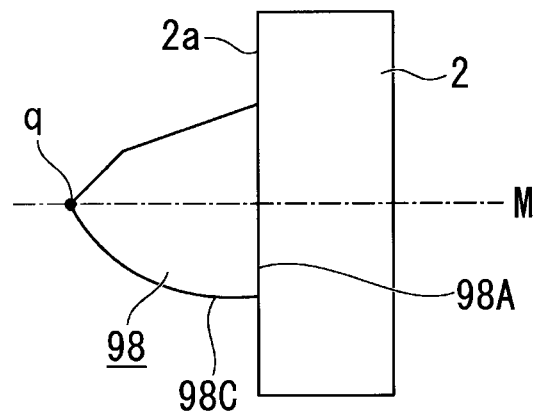
FIG. 9C is a diagram illustrating a third modification example of the daylighting unit of the daylighting film.

Furthermore, like that of a daylighting unit 98 that is illustrated in FIG. 9C, a curved cylindrical surface structure in which one portion of the peripheral surface is a curved surface may be employed. The daylighting unit 98 is in the shape that is asymmetrical about the perpendicular line M on a first side 98A that passes through the vertex q. In this case, the mark with which the vertical direction of the daylighting film can be exactly determined is made to be provided in such a manner that the daylighting film can be installed on the window glass pane in a state where a curved surface 98C of each daylighting unit 98 is directed downward.

FIGS. 10A to 10D are diagrams each illustrating a modification example of an integral-element constitution of the daylighting film.

Figure 10A:
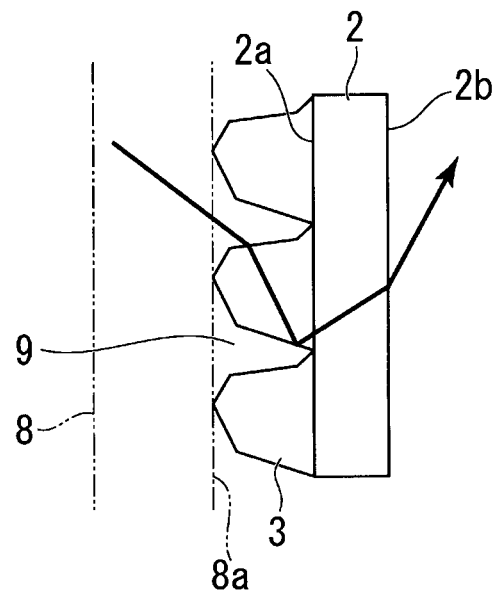
FIG. 10A is a first diagram for describing that a function of making a determination that uses a mark differs according to a shape of the daylighting unit.
Figure 10B:
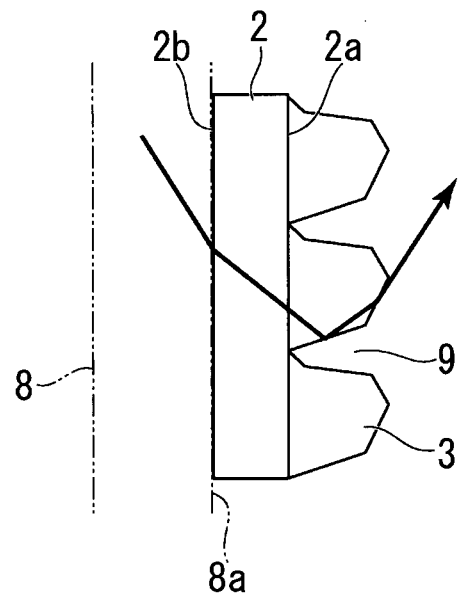
FIG. 10B is a second diagram for describing that the function of making a determination that uses the mark differs according to the shape of the daylighting unit.

For example, the daylighting film according to the embodiment, which is described above, as illustrated in FIG. 10A, has a constitution in which the daylighting unit 3 (first surface 2a side of the first base 2) is installed in a state where the daylighting unit 3 is directed towards the indoor-side surface (internal surface 8a) of the window glass pane 8. The present embodiment is not limited to this, and for example, as illustrated in FIG. 10B, a constitution in which the daylighting unit 3 is directed indoors in a state of being installed on the window glass pane 8 may be employed.

Furthermore, the daylighting film 1 described above has the constitution in which the multiple daylighting units 3 are provided only on the first surface 2a of the first base 2, but the present embodiment is not limited to this. The multiple daylighting units 3 and the opening space 9 may be also provided on the second surface 2b of the first base 2, and the daylighting unit that is provided on the second surface 2b may have a different light control characteristic than the daylighting unit 3.

Figure 10C:
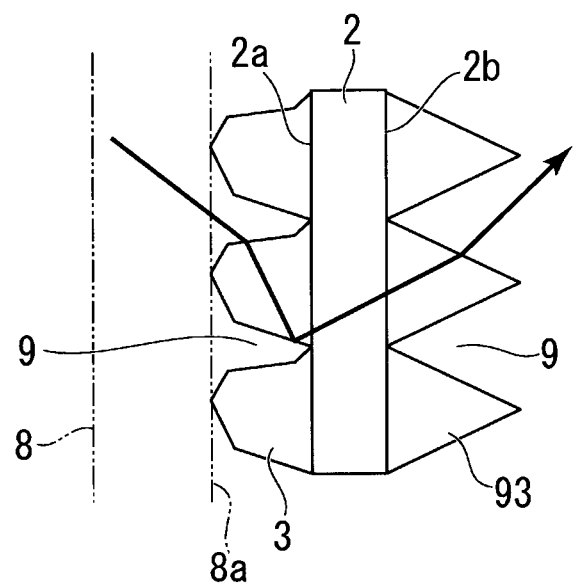
FIG. 10C is a third diagram for describing that the function of making a determination that uses the mark differs according to the shape of the daylighting unit.

For example, as illustrated in FIG. 10C, the daylighting units 3 and 93 that have different optical characteristics (daylighting characteristics) may be provided on both surfaces of the first base 2, respectively. Each of the multiple daylighting units 93 that are provided on the second surface 2b of the first base 2 has a different shape than the daylighting unit 3 that is provided on the first surface 2a side. The daylighting unit 93 extends in a straight line in a shape-elongated manner in the same direction as the extending direction of the daylighting unit 3, and the shape of the cross section that orthogonally intersect the longitudinal direction is a triangle. The shape of the cross section of the daylighting unit 93 is not limited to the triangle.

Figure 10D:
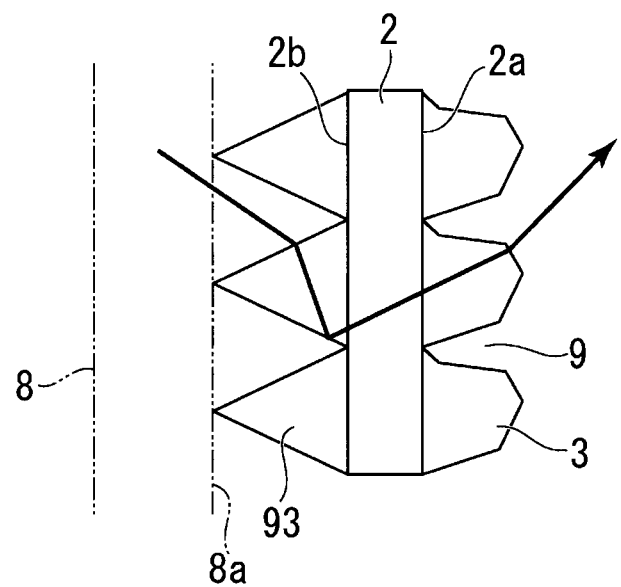
FIG. 10D is a fourth diagram for describing that the function of making a determination that uses the mark differs according to the shape of the daylighting unit.

The daylighting film that is illustrated in FIG. 10C is installed in a state where the multiple daylighting units 3 are directed towards the window glass pane 8, but as illustrated in FIG. 10D, the multiple daylighting units 3 and the multiple daylighting units 93 may be installed in a state where the multiple daylighting units 3 and the multiple daylighting units 93 are directed indoors and the window glass pane 8, respectively.

Figure 11A:
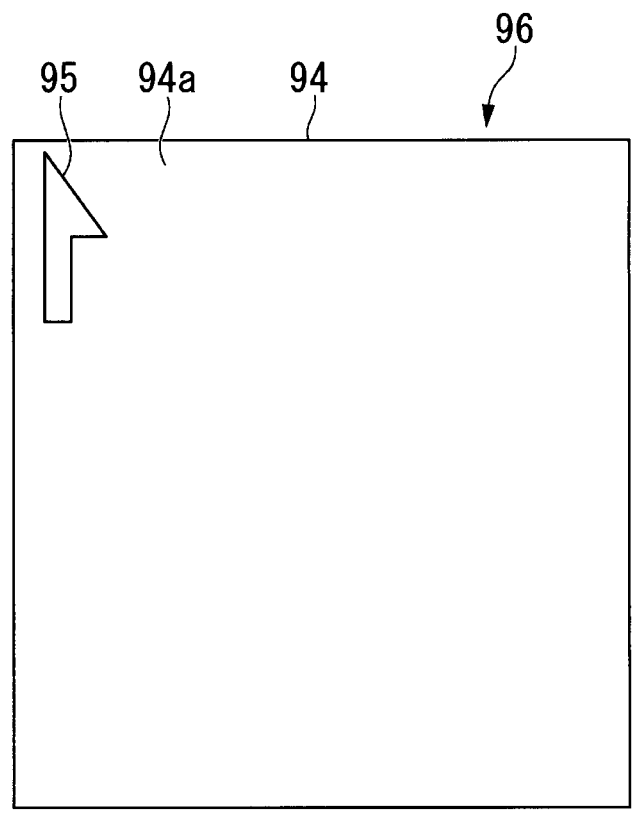
FIG. 11A is a first diagram illustrating a modification example of an integral element of the daylighting film.

Furthermore, instead of the multiple daylighting units 93 that are provided on the second surface 2*b* of the first base 2, a light scattering layer 94, as illustrated in FIGS. 11A and 11B, may be provided. The light scattering layer 94 is provided on the second surface 2*b* of the first base 2 through an adhesive agent that is not illustrated or the like. The light scattering layer 94 may have a function of diffuse light in an isotropic manner, and may have a function of diffuse light intensively in the horizontal direction than in the vertical direction of the window glass pane. A mark 95 with which the installation direction of a daylighting film 96 is determined is provided on a surface 94*a* of the light scattering layer 94. The mark 95 may be formed by directly performing drawing on the surface 94*a* of the light scattering layer 94, or may be formed using a mark in the shape of a shield that is formed with separate printing.

Second Embodiment

Next, a daylighting film 10 according to a second embodiment of the present invention is described.

A basic constitution of the daylighting film 10 according to the present embodiment, which will be described below, is approximately the same as the base constitution according to the first embodiment, but a constitution of a portion on which to form marks 14 and 15 each indicating the direction of the paste-joining of the daylighting film 10 with respect to the window glass pane 8 is different from the constitution according to the first embodiment. Consequently, the constitution of the portion on which to form the marks 14 and 15 will be described in detail below and descriptions of portions in common are omitted. Furthermore, constituent elements in common, which are illustrated in FIGS. 1 to 4, are given the same reference numerals in each drawing that is referred to for description.

Figure 12:
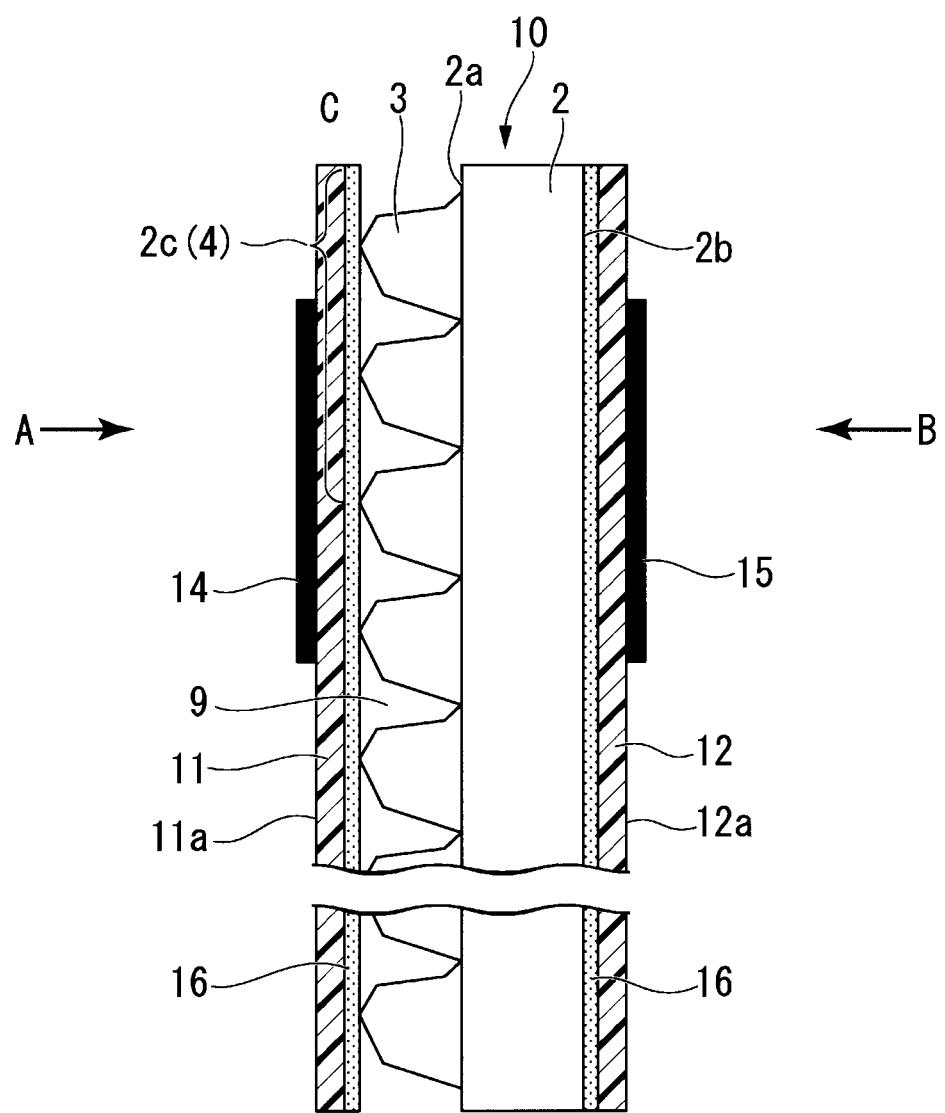
FIG. 12 is a diagram illustrating a schematic constitution of a daylighting film according to a second embodiment, and is a cross-sectional diagram taken along line C-C in FIGS. 13A and 13B.
Figure 13A:
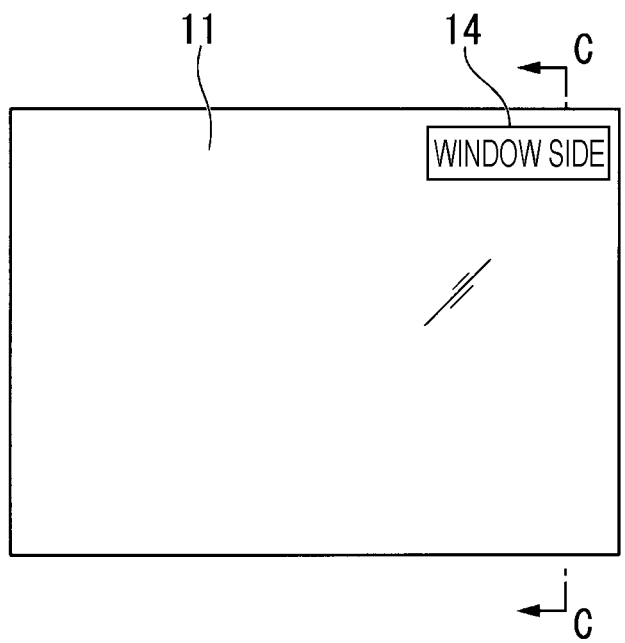
FIG. 13A is a diagram when viewed from the direction that is indicated by an arrow A in FIG. 12.
Figure 13B:
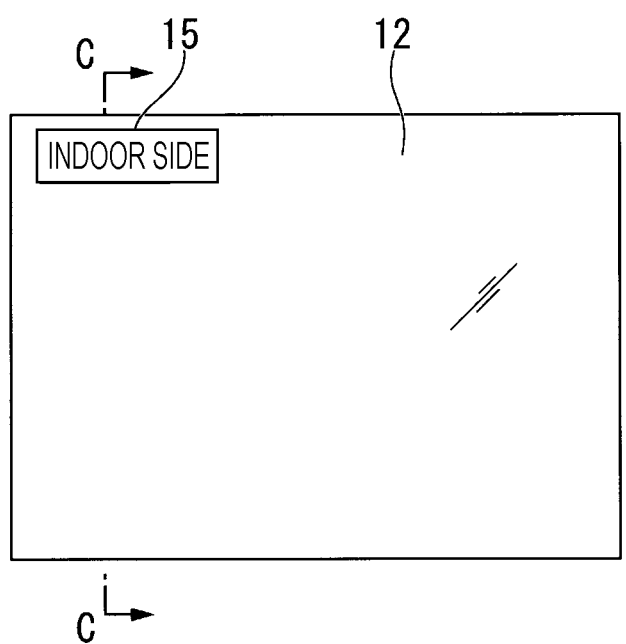
FIG. 13B is a diagram when viewed from the direction that is indicated by an arrow B in FIG. 12.

FIG. 12 is a diagram illustrating a schematic constitution of the daylighting film 10 according to the second embodiment, and is a cross-sectional diagram taken along line C-C in FIGS. 13A and 13B.

Figure 14:
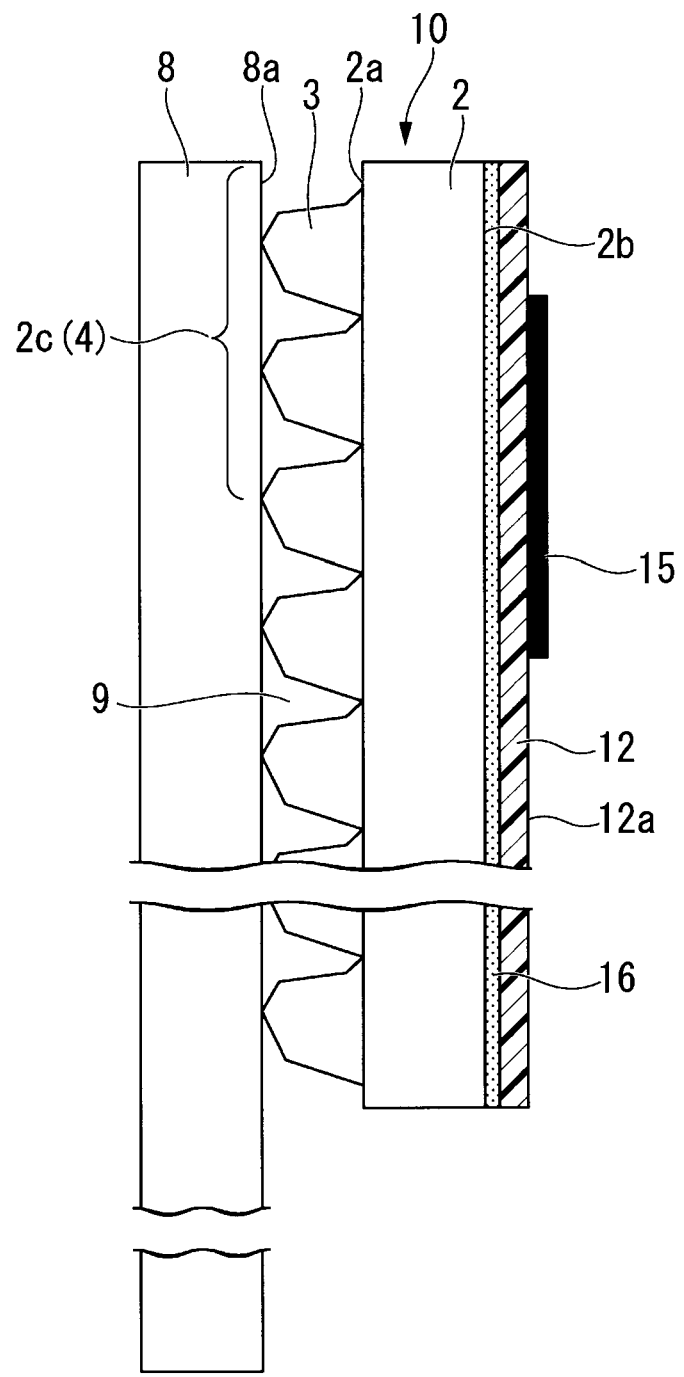
FIG. 14 is a diagram indicating a state that appears immediately after the daylighting film according to the second embodiment is attached to a window glass pane.

FIG. 13A is a diagram when viewed from the direction that is indicated by an arrow A in FIG. 12. FIG. 13B is a diagram when viewed from the direction that is indicated by an arrow B in FIG. 12. FIG. 14 is a diagram indicating a state that appears immediately after the daylighting film 10 according to the second embodiment is attached to the window glass pane 8.

As illustrated in FIG. 12, in the daylighting film (daylighting member) 10, protection films (protection member) 11 and 12 for protecting the front and rear sides (first surface 2*a* and second surface 2*b*) of the first base 2, respectively are provided on the first surface 2*a* side and the second surface 2*b* side of the first base 2, respectively. The protection films 11 and 12, for example, are temporarily used until the daylighting film 10 is paste-joined to the window glass pane.

The protection film 11 is provided on the first surface 2*a* side of the first base 2 in such a manner as to protect the multiple daylighting units 3. The daylighting film 10 according to the present embodiment is used in such a manner that the first surface 2*a* side of the first base 2 on which the multiple daylighting unit 3 are formed faces the internal surface 8*a* (FIG. 14) of the window glass pane 8. Because of this, a mark (index) 14 indicating pasting to the window glass pane 8 is provided on a surface 11*a* of the protection film 11. The mark 14, as illustrated in FIG. 13A, consists of a string of characters, such as "window side" and is provided on an edge of the daylighting film 10.

On the other hand, the mark 15, which provides an indication in such a manner that the first base 2 side of the daylighting film 10 is directed towards the indoor side, is provided on a surface 12*a* of the protection film 12. The mark 15, as illustrated in FIG. 13B, consists of a string of characters, such as "indoor side". The short-side direction when the user maintains the posture for reading in a normal state the string of characters that is indicated by the mark 15 is the vertical direction with respect to the daylighting film 10, and the film surface facing the user is a surface that is directed indoors.

In a case where characters whose vertical direction is stipulated by an external specification are used the marks 14 and 15 are read, the characters are described in such a manner that the vertical direction of the characters are aligned with the vertical direction of the daylighting film 10. Furthermore, for example, if the marks 14 and 15 each of which consists of a string of characters as described above are described in such a manner that the marks 14 and 15 are read from each of the first surface 2*a* side and the second surface 2*b* side in the first base 2 of the daylighting film 10, it is possible that the front and rear sides as well as the vertical direction of the daylighting film 10 are determined in an instant. Accordingly, by the direction of the daylighting film 10 is aligned in such a manner that the user reads in a normal state the characters that are the marks 14 and 15, the direction of the characters is spontaneously the vertical direction of the daylighting film 10, and is the surface (indoor) side or the rear surface (window glass pane) side. According to the present embodiment, the short-side direction of the first base 2 when the user maintains the posture for reading in a normal state the string ("window side") of characters that is indicated by the marks 14 and 15 is the vertical direction with respect to the daylighting film 10, and the side facing the user is a surface that is pasted to the window glass pane 8.

Then, when the daylighting film 10 is paste-joined to the window glass pane 8, the protection film 11 is first separated from the first base 2 of the daylighting film 10, and then, as illustrated in FIG. 14, the pasting is performed in such a manner that the adhesive portion 4 is brought into contact with the internal surface 8*a* of the window glass pane 8.

The protection film 11, as illustrated in FIG. 12, is paste-joined to the first surface 2*a* of the first base 2 through an adhesive layer 16, but the adhesive layer 16 is also separated from the first base 2 at the same time as the protection film 11 is separated. The daylighting film 10, as illustrated in FIG. 14, is paste-joined to the window glass pane 8 through the adhesive portion 4 that is exposed after the protection film 11 is separated. Moreover, the adhesive agent that is not illustrated is provided on the adhesive portion 4.

The protection film 12, like the protection film 11, is paste-joined to the second surface 2*b* of the first base 2 through the adhesive layer 16, but the adhesive layer 16 is also separated from the second surface 2*b* of the first base 2 at the same time as the protection film 12 is separated.

It is desirable that the protection film 12 is separated after one surface side (the first surface 2*a* side of the first base 2) of the daylighting film 10 is paste-joined to the window glass pane 8 (after the state that is indicated in FIG. 14 is reached). Accordingly, when a paste-joining operation is performed, damage to the second surface 2*b* side of the first base 2 or the like can be prevented.

According to the present embodiment, if the marks 14 and 15 are provided on the protection films 11 and 12 that are separated when in use, because the marks 14 and 15 have no influence on the daylighting function, the sizes or shapes of the marks 14 and 15 and places for arranging the marks 14 and 15 can be freely designed. For this reason, the marks 14 and 15 of which the size or shape is easy for the user to read can be provided, and it is possible that the user more reliably recognizes the right installation direction of the daylighting film 10 with respect to the window glass pane 8.

According to the present embodiment, the marks 14 and 15 are provided on the protection films 11 and 12 that are provided on the first surface 2a side and the second surface 2b side, respectively, of the first base 2, but the mark may be provided only on any one of the protection film. Furthermore, strings of characters that are the marks 14 and 15 are not limited to those described above. Furthermore, figures (the mark in the shape of an arrow according to the embodiment, which is described above, and the like) as well as the string of characters may be used, and if these are combined, this poses no problem. Consequently, any mark with which the user can determine the vertical direction and the front and rear sides (the paste-joining surface) of the daylighting film 10 may be available.

In a case where the daylighting film 10 according to the present embodiment, after the film body 1A (FIG. 8), as described above, is manufactured with the UV imprinting or the thermal pressing, the adhesive portion 4 is formed on the peripheral portion 2c of the first base 2. Thereafter, the daylighting film 10 is completed by pasting the protection films 11 and 12 with the separately-formed marks 14 and 15 to the first surface 2a and the second surface 2b, respectively, of the first base 2.

Moreover, as illustrated in FIG. 12, according to the present embodiment, the marks 14 and 15 are arranged in such a manner that the marks 14 and 15 partially overlaps the adhesive portion 4 when viewed from the side, but the marks 14 and 15 may be formed in such a manner that the marks 14 and 15 do not overlap the adhesive portion 4.

Moreover, according to the present embodiment, the constitution is employed in which the protection films 11 and 12 with the marks 14 and 15 are paste-joined to the first surface 2a and the second surface 2b, respectively, of the first base 2, but for example, the marks 14 may be formed using the adhesive layer 16 for paste-joining the protection film 11 to the first surface 2a side of the first base 2 on which the multiple daylighting units 3 are provided.

Third Embodiment

Next, a daylighting film 30 according to a third embodiment of the present invention is described.

A basic constitution of the daylighting film 30 according to the present embodiment, which will be described below, is approximately the same as the base constitution according to each of the embodiments, which is described above, but a constitution of a portion on which to form a mark 31 indicating the direction of the paste-joining of the daylighting film 30 with respect to the window glass pane 8 is different from the constitution according to each of the embodiments. Consequently, the constitution of the portion on which to form the mark 31 will be described in detail below and descriptions of portions in common are omitted. Furthermore, constituent elements in common, which are illustrated in FIGS. 1 to 4, are given the same reference numerals in each drawing that is referred to for description.

Figure 15:
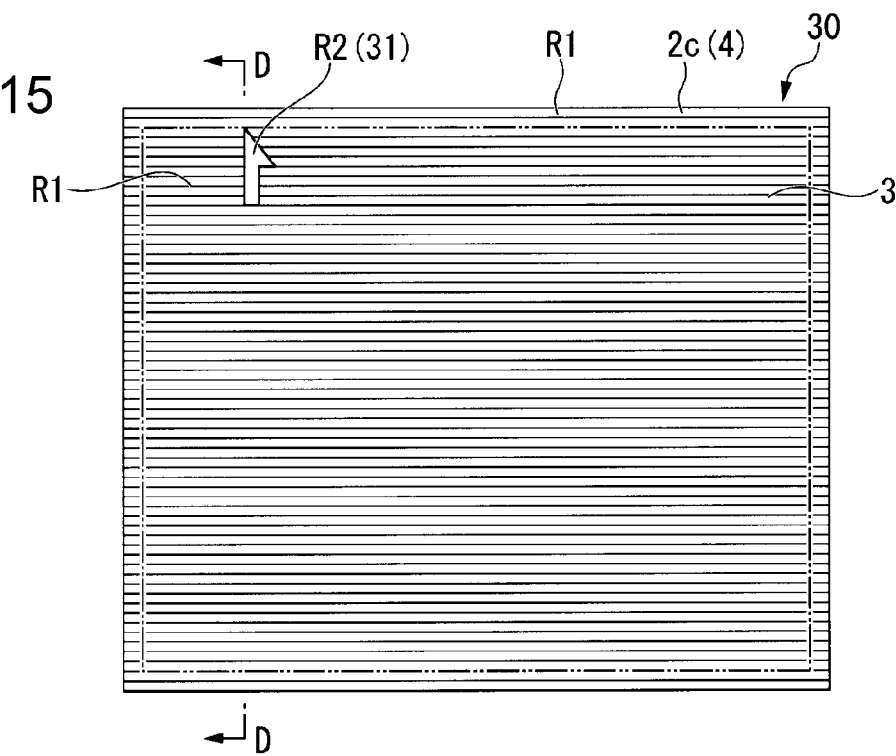
FIG. 15 is a diagram illustrating a schematic constitution of a daylighting film according to a third embodiment.
Figure 16:
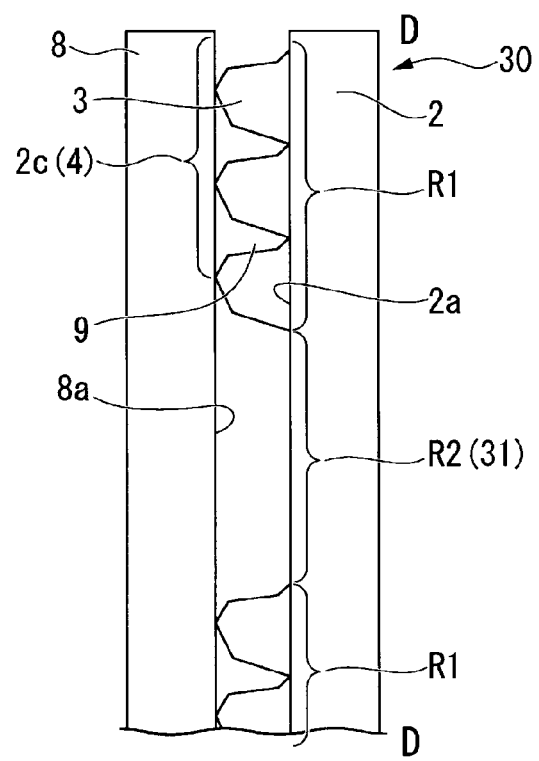
FIG. 16 is a cross-sectional diagram taken along line D-D in FIG. 15.

FIG. 15 is a diagram illustrating a schematic constitution of the daylighting film 30 according to the third embodiment. FIG. 16 is a cross-sectional diagram taken along line D-D in FIG. 15.

As illustrated as in FIGS. 15 and 16, the daylighting film (daylighting member) 30 according to the present embodiment has a first area R1 on which the multiple daylighting units 3 are formed, and a second area R2 of which the periphery is surrounded by the multiple daylighting units 3 (first area R1), which is an area that is different from the first area R1, on the first surface 2a of the first base 2. The first surface 2a of the first base 2 is in an exposed state, without the daylighting unit 3 being formed on the second area R2. According to the present embodiment, a mark (index) 31 in the shape of an arrow is formed by the second area R2. According to the present embodiment, the mark 31 in the shape of an arrow is set to be available, but the shape of the mark 31 can be suitably changed with a die-stamping pattern of the daylighting unit 3.

The constitution according to the present embodiment, it is possible that the mark 31 is formed at the same time as the multiple daylighting units 3. Because a process of forming the mark 31 independently of the daylighting unit 3 is unnecessary, a manufacturing process is shortened.

(Method of Manufacturing the Daylighting Film 30 According to the Third Embodiment)

At this point, a method is described in which the daylighting film 30 according to the third embodiment, which is described above, is manufactured with the UV imprinting.

FIGS. 17A to 17E are perspective diagrams illustrating the process of manufacturing the daylighting film 30 according to the third embodiment with the UV imprinting. Descriptions will be provided below, suitably referring to FIGS. 15 and 16.

Figure 17A:
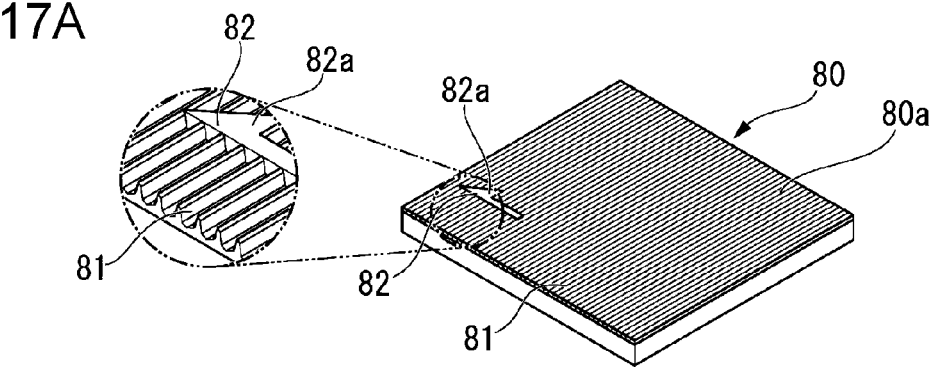
FIG. 17A is the first perspective diagram illustrating a process of manufacturing the daylighting film according the third embodiment using the UV imprinting.

First, as illustrated in FIG. 17A, a mold 80 for manufacturing the daylighting film 30 that is illustrated in FIGS. 15 and 16 is prepared. The mold 80 presents the shape of a rectangle when viewed from the side, and has multiple concavity portions 81 that correspond to the multiple daylighting units 3 (FIGS. 15 and 16) and a convexity portion 82 that corresponds to the mark 31 (FIGS. 15 and 16), on one surface (main) 80a side thereof. An area of the one surface 80a, where multiple convexity portions 82 are formed, is in the concavity and convexity shape, but a surface 82a of the convexity portion 82 is a flat surface in parallel to the one surface 80a.

Figure 17B:
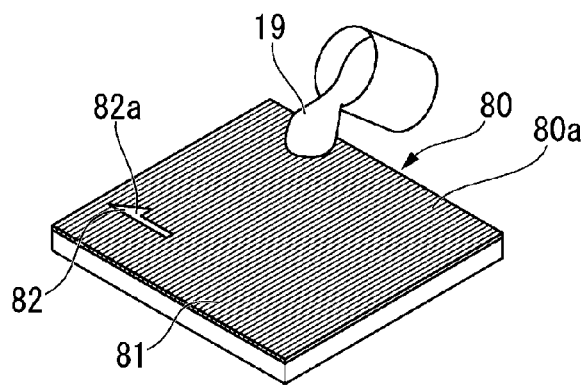
FIG. 17B is the second perspective diagram illustrating the process of manufacturing the daylighting film according the third embodiment using the UV imprinting.

Next, as illustrated in FIG. 17B, the ultraviolet-curable resin 19, such as acrylic resin, polycarbonate, or polypropylene, is supplied on the one surface 80a of the mold 80, and each of the concavity portions 81 is filled with the ultraviolet-curable resin 19.

Figure 17C:
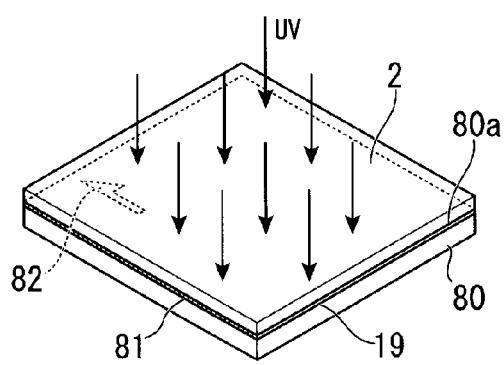
FIG. 17C is the third perspective diagram illustrating the process of manufacturing the daylighting film according the third embodiment using the UV imprinting.

Next, as illustrated in FIG. 17C, the first base 2 is mounted on the one surface 80a of the mold 80 that is coated with the ultraviolet-curable resin 19, in a manner that presses against the first base 2. Thereafter, a prescribed pressure is applied to the first base 2 towards the mold 80, and in this state, a UV light is radiated from the first base 2 side. By applying the pressure, the ultraviolet-curable resin 19 penetrates into the concavity portion 81 without any gap by capillary action. The ultraviolet-curable resin 19 cures due to the UV light that passes through the first base 2.

Figure 17D:
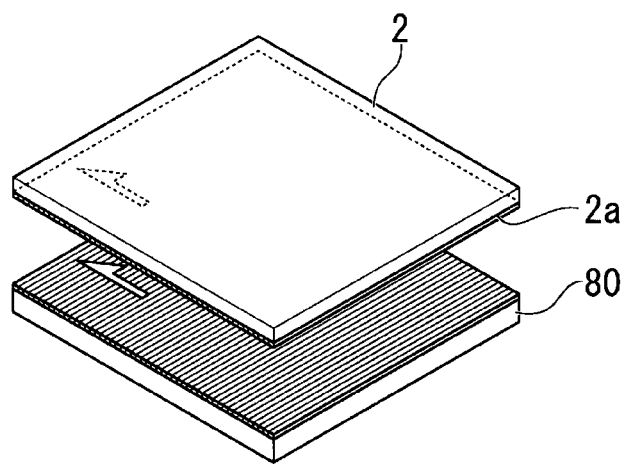
FIG. 17D is the fourth perspective diagram illustrating the process of manufacturing the daylighting film according the third embodiment using the UV imprinting.

Next, as illustrated in FIG. 17D, the first base 2 is separated from the mold 80.

Figure 17E:
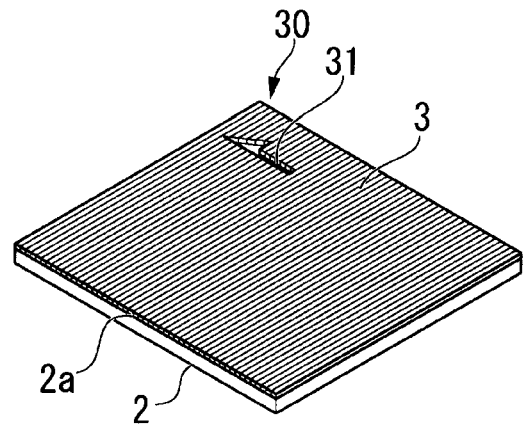
FIG. 17E is the fifth perspective diagram illustrating the process of manufacturing the daylighting film according the third embodiment using the UV imprinting.

When this is done, as illustrated in FIG. 17E, the multiple daylighting units 3 and the mark 31 that are pattern-formed by transferring the concavity and convexity shape of the mold 80 appear on the first surface 2a side of the first base 2. In this manner, the daylighting film 30 according to the third embodiment, as illustrated in FIGS. 15 and 16, is completed.

According to the present embodiment, the constitution is employed in which the mark 31 is formed by the second area R2 through which the first surface 2a of the first base 2 is partially exposed, but the first surface 2a that is exposed through the second area R2 may be coated with ink and thus the mark 31 may be colored. The mark 31 is further easily identified by selecting a color of an ink material to be used that is easy for the user to visually recognize.

[Modification Example of the Daylighting Film According to the Third Embodiment]

Figure 18:
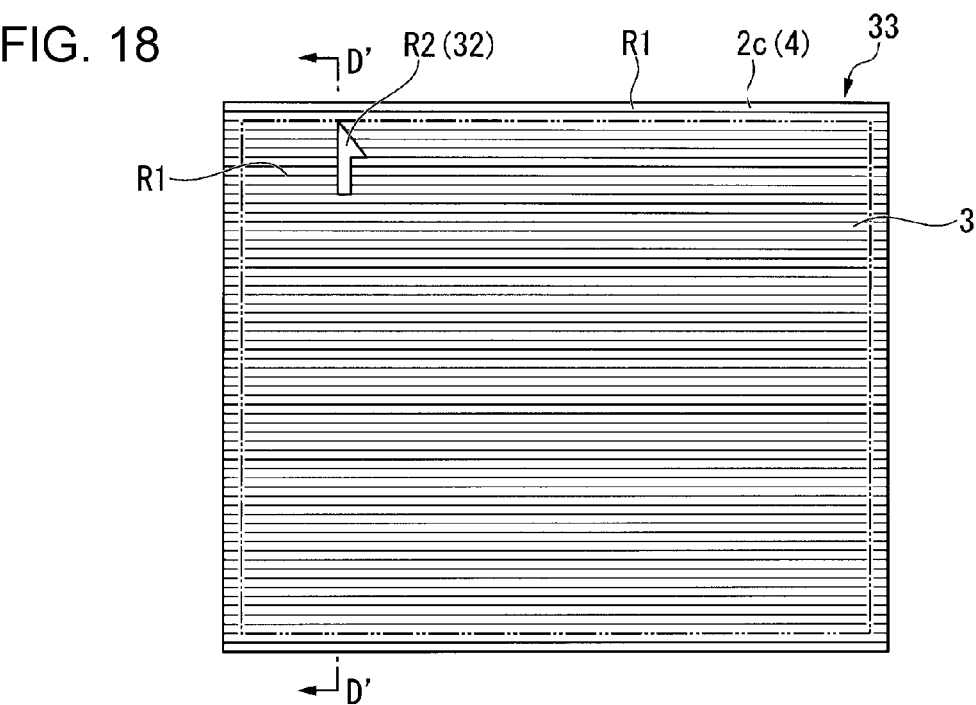
FIG. 18 is a diagram illustrating a modification example of the daylighting film according to third embodiment.
Figure 19:
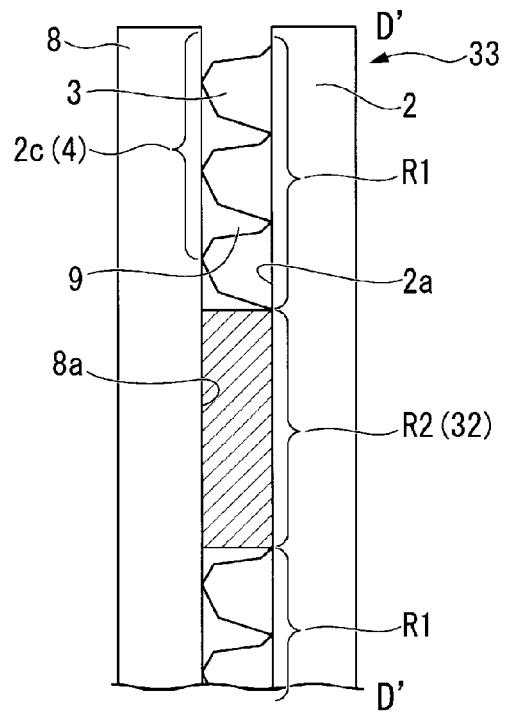
FIG. 19 is a cross-sectional diagram taken along line D'-D' in FIG. 18.

FIG. 18 is a diagram illustrating a modification example of the daylighting film according to the third embodiment. FIG. 19 is a cross-sectional diagram taken along line D'-D' in FIG. 18.

As illustrated in FIGS. 18 and 19, a daylighting film 33 has a mark (index) 32 that is formed in a convexity shape on the second area R2 described above. The mark 32 is formed on the first surface 2a, along with the multiple daylighting units 3. In the case of this constitution, because a process of forming the mark 31 independently of the daylighting unit 3 is also unnecessary, the manufacturing process is shortened.

(Different Method of Manufacturing the Daylighting Film According to the Third Embodiment)

FIGS. 20A to 20E are perspective diagrams illustrating a different process of manufacturing the daylighting film according to the third embodiment with the UV imprinting.

Figure 20A:
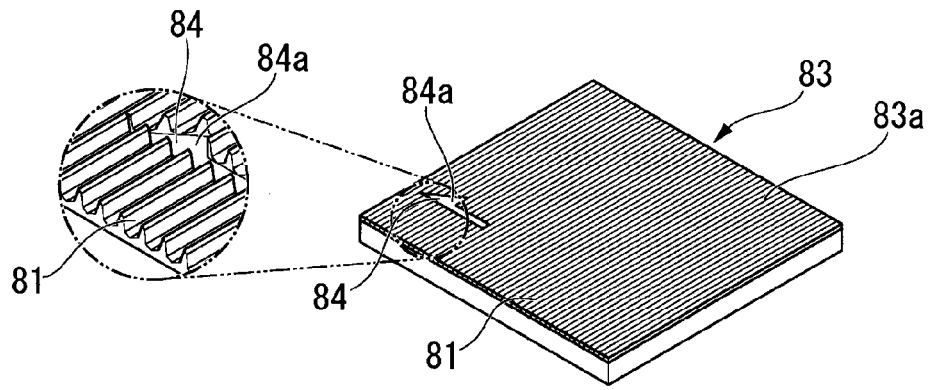
FIG. 20A is a first perspective diagram illustrating a process of manufacturing a daylighting film that is a modification example of the third embodiment using the UV imprinting.

First, as illustrated in FIG. 20A, a mold 83 for manufacturing the daylighting film 33 that is illustrated in FIGS. 18 and 19 is prepared. The mold 83 presents the shape of a rectangle when viewed from the side, and has multiple concavity portions 81 that correspond to the multiple daylighting units 3 (FIGS. 18 and 19) and a concavity portion 84 that corresponds to the mark 32 (FIGS. 18 and 19), on one surface (main) 83a side thereof. An area of the one surface 83a, where multiple concavity portions 84 are formed, is in the concavity and convexity shape, but a surface 84a of the concavity portion 84 is a flat surface in parallel to the one surface 83a.

Figure 20B:
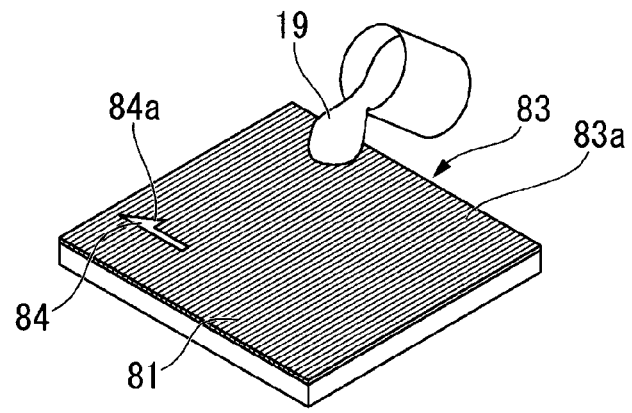
FIG. 20B is the second perspective diagram illustrating the process of manufacturing the daylighting film that is the modification example of the third embodiment using the UV imprinting.

Next, as illustrated in FIG. 20B, the ultraviolet-curable resin 19, such as acrylic resin, polycarbonate, or polypropylene, is supplied on the one surface 83a of the mold 83, and each of the concavity portions 81 and the concavity portion 84 is filled with the ultraviolet-curable resin 19.

Figure 20C:
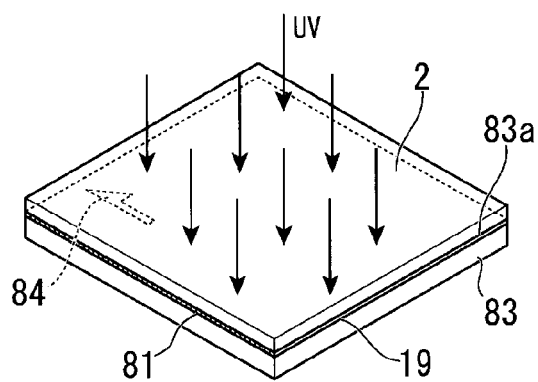
FIG. 20C is the third perspective diagram illustrating the process of manufacturing the daylighting film that is the modification example of the third embodiment using the UV imprinting.

Next, as illustrated in FIG. 20C, the first base 2 is mounted on the one surface 83a of the mold 83 that is coated with the ultraviolet-curable resin 19, in a manner that presses against the first base 2. Thereafter, a prescribed pressure is applied to the first base 2 towards the mold 83, and in this state, a UV light is radiated from the first base 2 side. By applying the pressure, the ultraviolet-curable resin 19 penetrates into the concavity portion 81 and the concavity portion 84 without any gap by capillary action. The ultraviolet-curable resin 19 cures due to the UV light that passes through the first base 2.

Figure 20D:
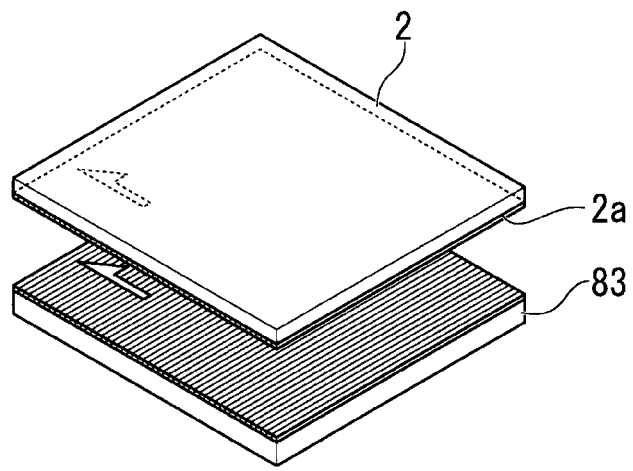
FIG. 20D is the fourth perspective diagram illustrating the process of manufacturing the daylighting film that is the modification example of the third embodiment using the UV imprinting.

Next, as illustrated in FIG. 20D, the first base 2 is separated from the mold 83.

Figure 20E:
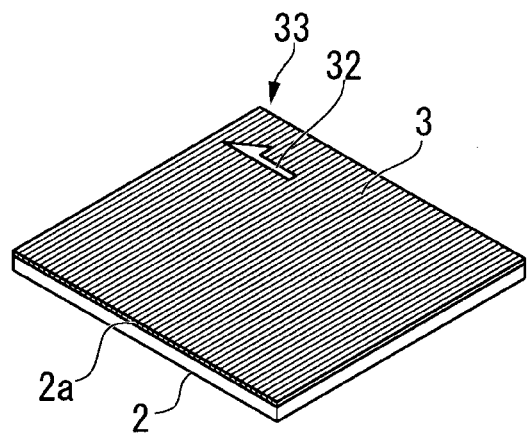
FIG. 20E is the fifth perspective diagram illustrating the process of manufacturing the daylighting film that is the modification example of the third embodiment using the UV imprinting.

When this is done, as illustrated in FIG. 20E, the multiple daylighting units 3 and the mark 32 that are pattern-formed by transferring the concavity and convexity shape of the mold 83 appear on the first surface 2a side of the first base 2. In this manner, the modification example of the daylighting film 33 according to the third embodiment, as illustrated in FIGS. 18 and 19, is completed.

Fourth Embodiment

Next, a daylighting film 40 of a fourth embodiment of the invention will be described.

A basic constitution of the daylighting film 40 according to the present embodiment, which will be described below, is approximately the same as the base constitution according to each of the embodiments, which is described above, but a constitution of a portion on which to form a mark 41 indicating the direction of the paste-joining of the daylighting film 40 with respect to the window glass pane 8 is different from the constitution according to each of the embodiments. Consequently, the constitution of the portion on which to form the mark 41 will be described in detail below and descriptions of portions in common are omitted. Furthermore, constituent elements in common, which are illustrated in FIGS. 1 to 4, are given the same reference numerals in each drawing that is referred to for description.

Figure 21:
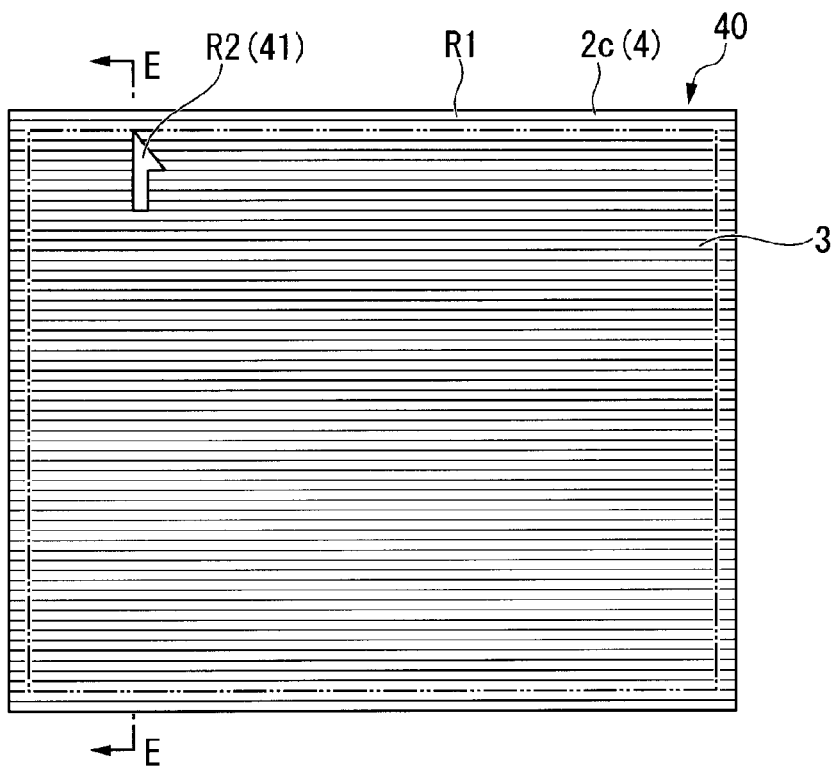
FIG. 21 is a diagram illustrating a schematic constitution of a daylighting film according to a fourth embodiment.
Figure 22:
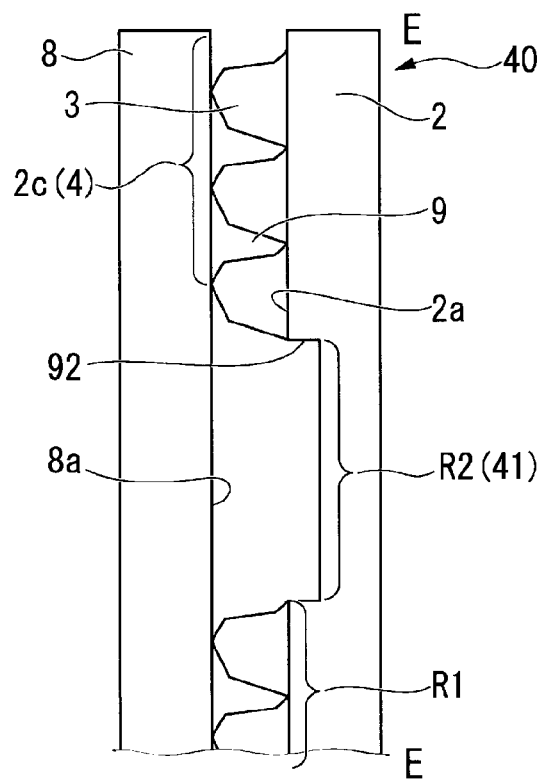
FIG. 22 is a cross-sectional diagram taken along line E-E in FIG. 21.

FIG. 21 is a diagram illustrating a schematic constitution of the daylighting film 40 according to the fourth embodiment. FIG. 22 is a cross-sectional diagram taken along line E-E in FIG. 21.

As illustrated as in FIGS. 21 and 22, the daylighting film (daylighting member) 40 according to the present embodiment has the first area R1 on which the multiple daylighting units 3 are formed, and the second area R2 of which the periphery is surrounded by the multiple daylighting units 3 (first area R1), on the first surface 2a of the first base 2. In the same manner as in the third embodiment described above, the daylighting unit 3 is not formed on the second area R2. A concavity portion 42 is formed in the direction of the thickness of the first base 2 on the second area R2 according to the present embodiment. With the concavity portion 42, the mark (index) 41 in the shape of an arrow indicating the direction of the installation of the daylighting film 40 with respect to the window glass pane 8 is formed.

The concavity portion 42 that is the mark 41 may be formed by cutting off a portion of the first surface 2a of the first base 2 on which the multiple daylighting units 3 are formed, and may be formed using the mold at the same time as the multiple daylighting units 3.

Furthermore, the colored mask 41 may be set to be available by the concavity portion 42 being coated with ink. Alternatively, the mark 41 may be constituted as a through hole that is formed by forming the second area R of the first base 2 by performing a die-stamping process.

Fifth Embodiment

Next, a daylighting film 50 of a fifth embodiment of the invention will be described.

A basic constitution of the daylighting film 50 according to the present embodiment, which will be described below, is approximately the same as the base constitution according to each of the embodiments, which is described above, but a constitution of a portion on which to form a mark 51 indicating the direction of the paste-joining of the daylighting film 50 with respect to the window glass pane 8 is different from the constitution according to each of the embodiments. Consequently, the constitution of the portion on which to form the mark 51 will be described in detail below and descriptions of portions in common are omitted. Furthermore, constituent elements in common, which are illustrated in FIGS. 1 to 4, are given the same reference numerals in each drawing that is referred to for description.

Figure 23:
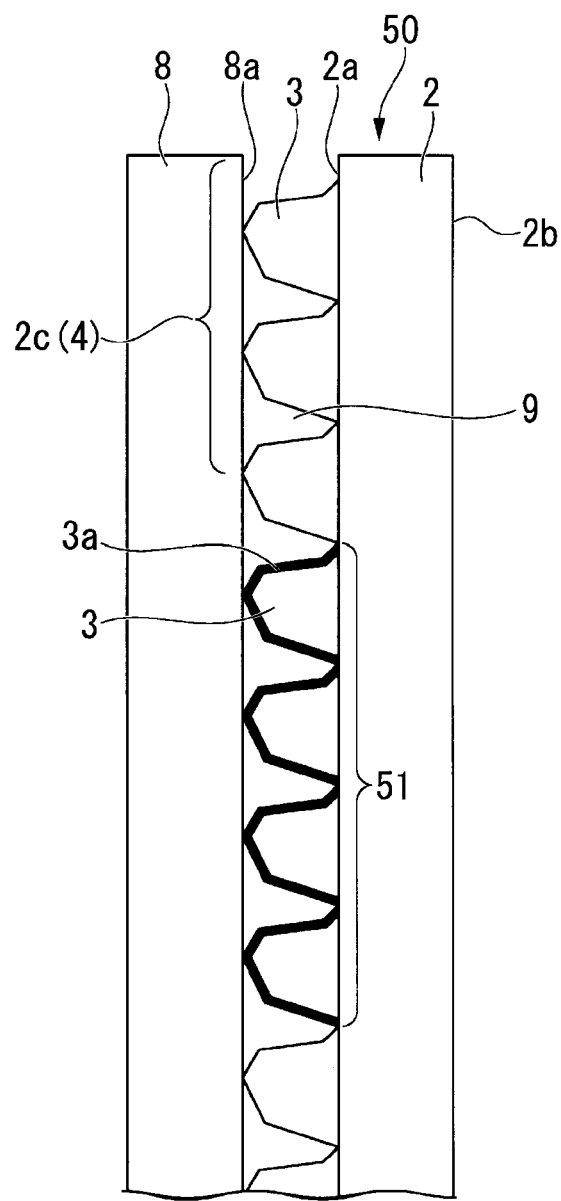
FIG. 23 is a diagram illustrating a schematic constitution of a daylighting film according to a fifth embodiment.

FIG. 23 is a cross-sectional diagram illustrating a schematic constitution of the daylighting film 50 according to the fifth embodiment.

As illustrated in FIG. 23, the daylighting film (daylighting member) 50 according to the present embodiment includes the mark (index) 51. The mark 51 is formed by some daylighting units 3 of which surfaces 3a result from partial coloring, among the multiple daylighting units 3 that are formed on the first base 2. Translucent ink may be available as ink that is used for the mark 51 and opaque ink may be available, but when it comes to a color of the ink, a color that is easy for the user to visually recognize is selected.

Sixth Embodiment

Next, a daylighting film 60 of a sixth embodiment of the invention will be described.

A basic constitution of the daylighting film 60 according to the present embodiment, which will be described below, is approximately the same as the base constitution according to each of the embodiments, which is described above, but a constitution of a portion on which to form a mark 66 indicating the direction of the paste-joining of the daylighting film 60 with respect to the window glass pane 8 is different from the constitution according to each of the embodiments. Consequently, the constitution of the portion on which to form the mark 66 will be described in detail below and descriptions of portions in common are omitted. Furthermore, constituent elements in common, which are illustrated in FIGS. 1 to 4, are given the same reference numerals in each drawing that is referred to for description.

Figure 24:
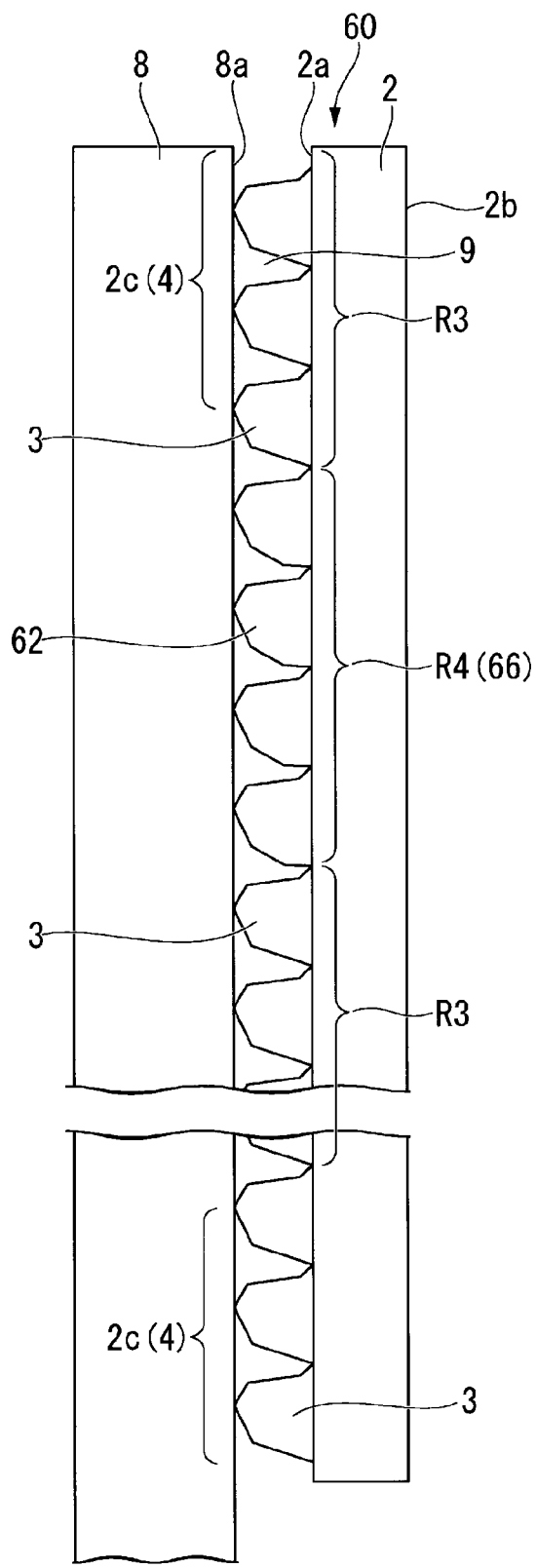
FIG. 24 is a diagram illustrating a schematic constitution of a daylighting film according to a sixth embodiment.

FIG. 24 is a cross-sectional diagram illustrating a schematic constitution of the daylighting film 60 according to the sixth embodiment.

Figure 25:
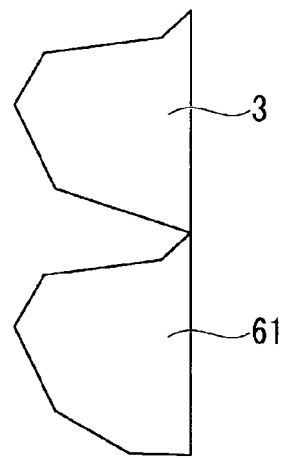
FIG. 25 is a diagram illustrating shapes of cross sections of a first daylighting unit and a second daylighting unit according to the sixth embodiment.

FIG. 25 is a diagram illustrating shapes of cross sections of the first daylighting unit 3 and a second daylighting unit 62 according to the sixth embodiment.

As illustrated in FIGS. 24 and 25, the daylighting film (daylighting member) 60 according to the sixth embodiment has the multiple daylighting units (first daylighting units) 3 and multiple daylighting units (second daylighting units) 62 each of which has a different light control characteristic than the daylighting unit 3. The multiple first daylighting units 3 are formed on a first area R3 of the first surface 2a of the first base 2, and light that is incident from the window glass pane 8 side is emitted towards the indoor ceiling.

On the other hand, the multiple second daylighting units 62 are formed on a second area R4 other than the first area R3 on which the first daylighting unit 3 is formed, which is one portion of the first surface 2a. The second area R4 on which the second daylighting unit 62 is formed is a small area when compared with the first area R3 on which the first daylighting unit 3 is formed, and is positioned in the upward direction of the daylighting film 60.

The daylighting film 60 according to the present embodiment has the mark (index) 66 that is constituted by the multiple second daylighting units 62 which are formed the second area R4.

The second daylighting unit 62 that constitutes the mark 66, like the first daylighting unit 3, has a function of emitting light being incident from the window glass pane 8 side towards the indoor ceiling, but emits light at a different angle than an angle at which light is emitted from the first daylighting unit 3. Specifically, the first daylighting unit 3, as illustrated in FIG. 25, is in the shape of a polygon, the shape of the cross section shape of which has 6 vertexes, and the second daylighting unit 62 is in the shape of a polygon, the shape of a cross section of which has seven vertexes. This difference in shape causes emission directions of each light, which passes through the first daylighting unit 3 and the second daylighting unit 62, to be different from each other.

Figure 26:
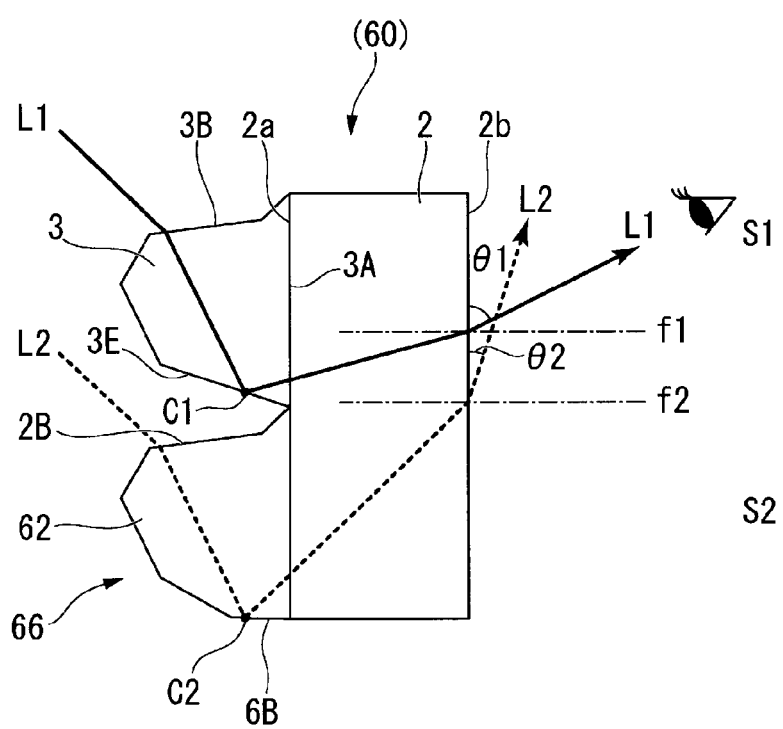
FIG. 26 is a diagram illustrating an optical path for light that is incident on the first daylighting unit and the second daylighting unit in the daylighting film.

FIG. 26 is a diagram illustrating an optical path for light that is incident on the first daylighting unit 3 and the second daylighting unit 62 in the daylighting film 60. FIG. 27A is a diagram illustrating the mark 66 that appears when the daylighting film 60 is viewed from a prescribed direction.

For the convenience of description, a point on the surface 3E (reflective surface) of the first daylighting unit 3 and a point on a surface 6B (reflective surface) of the second daylighting unit 62, on which an arbitrary beam of light is incident, among lights that are incident on the daylighting units 61 and 62, respectively, that are illustrated in FIG. 26, are defined as incidence points C1 and C2. Imaginary lines that pass through the incidence points C1 and C2, respectively, and orthogonally intersect the first surface 2a of the first base 2 are defined as straight lines f1 and f2, respectively. Among two spaces that borders a horizontal surface including the straight lines f1 and f2, a space on the side on which the light being incident on the incidence points C1 and C2 is present is defined as a first space S1 and a space on the side on which the light being incident on the incidence point C1 and C2 is not present is defined as a second space S2.

As illustrated in FIG. 26, a light L1 that is incident from the surface 3B of the first daylighting unit 3 totally reflects off the surface 3E, propagates in the oblique direction, that is, towards the first space S1 side, and is emitted from the second surface 2b of the first base 2. On the other hand, a light L2 that is incident from the surface 2B of the second daylighting unit 62 that makes the mark 66 totally reflects off the surface 6B, propagates in the oblique direction, that is, towards the first space S1 side, and is emitted from the second surface 2b of the first base 2. At this time, the emission light L2 is emitted at an acuter angle with respect to the second surface 2b of the first base 2 than the emission light L1. That is, an emission angle θ2 of the emission light L2 with respect of the second surface 2b of the first base 2 is smaller than an emission angle θ1 of the emission light L1 with respect to the second surface 2b of the first base 2 (θ1>θ2). For this reason, in a case where the user views the daylighting film 60 from the direction that is illustrated in the drawing, because the light L2 that is emitted from the second daylighting unit 62 is not incident on the eyes of the user, an area on which the second daylighting unit 62 is formed feels partially dark. The area that feels dark functions as the mark 66.

The second daylighting unit 62 extends in the direction perpendicular to the surface of the drawing. For this reason, only in a case where the daylighting film 60, as illustrated in FIG. 26, is viewed from a prescribed angle, a straight line appears in the longitudinal direction of the daylighting film 60 as illustrated in FIG. 27A. In the daylighting film 60 according to the present embodiment, this straight line is used the mark 66. If the second daylighting unit 62 is formed in such a manner that the mark 66 appears at a place that is in the upward direction of the daylighting film 60, by being informed of this information, the user can set the direction in which the mark 66 appears when using the film, to be the upward direction, and can paste-join the daylighting film 60 to the window glass pane 8. By paste-joining the daylighting film 60 to the window glass pane 8 in such a manner that the surface facing the user is directed indoors when the user can visually recognize the mark 66, as illustrated in FIG. 24, the user can perform the paste-joining in a state where the first surface 2a side on which the first daylighting unit 3 and the second daylighting unit 62 are formed is directed towards the internal surface 8a of the window glass pane 8.

Light that passes through the multiple second daylighting units 62 is emitted towards the space S1 side in the upward direction that is illustrated in FIG. 26, that is, towards the indoor ceiling. For this reason, the light that passes through the second daylighting unit 62 that constitutes the mark 66 is not light that causes the persons Ma and Mb in the room 1006 as illustrated in FIG. 5 to feel dazzled.

Moreover, the shape of the cross section of the second daylighting unit 62 is not limited to that illustrated. If a shape in which the light that passes through the second daylighting unit 62 is not glare light is assumed, this does not pose particularly a problem. For example, although a shape in which light is emitted towards an area F that is close to the side wall 1004 of the room 1006 that is illustrated in FIG. 5 is assumed, this poses no problem.

Furthermore, according to the present embodiment, the constitution is employed in such a manner that a straight line that appears when the daylighting film 60 is viewed from a prescribed direction is the mark 66, but the shape of the mark 66 that appears is not limited to this. For example, a constitution may be employed in such a manner that a mark in the shape of an arrow indicating the upward direction of the daylighting film 60 appears. As illustrated in FIG. 27B, if in the first surface 2a of the first base 2, the second area R4 on which the second daylighting unit 62 is configured to be in the shape of an arrow when viewed from the side and an area other than the second area R4 is configured to be the first area R3 on which the first daylighting unit 3 is formed, a mark 67 in the shape of an arrow appears when the daylighting film 60, as illustrated in FIG. 27C, is viewed from a prescribed direction.

As described above, according to the present embodiment, the mark 66 is formed with the second daylighting unit 62 that takes a different shape of the cross section than the daylighting unit (first daylighting unit) 3, but according to the other embodiments, it is also possible that a light direction (emission angle) in a portion of the mark 66 is changed.

FIGS. 28A to 28D are cross-sectional diagrams each illustrating a modification example of a mark according to the sixth embodiment.

Figure 28A:
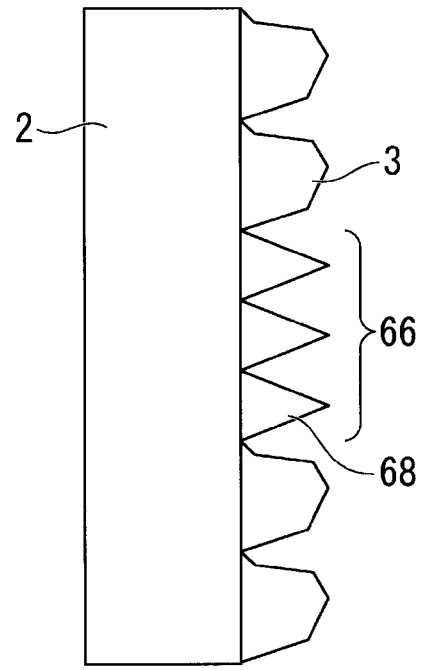
FIG. 28A is a cross-sectional diagram illustrating a first modification example of a mark according to the sixth embodiment.

According to the sixth embodiment described above, as illustrated in FIG. 24, the mark 66 is constituted as the second daylighting unit 62, the cross section of which is in the direction intersecting the longitudinal direction and takes the shape of a heptagon, but no limitation to this is imposed. For example, as illustrated in FIG. 28A, the mark 66 may be constituted as the daylighting unit (third daylighting unit) 68, the shape of the cross section of which is in the direction intersection the longitudinal direction, and presents an isosceles triangle.

Figure 28B:
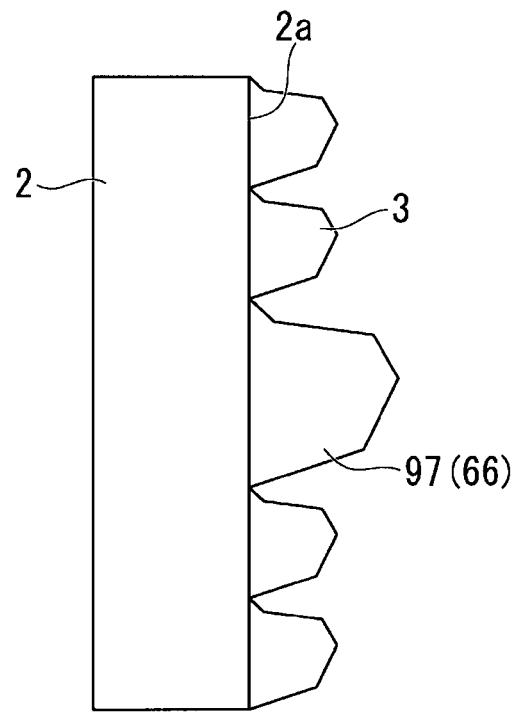
FIG. 28B is a cross-sectional diagram illustrating a second modification example of the mark according to the sixth embodiment.
Figure 28C:
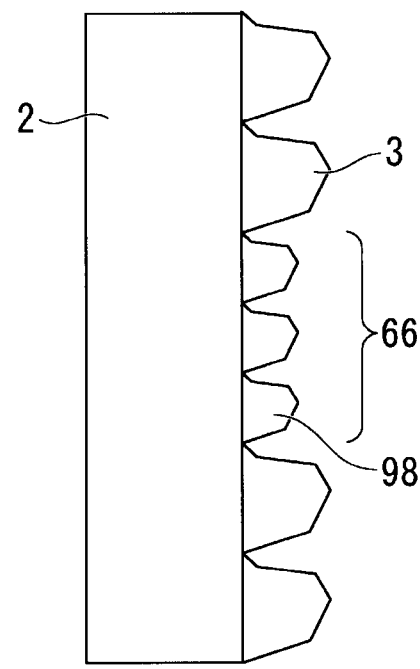
FIG. 28C is a cross-sectional diagram illustrating a third modification example of the mark according to the sixth embodiment.

For example, as illustrated in FIG. 28B, the mark 66 may be constituted using the daylighting unit (third daylighting unit) 97 that has a different dimension than the daylighting unit 3. As is the case with the daylighting unit 3, the cross section of the daylighting unit 97, which is in the direction that orthogonally intersects the longitudinal direction, is in the shape of a hexagon, but the cross-sectional area of the daylighting unit 97, which is in the direction that orthogonally intersects the longitudinal direction, is greater than the cross-sectional area of the daylighting unit 3. Alternatively, as illustrated in FIG. 28C, the mark 66 may be constituted by arranging multiple daylighting units (third daylighting units) 98, of which the cross-sectional area are in the direction that orthogonally intersects the longitudinal direction and are smaller than the cross area of the daylighting unit 3.

Figure 28D:
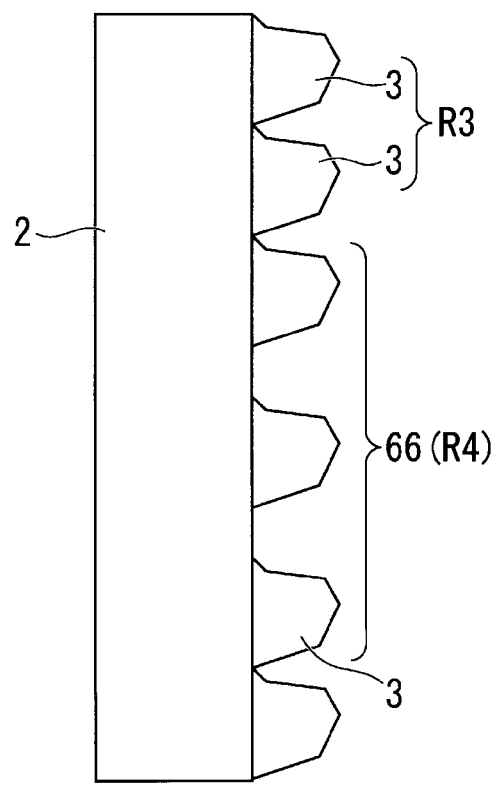
FIG. 28D is a cross-sectional diagram illustrating a fourth modification example of the mark according to the sixth embodiment.

Furthermore, as illustrated in FIG. 28D, the mark 66 may be constituted as the multiple daylighting units 3 that are arranged at spaced intervals relative to one another in the indoor ceiling. In the first area R3 other than the second area R4, the multiple daylighting units 3 are provided in a state of being adjacent to one another. In this manner, with the first areas R3 and the second area R4, the spaced intervals at which the multiple daylighting units 3 are arranged relative to one another may be changed.

Seventh Embodiment

Next, a daylighting film 70 according to a seventh embodiment of the invention will be described.

A basic constitution of the daylighting film 70 according to the present embodiment, which will be described below, is approximately the same as the base constitution according to each of the embodiments, which is described above, but a constitution of a portion on which to form a mark 71 indicating the direction of the paste-joining of the daylighting film 70 with respect to the window glass pane 8 is different from the constitution according to each of the embodiments. Consequently, the constitution of the portion on which to form the mark 71 will be described in detail below and descriptions of portions in common are omitted. Furthermore, constituent elements in common, which are illustrated in FIGS. 1 to 4, are given the same reference numerals in each drawing that is referred to for description.

Figure 29:
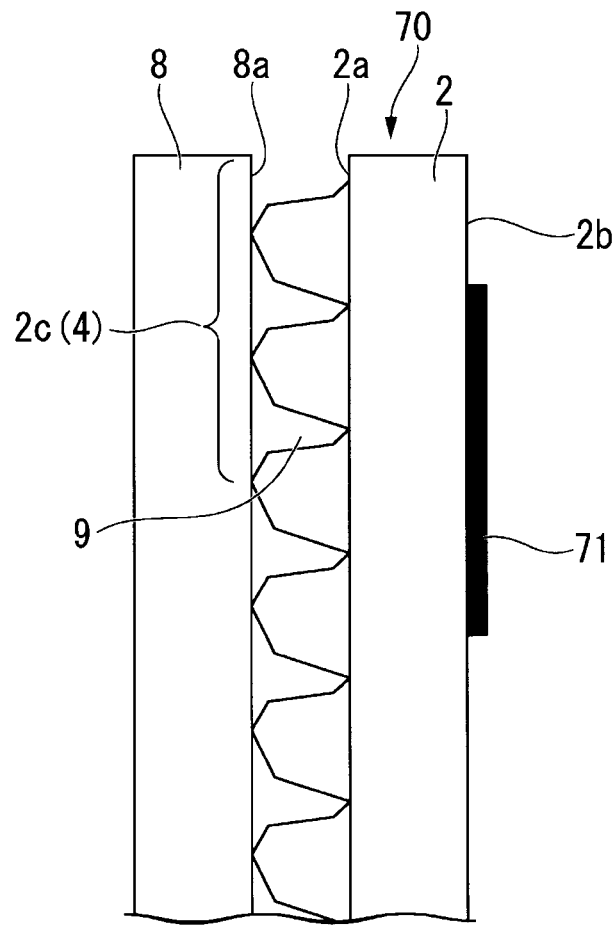
FIG. 29 is a diagram illustrating a schematic constitution of a daylighting film according to a seventh embodiment.

FIG. 29 is a cross-sectional diagram illustrating a schematic constitution of the daylighting film 70 according to the seventh embodiment.

As illustrated in FIG. 29, in the daylighting film (daylighting member) 70, the mark (index) 71 is provided directly on the second surface 2b side of the first base 2, more precisely, on the indoor side of the first base 2. The mark 71 is drawn directly on the second surface 2b of the first base 2 using an inkjet printer, a dispenser, or the like. The mark 71 is so large in size that the user can visually recognize the mark 71 itself and is formed to be so large in size that a daylighting function of the daylighting film 70 does not malfunction.

In this manner, by drawing the mark 71 directly on the second surface 2b side of the first base 2, an installed state of the daylighting film 70 can be checked even after the daylighting film 70 is paste-joined to the window glass pane 8.

Moreover, in addition to drawing the mark 71 directly on the second surface 2b of the first base 2 using the inkjet printer, the dispenser, or the like, an attachment seal that is formed separately may be pasted, as the mark 71, directly on the second surface 2b.

Figure 30A:
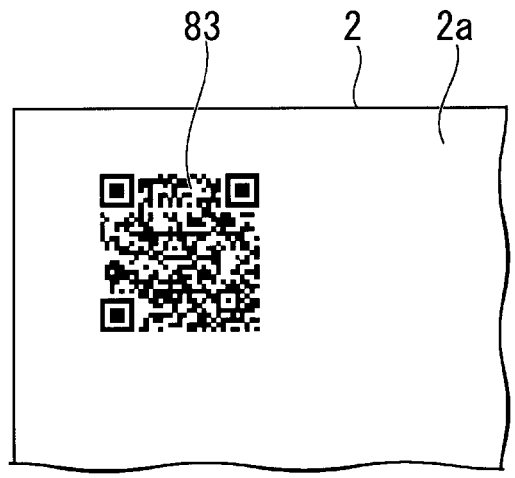
FIG. 30A is a cross-sectional diagram illustrating a first modification example of the mark.
Figures 30B, 31:
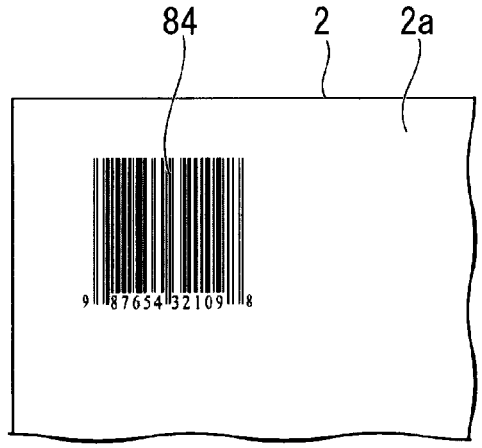
FIG. 30B is a cross-sectional diagram illustrating a second modification example of the mark.
FIG. 31 is a diagram illustrating a different example of a shape of the mark.

FIGS. 30A and 30B are diagrams each illustrating a modification example of the mark. FIG. 31 is a diagram illustrating an example of the shape of the mark.

In each of the embodiments described above, in a case where with the direct drawing, the mark is formed on the first base 2 or the protection films 11 and 12, in a case where the mark in the shape of a seal, which is formed with the separate printing is used, or so on, data codes including a two-dimensional code and a bar code may be used as the mark. With a mark (index) 83 that uses a two-dimensional code as illustrated in FIG. 30A and a mark (index) 84 that uses a bar code as illustrated in FIG. 30B, it is possible that a more amount of information than usual is provided. As contents of the information, for example, there are information for a maker, information for a building contractor, and information for a user.

As the formation for the maker and the information for the building contractor, for example, there are a production date and time, a production place, a mold number, a mold maker, a product lot number, and the like, of a daylighting film. These pieces of information are read from the mark. Thus in a case where a defective product is found, because what maker manufactures the defective product is readily known, the information on the defective product can be used for quality control. Moreover, in a case where a data code for distinguishing among product lots is used as the mark, the data code may be created with an ink-jet method or the like, not with a manufacturing method that uses a mold.

Furthermore, as the information for the building contractor, there is information indicating the attachment direction at the time of installing the daylighting film to the window glass pane. More precisely, not only information indicating the direction in which the daylighting member is paste-joined to the window glass pane in the position of the mark (data code) on the daylighting film, but pieces of information on other products may be also included, as attachment information (installation information), in the data code.

Furthermore, as the information for the user, there are a layout example or an application case of a daylighting film, user BBS, a similar product, corporate information, and the like. Furthermore, the reading of the mark is made to lead to a link to a dedicated site and so on, and thus information can be shared with other users.

Furthermore, because the Sun's position changes at all times due to the Earth's rotation and revolution, an incident angle of the sunlight on the window glass pane changes with a direction in which a window is installed, or with season. In the case of a window that is positioned in a direction in which it is difficult for outdoor light to travels indoors, or in a season in which it is difficult for the outdoor light to travel indoors, it is preferable that various types of daylighting films which are suitably designed according to each condition are prepared in such a manner that, by installing the daylighting film, it is possible that as much more outdoor light travels indoors. In this case, there is a need to provide the mark in such a manner that the user can easily recognize a type of daylighting film.

In order to determine a daylighting film suitable for each direction in which a window glass pane is positioned, for example, as illustrated in FIG. 31, an initial English letter meaning each direction, such as "E" for an east-facing window, "W" for a west-facing window, or "S" for a south-facing window, may be employed as the mark. Furthermore, in order to determine a daylighting film suitable for each season, for example, as illustrated in FIG. 31, an English abbreviation word meaning each season, such as "Spr" for spring, "Sum" for summer, "Aut" for autumn, and "Win" for winter, may be employed as the mark.

Moreover, the user may paste the most daylighting suitable for each season to one window glass pane in a changed manner, but may install in advance a daylighting film that corresponds particularly to a season in which the user wants for the outdoor light to efficiently travel indoors.

Eight Embodiment

Next, a daylighting film 90 of an eighth embodiment of the invention will be described.

A basic constitution of the daylighting film 90 according to the present embodiment, which will be described below, is approximately the same as the base constitution according to each of the embodiments, which is described above, but a constitution of a portion on which to form a mark 91 indicating the direction of the paste-joining of the daylighting film 90 with respect to the window glass pane 8 is different from the constitution according to each of the embodiments. Consequently, the constitution of the portion on which to form the mark 91 will be described in detail below and descriptions of portions in common are omitted. Furthermore, constituent elements in common, which are illustrated in FIGS. 1 to 4, are given the same reference numerals in each drawing that is referred to for description.

Figure 32A:
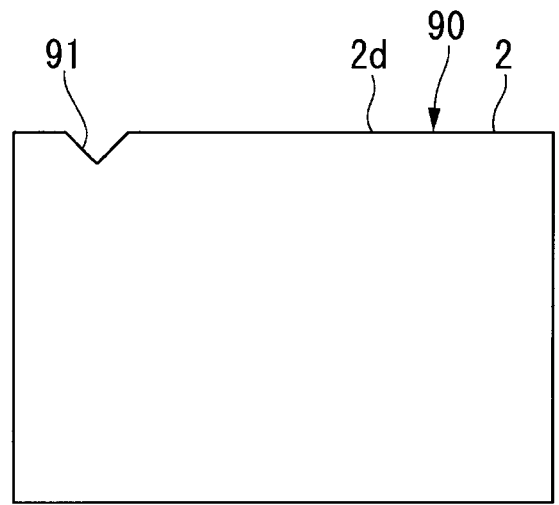
FIG. 32A is a diagram illustrating a schematic constitution of a daylighting film according to an eighth embodiment.

FIG. 32A is a diagram illustrating a schematic constitution of the daylighting film 90 according to the eighth embodiment.

As illustrated in FIG. 32A, in the daylighting film (daylighting member) 90, the mark 91 is formed with a notch portion that results from cutting off a portion of one side 2d of the first base 2. The side on which the mark 91 is formed is in the upward direction of the daylighting film 90. In this manner, the mark (index) 91 that is expressed by an external shape of the first base 2 may be employed.

It is desirable that for the mark 91, the position of the center of one side 2d of the first base 2 is designed to be avoided in such a manner that the first base 2 is not in the shape that is symmetrical vertically about the center. Accordingly, it is possible that the front and rear sides of the daylighting film 90 are determined.

Figure 32B:
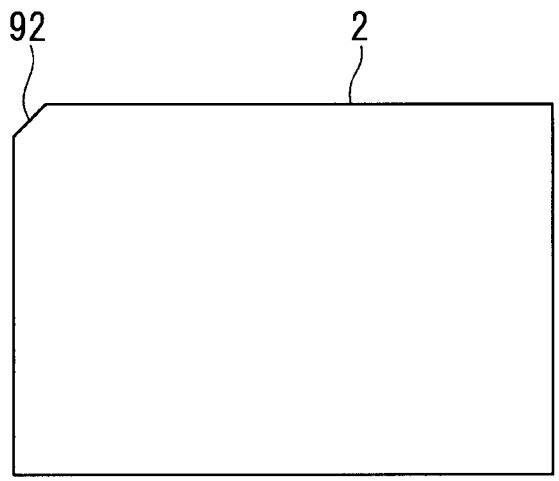
FIG. 32B is a diagram illustrating a modification example of the mark in the daylighting film according to the eighth embodiment.

Moreover, according to the present embodiment, a portion of one side 2d of the first base 2 is cut off in such a manner that the notch portion in the shape of a triangle when viewed from the side, but no limitation to this is imposed. Although the notch portion is in the shape of a semicircle or a rectangle when viewed from the side, this poses no problem. Furthermore, as long as the second base 2 is not in the shape that is symmetrical horizontally about the center, the notch portion is also not limited to the place described above. For example, as illustrated in FIG. 32B, one edge portion of the first base 2 may be cut off and thus the mark (notch portion) 92 may be formed that indicates the upward direction of the daylighting film 90.

Figure 33:
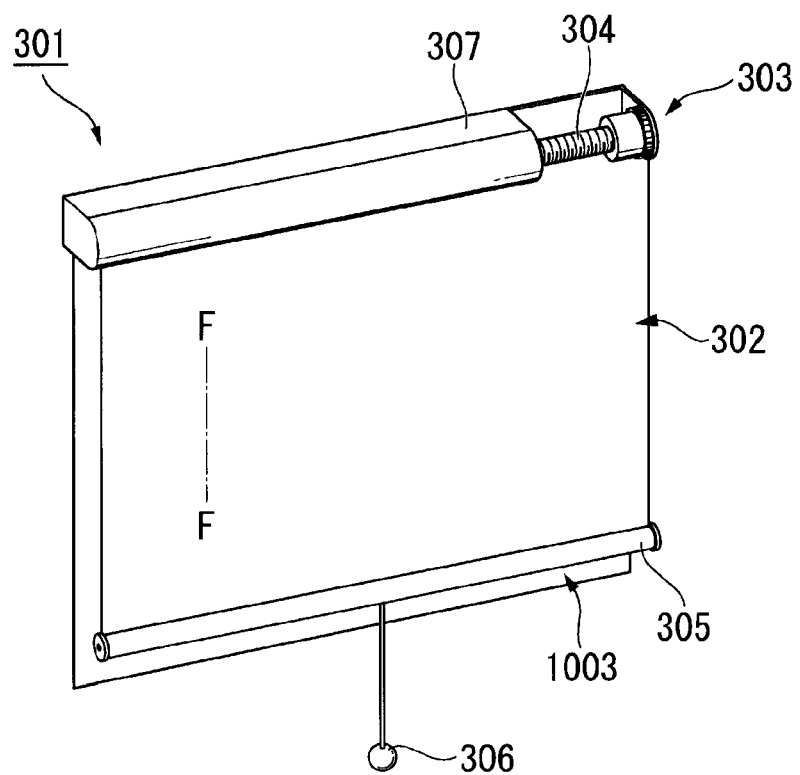
FIG. 33 is a perspective diagram illustrating a schematic constitution of a rolling screen according to a ninth embodiment.
Figure 34:
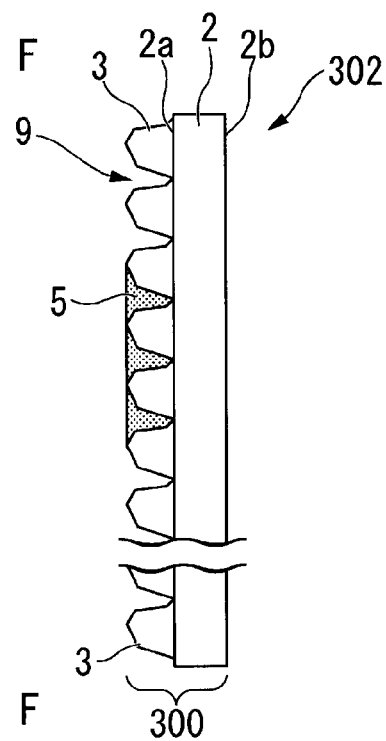
FIG. 34 is a cross-sectional diagram taken along line F-F in the rolling screen that is illustrated in FIG. 33.

Ninth Embodiment (Rolling Screen)
Next, according to a ninth embodiment of the invention, for example, a rolling screen (daylighting device) 301 that is illustrated in FIGS. 33 and 34 will be described.

Moreover, FIG. 33 is a perspective diagram illustrating a schematic constitution of a rolling screen 301. FIG. 34 is a cross-sectional diagram taken along line F-F in the rolling screen 301 that is illustrated in FIG. 33. Furthermore, a description of a component that is equivalent to that of the daylighting film described above will be hereinafter omitted below, and thus such components will be given the same reference numerals in the drawings.

As illustrated in FIGS. 33 and 34, the rolling screen 301 includes a daylighting screen 302 and winding mechanism 303 that supports the daylighting screen 302 in such a manner that the daylighting screen 302 is freely wound up.

The daylighting screen 302, as illustrated in FIG. 34, includes a daylighting member 300, which includes the first base 2 in the shape of a film (in the shape of a sheet) that has optical transparency, the multiple daylighting units 3 that are formed in a row in parallel to the first surface 2a of the first base 2, and the multiple opening spaces 9 each of which are formed between each of the multiple daylighting units 3, and allows the outdoor light to travel indoor through the daylighting member 300.

At this point, as the daylighting screen 302 (daylighting member 300), basically the same structure as that of the daylighting film 1 according to the first embodiment is employed, but the same structure as that of the daylighting film according to any one of the embodiments, which is described above, can be employed. However, the thickness of the first base 2 is a thickness suitable for the rolling screen 301. Furthermore, the adhesive portion 4 is omitted, and a resin material that does not have adhesive properties is used for a filling material that constitutes the mark 5.

As illustrated in FIG. 33, the winding mechanism 303 includes a core (a support member or an installation-occurring object) 304 that is attached along an upper end portion of the daylighting screen 302, a lower pipe 305 (a support member or an installation-occurring object) that is attached a lower end portion of the daylighting screen 302, a pulling cord 306 that is attached to the center of the lower end portion of the daylighting screen 302, and an accommodation case 307 that accommodates the daylighting screen 302 that is wound around the core 304.

It is possible that the winding mechanism 303, as a pull-cord type, holds the daylighting screen 302 in place at a pulling position up to which the daylighting screen 302 is pulled, or, by again putting the pulling cord 306 at the pulling position to release the daylighting screen 302, automatically winds the daylighting screen 302 around the core 304. Moreover, the winding mechanism 303 is not limited to the pull-cord type, and may be a chain-type winding mechanism that rotates the core 304, an automatic-type winding mechanism that rotates the core 304 with a motor, or the like.

As illustrated in FIG. 33, in a state where the accommodation case 307 is fixed on the upper portion of a window glass pane 1003, the rolling screen 301 that has the constitution described above is used in a state where the daylighting screen 302 faces the internal surface of the window glass pane 1003, while the daylighting screen 302 that is accommodated in the accommodation case 307 is pulled with the pulling cord 306. At this time, the daylighting screen 302 is positioned in such a manner that a direction in which the multiple daylighting units 3 are in a row with respect to the window glass pane 1003 is consistent with the perpendicular direction (vertical direction) of the window glass pane 1003. More precisely, the daylighting screen 302 is positioned in such a manner that the longitudinal direction of the multiple daylighting units 3 with respect to the window glass pane 1003 is consistent with the transverse direction (horizontal direction) of the window glass pane 1003.

The daylighting screen 302 facing the internal surface of the window glass pane 1003 radiates light that is incident indoors through the window glass pane 1003, towards the indoor ceiling while changing the propagation direction of the light with the multiple daylighting units 3. Furthermore, because the light that is directed towards the ceiling the light is reflected off the ceiling and illuminates the inside of a room, the reflected light substitutes for the illumination light. Therefore, in a case where the rolling screen 301 is used, an energy saving effect can be expected in which lighting fixtures in a building consumes less energy during the daytime.

As described above, the daylighting screen 302 (daylighting member 300) of the rolling screen 301 according to the present embodiment has the same constitution as that of the daylighting film according to any one of the embodiments, which is described above.

For this reason, in a manufacturing stage, when the core 304 is attached along the upper end portion of the daylighting screen 302, or when the core 304 is attached along the lower end portion of the daylighting screen 302, a direction of installation of the core 304 and the daylighting screen 302 with respect to the core 304 can be easily determined with the mark 5 being provided on the daylighting member 300 as a marker.

In a case where the rolling screen 301 according to the present embodiment is used, the outdoor natural light (sunlight) travels efficiently indoors and the person in the room can feel the brightness up to the rear side of the room, without feeling dazzled. Furthermore, a change in a radiation position is suppressed that accompanies a change in an altitude of the Sun.

Furthermore, as the rolling screen according to the embodiment of the present invention, in addition to the constitution of the rolling screen 301 described above, it is also possible that a constitution, although its illustration is omitted, is made to be employed in which a functional film, for example, such as a light diffusion film for diffusing light that is directed towards the glare area G, or a thermal insulation film that has optical transparency for insulating radiant heat of natural light (sunlight), is positioned on the second surface 2b side of the first base 2.

Tenth Embodiment (Blind)

Figure 35:
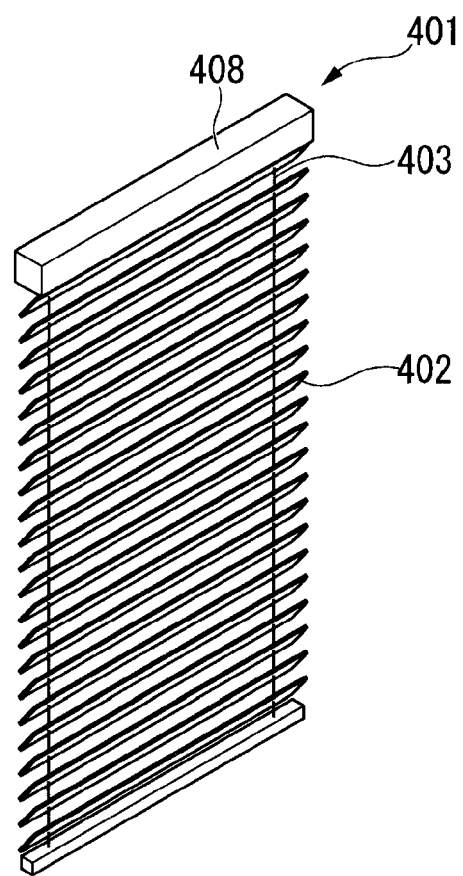
FIG. 35 is a perspective diagram illustrating a schematic constitution of a blind according to a tenth embodiment.

Next, according to a tenth embodiment, a blind (daylighting device) 401 that is illustrated in FIG. 35 is described.

Figure 36A:
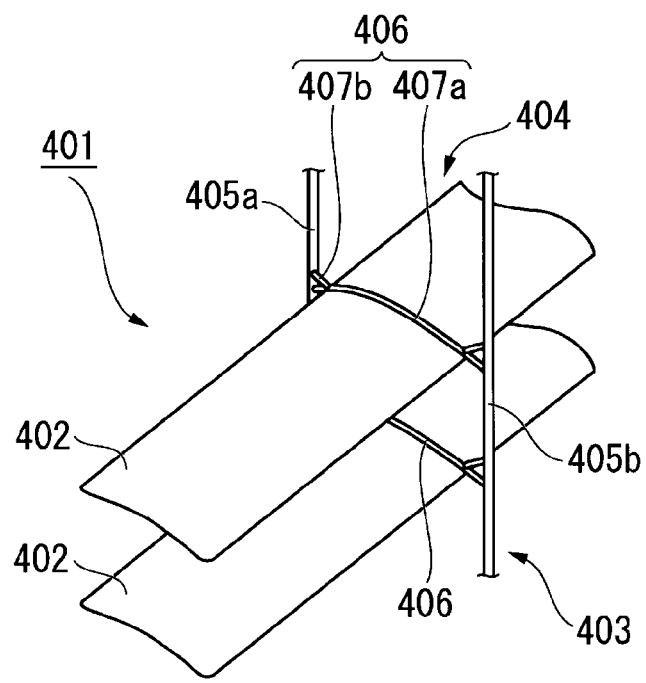
FIG. 36A is a first perspective diagram illustrating the schematic constitution of the blind.
Figure 36B:
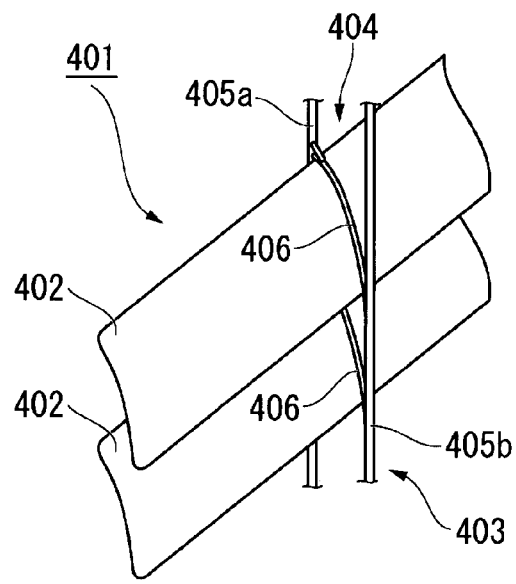
FIG. 36B is a second perspective diagram illustrating the schematic constitution of the blind.
Figure 37A:
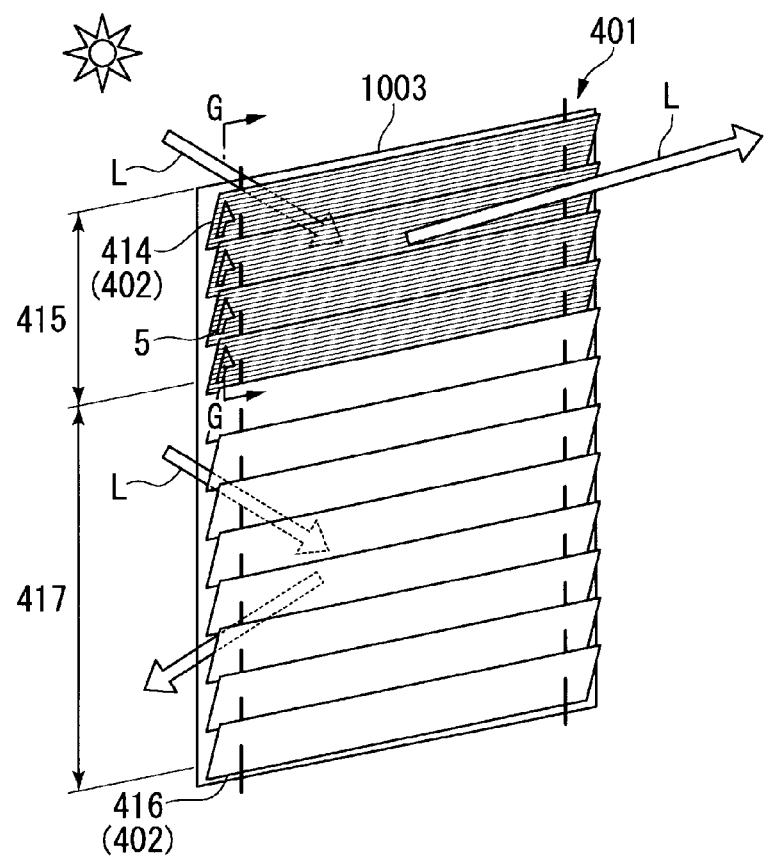
FIG. 37A is a first diagram illustrating a schematic constitution of a daylighting slat that is included in the blind.
Figure 37B:
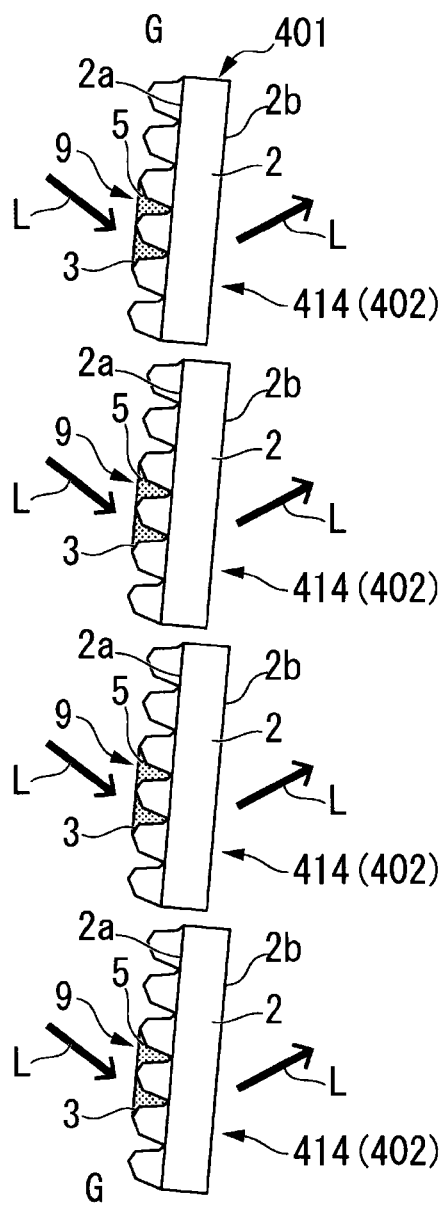
FIG. 37B is a second diagram illustrating the schematic constitution of the daylighting slat that is included in the blind.

FIG. 35 is a perspective diagram illustrating a schematic constitution of the blind 401. FIGS. 36A and 36B are perspective diagrams each illustrating a schematic constitution of the blind 401. FIG. 36A illustrates an opened state of the blind 401. FIG. 36B illustrates a closed state of the blind 401. FIG. 37A is a perspective diagram illustrating a schematic constitution of a daylighting slat 402 that is included in the blind 401. FIG. 37B is a cross-sectional diagram illustrating a schematic constitution of the daylighting slat 402 that is included in the blind 401.

Furthermore, a description of the same component as that of the daylighting film 1 described above will be hereinafter omitted below, and thus such components will be given the same reference numerals in the drawings.

The blind 401, as illustrated in FIGS. 35, 36A, and 36B, includes multiple slats 402 that are arranged in a row at a prescribed spaced interval, a tilting mechanism (a support mechanism or an installation-occurring object) 403 that supports the multiple slats 402 in such a manner that the multiple blind slabs are freely tilted together, and an accommodation mechanism 408 that accommodates the multiple slats 402 that are connected to one another with the tilting mechanism (support mechanism) 403, in a state of sitting on top of one another, in such a manner that it is possible that the multiple slats 402 are held and released.

As illustrated in FIGS. 36A and 36B, the tilting mechanism 403 includes multiple ladder cords 404. The multiple ladder cords 404, although their illustrations are omitted, supports multiple slats 402, by being arranged in a row in the longitudinal direction of the slat 402. Specifically, the ladder cord 404 has a pair of perpendicular cords 405a and 405b that are arranged in parallel to each other, and multiple transverse cords 406 each of which is stretched between the perpendicular cords 405a and 405b and which are arranged in parallel at equally spaced intervals in the longitudinal direction of the perpendicular cords 405a and 405b. Furthermore, the ladder cord 404 holds the slat 402 between the perpendicular cords 405a and 405b while interposing the slat 402 with a pair of holding cords 407a and 407b that constitute the transverse cord 406.

The tilting mechanism 403, although its illustration is omitted, includes an operation mechanism that performs an operation of moving the pair of perpendicular cords 405a and 405b in a manner that faces each other, in the vertical direction. Then, with the tilting mechanism 403, by performing the operation of moving the pair of perpendicular cords 405a and 405b with the operation mechanism, it is possible that the multiple slats 402 are tilted while synchronizing the multiple slats 402 with one another.

As illustrated in FIG. 37A, the multiple slats 402 that are provided in the blind 401 have a daylighting unit 415 that is constituted by multiple daylighting slats 414 that have daylighting properties, and a light shielding unit 417 that is positioned under the daylighting unit 415 and that is constituted by multiple light shielding slats 416 which have light shielding properties. Moreover, in a case where the daylighting slat 414 and the light shielding slat 416 are particularly not distinguished for each other, the daylighting slat 414 and the light shielding slat 416 will be described below collectively as the slat 402.

Each of the multiple slats 402, as illustrated in FIG. 37B, is a daylighting member that includes the first base 2 in the shape of a long plate that has optical transparency, multiple daylighting units 3 that are formed in a row in parallel to the first surface 2a of the first base 2, and multiple opening spaces 9 each of which is formed between each of the multiple daylighting units 3.

At this point, as each slat 402, basically the same structure as that of the daylighting film 1 according to the first embodiment is employed, but the same structure as that of the daylighting film according to any one of the embodiments, which is described above, can be employed. However, the shape of the first base 2 is different from that of the daylighting film or the daylighting screen according to each of the embodiments, which is described above. Furthermore, a resin material that does not have adhesive properties is used for a filling material that constitutes the mark 5.

In a state of being suspended from the upper portion of the window glass pane 1003, the blind 401 that has the constitution described above is used in a state of facing the internal surface of the window glass pane 1003. At this time, the slat 402 (daylighting slat 412) is positioned in such a manner that the direction in which the multiple daylighting units 3 are in a row with respect to the window glass pane 1003 is consistent with the perpendicular direction (vertical direction) of the window glass pane 1003. In other words, the slat 402 is positioned in such a manner that an extension direction of the multiple daylighting units 3 with respect to the window glass pane 1003 is consistent with the transverse direction (horizontal direction) of the window glass pane 1003.

As illustrated in FIGS. 37A and 37B, the blind 401 facing the internal surface of the window glass pane 1003 radiates the light L that is incident indoors through the window glass pane 1003, towards the indoor ceiling while changing the propagation direction of the light with the multiple daylighting units 3 of each daylighting slat 414 of the daylighting unit 415. Furthermore, because the light L that is directed towards the ceiling the light L is reflected off the ceiling and illuminates the inside of a room, the reflected light substitutes for the illumination light. Therefore, in a case where the blind 401 is used, an energy saving effect can be expected in which lighting fixtures in a building consumes less energy during the daytime.

On the other hand, the light shielding unit 417, as illustrated in FIG. 37A, shields the light L that is incident indoors from the obliquely upward direction with respect to one surface of each light shielding slat 416, with each light shielding slat 416. Because the light shielding unit 417 is positioned under the daylighting unit 415, it is possible that, among the lights L that are incident indoors through the window glass pane 1003, a light that is directed towards the glare area or a light that is directed towards the floor is shielded.

Furthermore, with the blind 401, by tilting the multiple slats 402, an angle of the light L that is directed towards the ceiling can be adjusted. Additionally, the light that is incident from the multiple slats 402 can be adjusted.

Figure 38A:
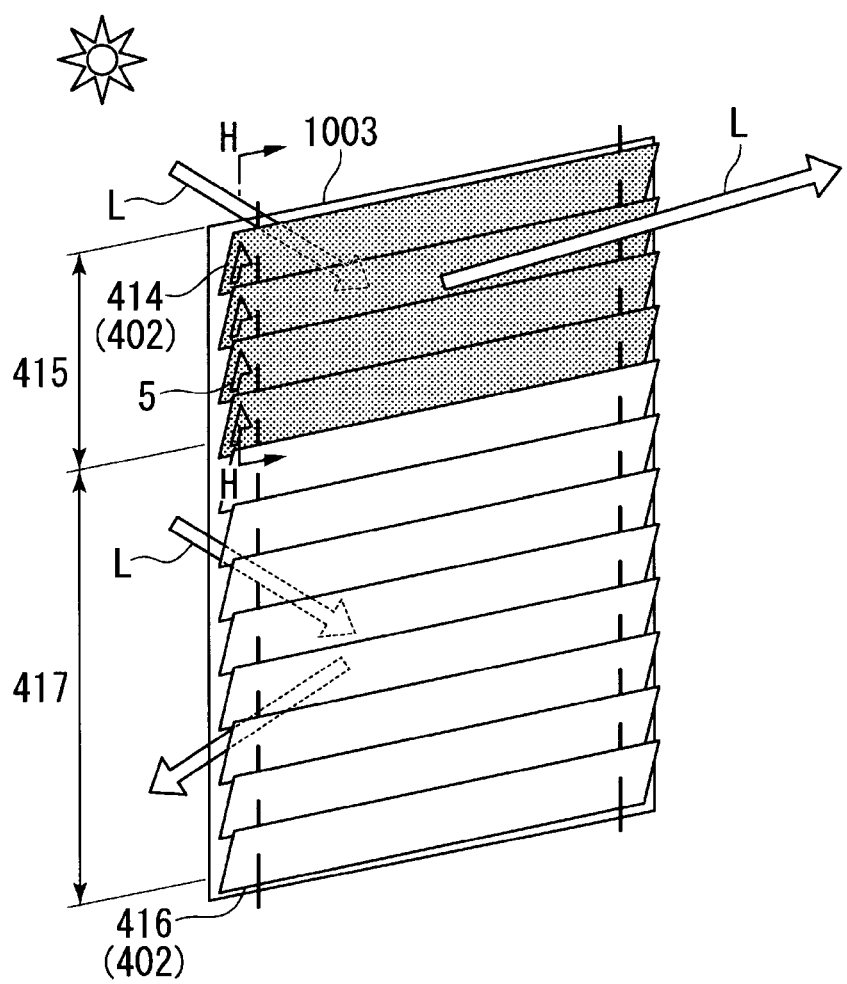
FIG. 38A is a first diagram illustrating a state where a direction of the daylighting slat that is included in the blind is reversed.
Figure 38B:
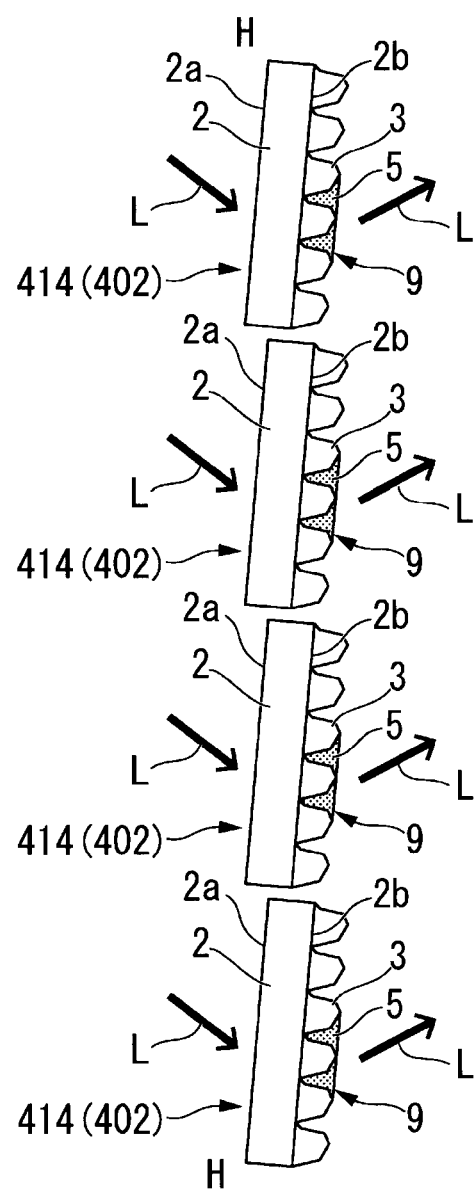
FIG. 38B is a second diagram illustrating the state where the direction of the daylighting slat that is included in the blind is reversed.

Furthermore, as illustrated in FIGS. 38A and 38B, with the blind 401, even in a case where a direction of the slat 402 is reversed by 180°, in the same manner as before the direction of the slat 402 is reversed, the light L that is incident indoors through the window glass pane can be radiated towards the indoor ceiling while changing the propagation direction of the light with the multiple daylighting units 3.

Figure 39:
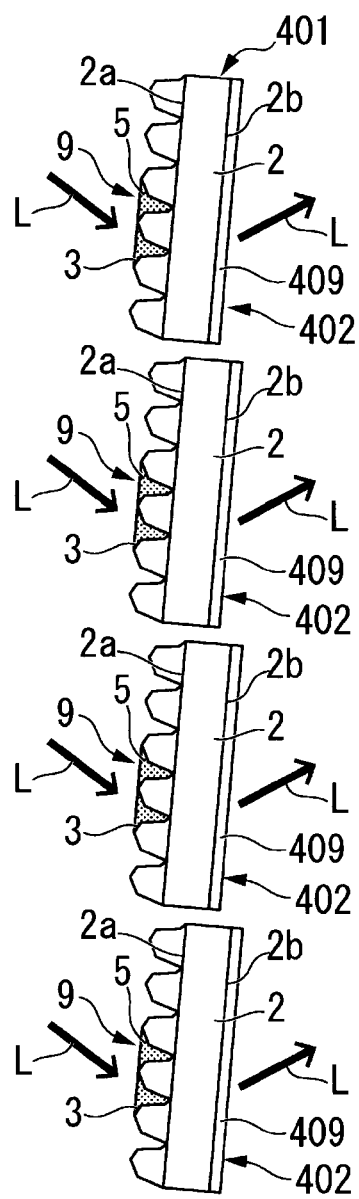
FIG. 39 is a diagram illustrating a modification example of the daylighting slat.

Furthermore, as illustrated as FIG. 39, a slat member 409 that has scattering properties may be provided on a second surface 2b side of the first base 2 in the shape of a long plate.

As described above, the slat 402 of the blind 401 according to the present embodiment has the same constitution as that of the daylighting film according to any one of the embodiments, which is described. For this reason, in the manufacturing stage, when the multiple slats 402 are installed on the tilting mechanism 403, a manufacture can easily determine a direction of installation of the slat 402 with respect to the tilting mechanism 403 with the mark 5 being provided on the slat 402 as a marker.

In a case where the blind 401 according to the present embodiment is used, the outdoor natural light (sunlight) is allowed to efficiently travel indoors and the person in the room can feel the brightness in the rear side of the room without feeling dazzled. Furthermore, it is possible that the change in the radiation position is suppressed that accompanies the change the altitude of the Sun.

Moreover, the present invention is not necessarily limited to the constitution of the blind 401 according to the tenth embodiment, which is described above, and it is possible that various changes are made within a range that does not depart the gist of the present invention.

For example, as the blind according to the embodiment of the present invention, in addition to the constitution of the blind 401 described above, it is also possible that a constitution, although its illustration is omitted, is made to be employed in which a functional film (functional member), for example, such as a light diffusion film (light diffusion member) for diffusing light that is directed towards the glare area G, or a thermal insulation film (insulation member) that has optical transparency for insulating radiant heat of natural light (sunlight), is positioned on the second surface 2b side of the first base 2.

Furthermore, as the blind according to the present invention, it is also possible that a combination the slat 402 and a light shielding slat with light shielding properties is used. In this case, a constitution is made to be employed in which a daylighting unit that is constituted by the multiple slats 402 and a light shielding unit that is positioned under the daylighting unit and is constituted by the multiple light shielding slats are included. With this constitution, the light that is incident indoors through the window glass pane can be radiated towards the indoor ceiling by the multiple slats 402 that constitutes the daylighting unit, and the light that is directed towards the glare area by the multiple light shielding slats that constitutes the light shielding unit can be shielded.

Eleventh Embodiment (Fixed-Type Daylighting Film)

Figure 40:
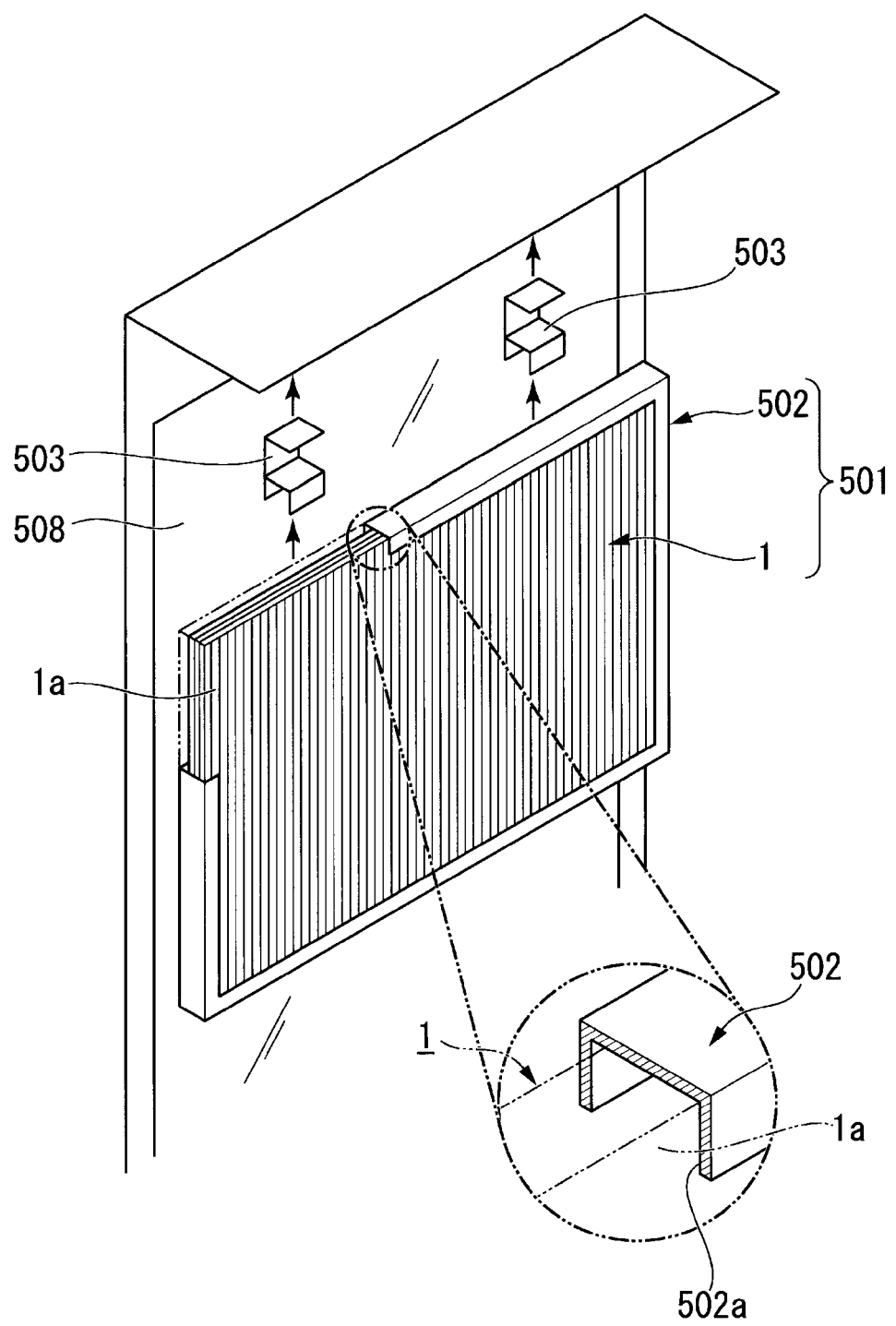
FIG. 40 is a perspective diagram illustrating an example of installation of a fixed-type daylighting film according to an eleventh embodiment.

Next, according to an eleventh embodiment of the present invention, for example, a fixed-type daylighting film (daylighting device) 501 that is illustrated in FIG. 40 is described. FIG. 40 is a perspective diagram illustrating an example of installation of the fixed-type daylighting film 501. Moreover, a description of the same component as that of the daylighting film 1 described above will be hereinafter omitted below, and thus such components will be given the same reference numerals in the drawings.

As illustrated in FIG. 40, the fixed-type daylighting film 501 is constituted to include the daylighting film 1 and a frame (support member) 502. The frame 502 is made from a body in the shape of a frame that surrounds a peripheral portion 1a of the daylighting film 1. It is possible that the shape of the cross section of the frame 502 is made to be a concavity shape, and that the peripheral portion 1a of the daylighting film 1 is inserted into a concavity portion 502a. By interposing the peripheral portion 1a of the daylighting film 1 from the width direction, the frame 502 can support the entire frame.

The fixed-type daylighting film 501 with this constitution, for example, is used in a state of being attached to a fixed window 508 through window attachment fittings 503. The window attachment fittings 503, for example, are constituted in such a manner that the frame 502 is assembled into the frame 502.

Moreover, the fixed-type daylighting film 501 may be used independently, but may be installed in a state of being combined with the blind 401 described above.

Figure 41:
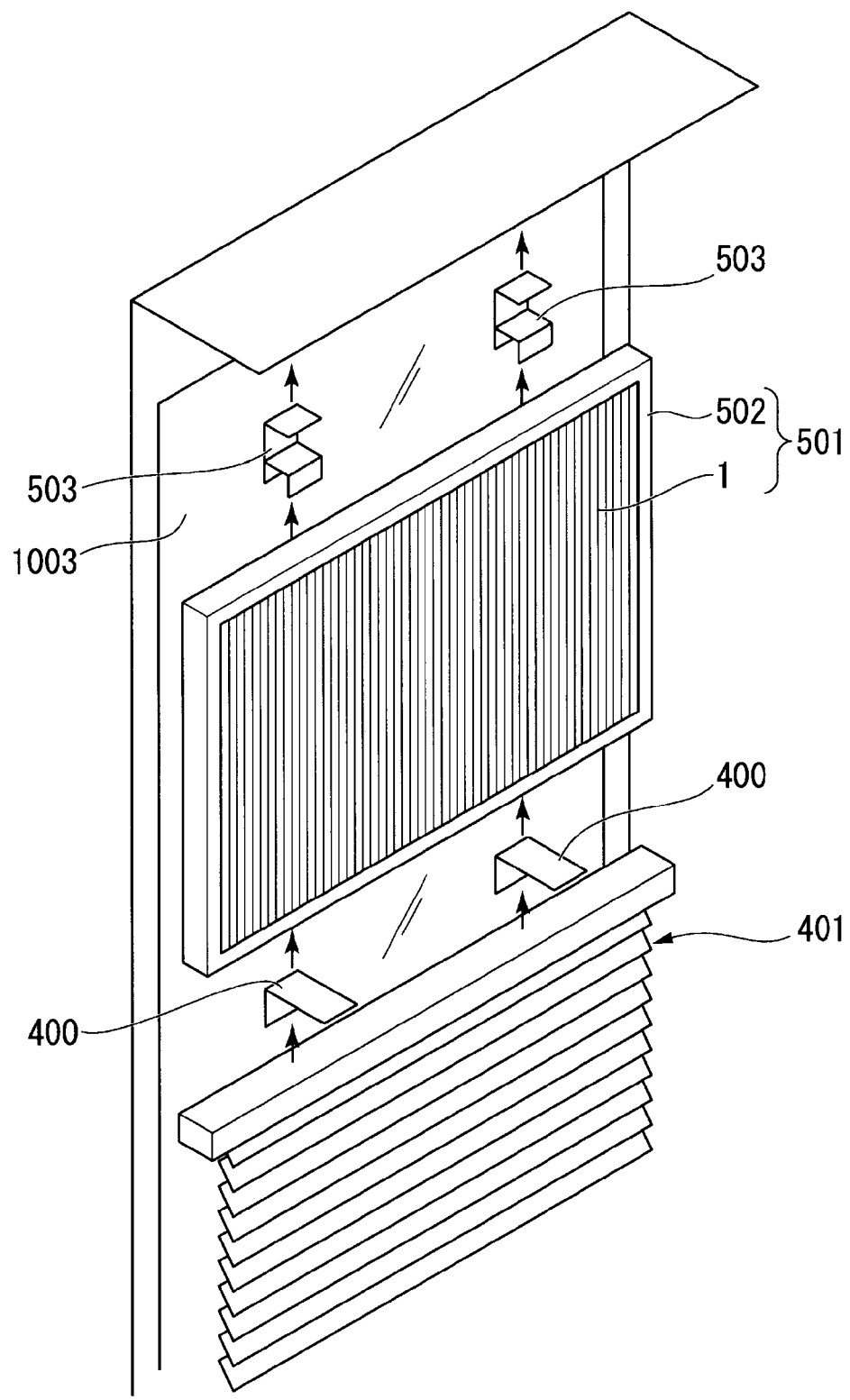
FIG. 41 is a diagram illustrating an installation example in which the fixed-type daylighting film and the blind are combined.

FIG. 41 is a diagram illustrating an installation example in which the fixed-type daylighting film 501 and the blind 401 (FIG. 35) are combined.

As illustrated in FIG. 41, each of the fixed-type daylighting film 501 and the blind 401 may be installed on one fixed window (window glass pane 1003). In this case, it is preferable that the fixed-type daylighting film 501 and the blind 401 are installed through dedicated window attachment fittings 503 and 400, respectively.

Twelfth Embodiment (Bamboo Blind)

Figure 42:
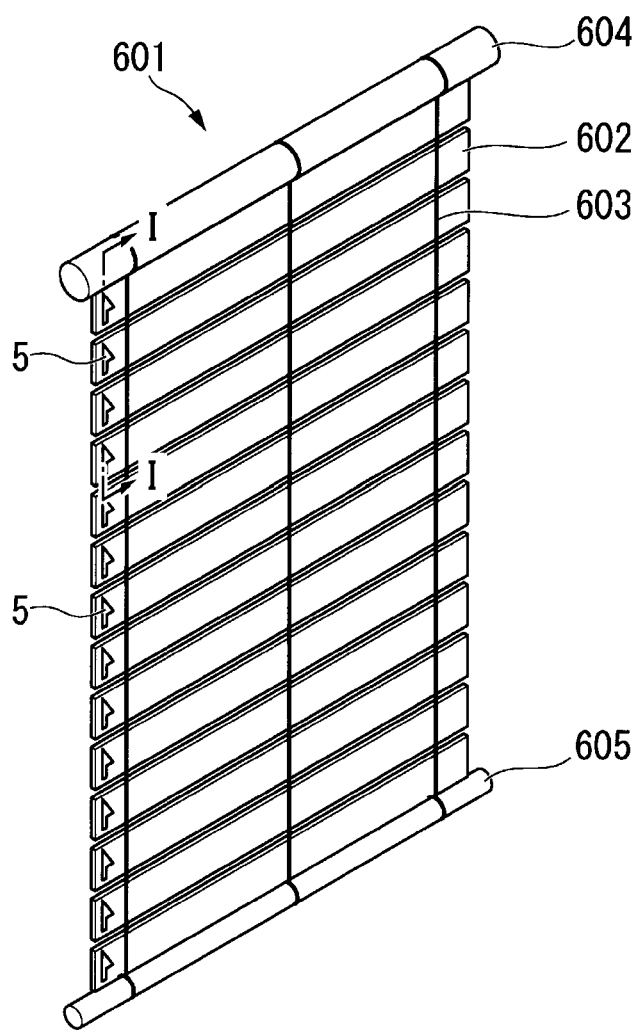
FIG. 42 is a perspective diagram illustrating a schematic constitution of a bamboo blind according to a twelfth embodiment.

Next, according to a twelfth embodiment of the present invention, for example, a bamboo blind (daylighting device) 601 that is illustrated in FIG. 42 is described. Furthermore, a description of the same component as that of the daylighting film 1 described above will be hereinafter omitted below, and thus such components will be given the same reference numerals in the drawings.

Figure 43:
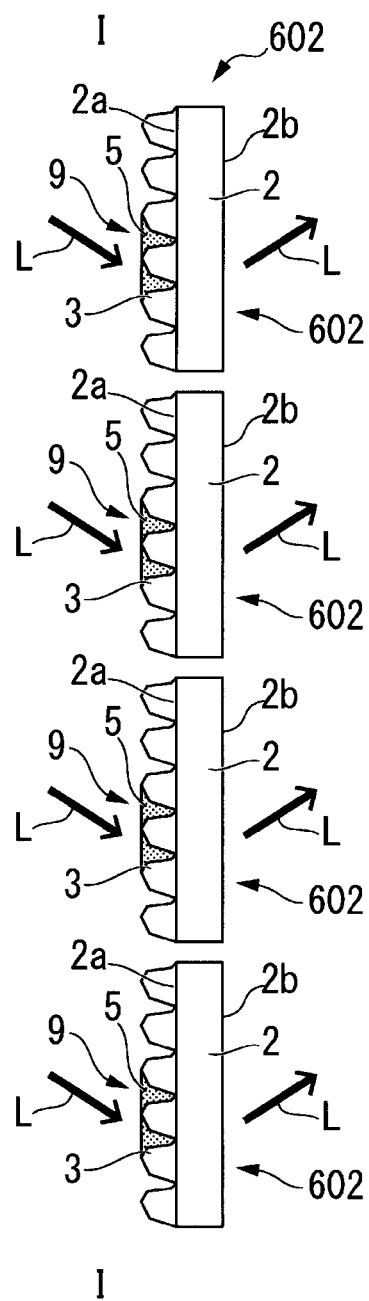
FIG. 43 is a diagram illustrating a schematic constitution of a daylighting bamboo slat that is included in the bamboo blind, and is a cross-sectional diagram taken along line I-I in FIG. 42.
Figure 44:
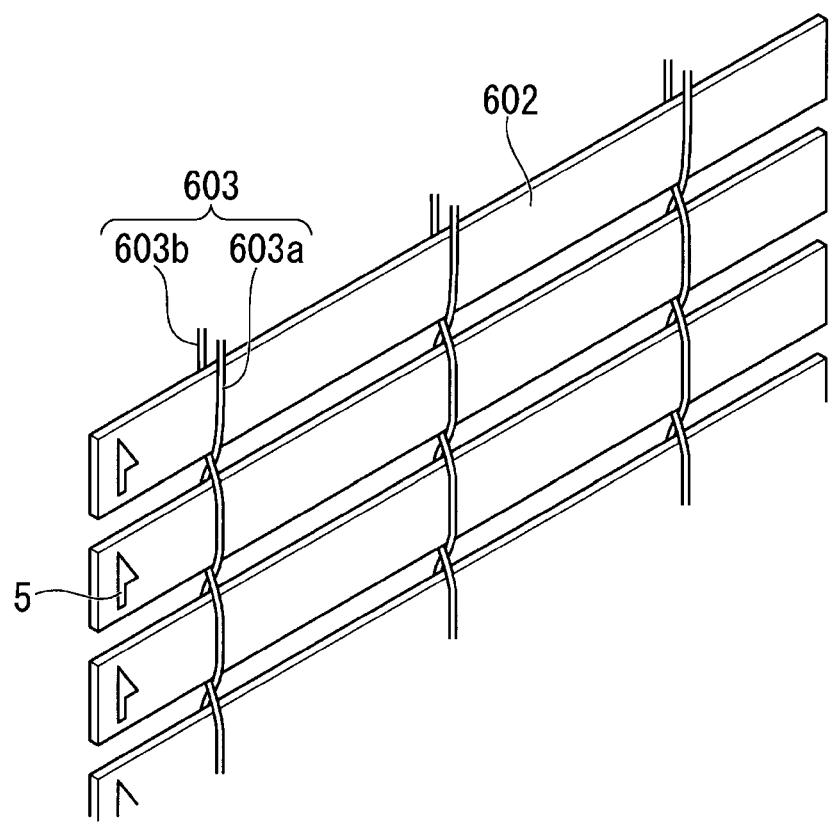
FIG. 44 is a diagram illustrating a state in which multiple daylighting bamboo slats are bound with a binding material.

FIG. 42 is a perspective diagram illustrating a schematic constitution of the bamboo blind 601. FIG. 43 is a diagram illustrating a schematic constitution of a daylighting bamboo slat 602 that is included in the bamboo blind 601, and is a cross-sectional diagram taken along line I-I in FIG. 42. FIG. 44 is a diagram illustrating a state in which multiple daylighting bamboo slats 602 are bound with a binding material 603.

As illustrated in FIG. 42, the bamboo blind 601 is constituted to include the multiple daylighting bamboo slats 602 that are arranged in a row at a prescribed spaced interval, and a binding material 603 that binds the multiple daylighting bamboo slats 602 in a state of being in a row in one direction.

Each of the multiple daylighting bamboo slats 602, as illustrated in FIG. 43, is a daylighting member that includes the first base 2 in the shape of a long plate that has optical transparency, multiple daylighting units 3 that are formed in a row in parallel to the first surface 2a of the first base 2, and multiple opening spaces 9 each of which is formed between each of the multiple daylighting units 3.

At this point, each daylighting bamboo slat 602 has basically the same structure as that of the daylighting film 1 according to the first embodiment, but the same structure as that of the daylighting film according to any one of the embodiments, which is described above, can be employed. However, the shape of the first base 2 is different from that of the daylighting film or the daylighting screen according to each of the embodiments, which is described above. Furthermore, the adhesive portion 4 is omitted, and a resin material that does not have adhesive properties is used for a filling material that constitutes the mark 5.

The binding material 603 holds each of the multiple daylighting bamboo slats 602 in place in a state of being tilt at a prescribed angle. According to the present embodiment, as illustrated in FIG. 44, as the binding material 603, for example, at least two warp threads 603a and 603b are employed. The binding material 603 functions as a member that binds the multiple daylighting bamboo slats 602 in such a manner that these warp threads 603a and 603b are stretched to straddle the multiple daylighting bamboo slats 602 in the width direction.

Referring back to FIG. 42, in the bamboo blind 601, an upper sash bar 604 is provided on the uppermost end of the multiple daylighting bamboo slats 602 that are installed in parallel to one another, and a lower sash bar 605 is provided on the lowermost end. The bamboo blind 601 according to the present embodiment may be a fixed-type that is used as is in a state of being suspended with respect to a fixed window, and for example, may be a winding type that is able to be wound from the lower sash bar 605 side.

[Illumination and Lighting-Control System]

Figure 45:
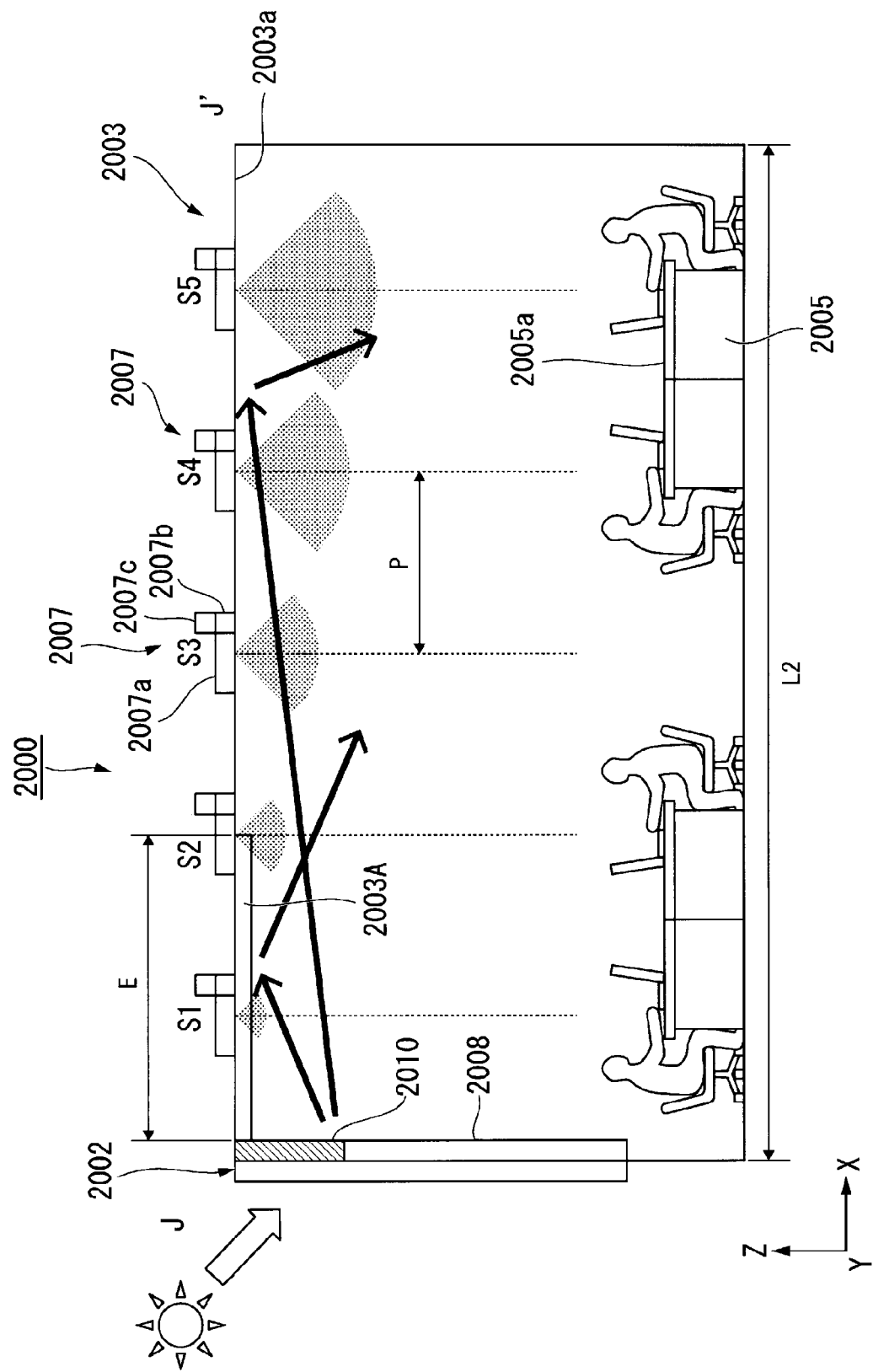
FIG. 45 is a cross-sectional diagram taken along line J-J' in a room model that is equipped with a daylighting device and an illumination and lighting-control system.
Figure 46:
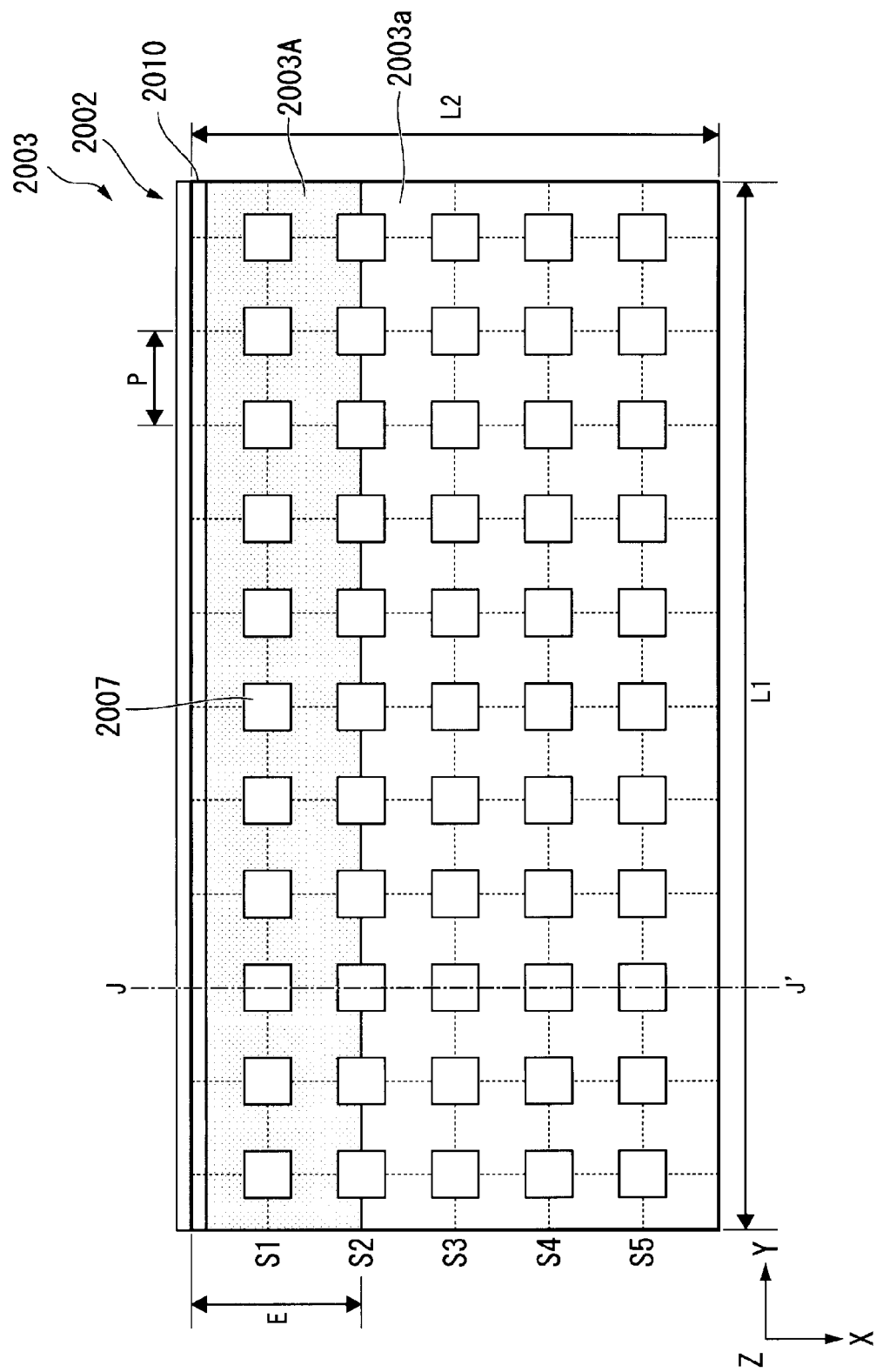
FIG. 46 is a plan diagram illustrating a ceiling of the room model.

FIG. 45 is a cross-sectional diagram illustrating taken along line J-J' in a room model 2000 that is equipped with a daylighting device and an illumination and lighting-control system. FIG. 46 is a plan diagram illustrating a ceiling of the room model 2000.

According to the present invention, a ceiling material that constitutes a ceiling 2003a of a room 2003 into which the outdoor light is introduced may have high light reflectivity. As illustrated in FIGS. 45 and 46, as the ceiling material with light reflection, a light reflective ceiling material 2003A is installed on the ceiling 2003a of the room 2003. The light reflective ceiling material 2003A serves the purpose of promoting the introduction of the outdoor light from a daylighting device 2010 being installed on a window 2002 into the rear side of the room, and thus, is installed on the ceiling 2003a on the widow side. Specifically, the light reflective ceiling material 2003A is installed on a prescribed area E (area at a distance of approximately 3 m away from the window 2002) of the ceiling 2003a.

The light reflective ceiling material 2003A, as described above, functions to efficiently introduce the outdoor light, which is incident indoors through the window 2002 on which the daylighting device 2010 (daylighting device according to any one of the embodiments, which is described above) according to the present invention is installed, all the way up to the rear side of the room. The outdoor light that is directed towards the indoor ceiling 2003a from the daylighting device 2010 is reflected off the light reflective ceiling material 2003A, thereby changing its traveling direction, and illuminates a desk upper-surface 2005a of a desk 2005 that is placed on the rear side of the room. Thus, an effect of brightening the desk upper-surface 2005a is achieved.

The light reflective ceiling material 2003A may have diffusivity and reflectivity and may have specular reflectivity. However, it is preferable that the light reflective ceiling material 2003A has properties that result from suitably combining both of the diffusivity and reflectivity and the specular reflectivity, in order to obtain at the same time an effect of brightening the desk upper-surface 2005a of the desk 2005 that is placed on the rear side of the room and an effect of suppressing the glare light with which the person in the room feels uncomfortable.

Much of the light that is introduced indoors by the daylighting device 2010 according to the present invention is directed towards the ceiling in the vicinity of the window 2002, but in most cases, an amount of light is sufficient in the vicinity of the window 2002. For this reason, by the light reflective ceiling material 2003A described above together, the light that is incident on the ceiling (area E) in the vicinity of the window can be distributed to the rear side of the room where an amount of light is smaller than that on the window side.

The light reflective ceiling material 2003A, for example, may be manufactured by performing an embossing process, which creates concavity and convexity portions that are on the order of several tens microns in size, on a metal plate, such as aluminum, or by performing vapor deposition of a metal film, such as aluminum, on a surface of a resin substrate on which the same concavity and convexity portions are formed. Alternatively, the concavity and convexity portions that are formed with the emboss processing may be formed in such a manner that a curved surface appears more frequently.

Additionally, by suitably changing the embossing shape that is formed on the light reflective ceiling material 2003A, light distribution characteristics of light or distribution of light can be controlled. For example, in a case where the embossing processing is performed in such a manner that the shape of a stripe that extends to the rear side of the room is created, the light that reflects off the light reflective ceiling material 2003A spreads in the vertical direction of the window 2002 (direction that orthogonally intersects the longitudinal direction of the convexity and convexity portions). In a case where the size or direction of the window 2002 of the room 2003 is limited, using the properties described above, the light can be diffused in the horizontal direction by the light reflective ceiling material 2003A and can be reflected towards the rear side direction of the room.

The daylighting device 2010 according to the present invention is used as one portion of the illumination and light-control system of the room 2003. The illumination and lighting-control system, for example, is constituted from constituent members of the entire room, which include the daylighting device 2010, multiple indoor illumination devices 2007, a solar radiation adjustment device 2008 that is installed on the window, a control system that controls these, and the light reflective ceiling material 2003A that is installed on the ceiling 2003a.

The daylighting device 2010 is installed on the upper side of window 2002 of the room 2003, and the solar radiation adjustment device 2008 is installed on the lower side thereof. At this point, as the solar radiation adjustment device 2008, a blind is installed, but no limitation to this is imposed.

In the room 2003, the multiple indoor illumination devices 2007 are arranged in the shape of a lattice in the horizontal direction (Y direction) of the window 2002 and in the rear side direction (X direction) of the room. The multiple indoor illumination devices 2007 constitute an entire illumination system of the room 2003 in conjunction with the daylighting device 2010.

FIGS. 45 and 46 each illustrate the ceiling 2003a of an office. For example, a length L1 of the office, which is in the horizontal direction (Y direction) of the window 2002, is 18 m, and a length L2 of the office, which is in the rear side direction (X direction) of the room 2003, is 9 m. At this point, the indoor illumination devices 2007 are arranged at spaced intervals P of 1.8 m in the shape of a lattice in each of the perpendicular direction (Y direction) of the ceiling 2003a and the rear side direction (X direction).

More specifically, 50 indoor illumination devices 2007 are arranged in 10 rows (Y direction) and 5 columns (X direction).

The indoor illumination device 2007 is constituted to include an indoor illumination tool 2007a, a brightness detection unit 2007b, and a control unit 2007c. The brightness detection unit 2007b and the control unit 2007c are constituted to be combined integrally with the indoor illumination tool 2007a.

The indoor illumination device 2007 may include multiple indoor illumination tool 2007a and multiple brightness detection units 2007b. However, one brightness detection unit 2007b is provided on each indoor illumination tool 2007a. The brightness detection unit 2007b receives reflection light that reflects off a radiation-occurring surface which is illuminated by the indoor illumination tool 2007a, and detects illuminance on the radiation-occurring surface. At this point, the brightness detection unit 200b detects illumination on the desk upper-surface 2005a of the desk 2005 that is placed indoors.

The control units 2007c that are provided on the indoor illumination devices 2007, respectively, are connected to each other. With the control unit 2007c that is connected to itself, each indoor illumination device 2007 performs feedback control that adjusts an optical output of a LED lamp of each of the indoor illumination tool 2007a, in such a manner that the illuminance on the desk upper-surface 2005a that each brightness detection unit 2007b detects reaches a fixed target illuminance L0 (for example, average illuminance: 750 lx).

Figure 47:
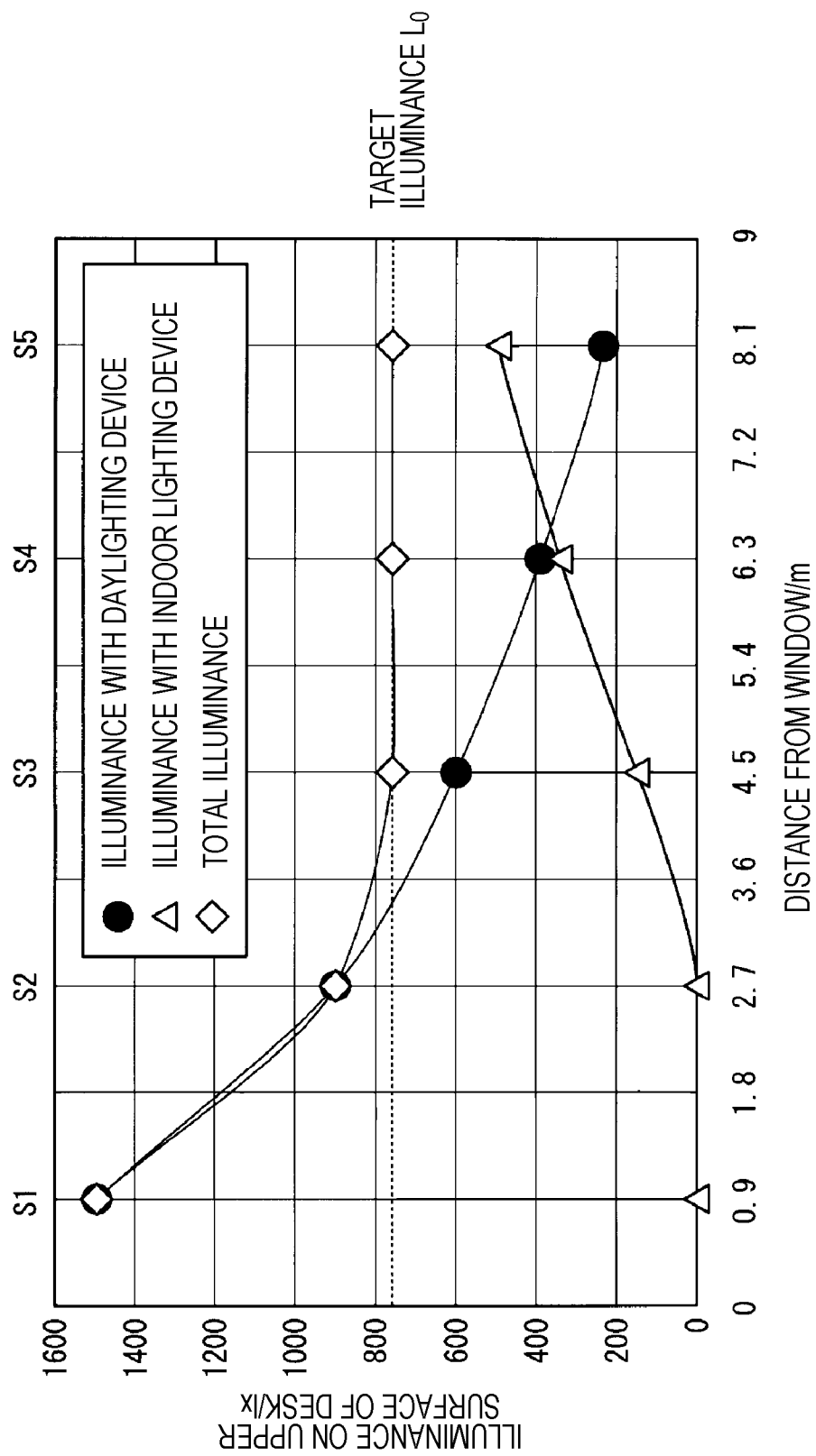
FIG. 47 is a graph illustrating a relationship between illuminance from light (natural light) that is directed indoors by the daylighting device and illuminance (illumination and lighting-control system) that is produced by an indoor illumination device.

FIG. 47 is a graph illustrating a relationship between illuminance from the light (natural light) that is guided indoors by the daylighting device and illuminance (illumination and lighting-control system) that is produced by the indoor illumination device. In FIG. 47, the perpendicular axis indicates illuminance (lx) on the desk upper-surface, and the transverse axis indicates a distance (m) from the window. Furthermore, a dashed line in the drawing indicates indoor target illuminance. (●: illuminance that is produced by the daylighting device, ∆: illuminance that is produced by the indoor illumination device, and ◇: total illuminance)

As illustrated in FIG. 47, when it comes to illuminance on the desk upper-surface that results from the light that is guided indoors by the daylighting device 2010, the closer the desk is to the window, the more the illuminance increases, and the more distant the desk is from the window, the more the illuminance decreases. In the room in which the daylighting device 2010 according to the present invention is installed, distribution of illuminance in the rear side direction of the room occurs with natural daylighting from the window during the daytime. Accordingly, the daylighting device 2010 according to the present invention is used together with the indoor illumination device 2007 that adjusts the indoor illuminance distribution. With the brightness detection unit 2007b, the indoor illumination device 2007 that is installed on the indoor ceiling detects average illuminance below the indoor illumination device 2007 itself, and is controlled for lighting control and lights a lamp in such a manner that the illuminance on the desk upper-surface in the entire room is a fixed target illuminance L0. Therefore, the indoor illumination devices 2007 in S1 column and S2 column, which are installed in the vicinity of the window, light almost does not lamp, and the indoor illumination devices 2007 in S3 column, S4 column, and S5 column light lamps while increasing their outputs along the rear side direction of the room. As a result, the desk upper-surface of the room is illuminated by with a sum of the illuminance that is produced by the natural daylighting and the illuminance that is produced by the indoor illumination device 2007, 750 lx (recommended illuminance that is to be maintained in an office in accordance with "JIS Z9110: General Provisions for Illumination") that is desk upper-surface illuminance sufficient for all persons to work in the entire room can be realized.

As described above, the daylighting device 2010 and the illumination and light-control system (indoor illumination device 2007) are used together, and thus it is possible that light is delivered up to the rear side of the room and brightness of the room can be improved. As a result, the desk upper-surface illuminance enough for all persons to work in the entire room can be secured. Therefore, a bright light environment that is more stable is established without being influenced by a season or weather.

The suitable embodiments according to the present invention are described referring to the accompanying drawing, but it does not go without saying that the present invention is not limited to examples relating to the suitable embodiments. It is apparent to a person skilled in the art that various modification examples or amendment examples can be contemplated within the range of the technical ideas that are described in claims and these justifiably fall within the scope of claims. The constitutions of the embodiments may be suitably combined.

INDUSTRIAL APPLICABILITY

An aspect of the present invention can apply to a daylighting member, a method of manufacturing the daylighting member, a daylighting device, a method of installing the daylighting device, and the like.

REFERENCE SIGNS LIST 1, 10, 30, 33, 40, 50, 60, 70, 90 DAYLIGHTING FILM (DAYLIGHTING MEMBER)
2a SURFACE
2 FIRST BASE
2a FIRST SURFACE
2b SECOND SURFACE
3 DAYLIGHTING UNIT, FIRST DAYLIGHTING UNIT
3a, 11a, 12a, 82a SURFACE
5, 14, 31, 32, 41, 51, 66, 71, 83, 84, 91, 92 MARK (INDEX)
8 WINDOW GLASS PANE (INSTALLATION-OCCURRING OBJECT)
9 OPENING SPACE
F AREA
L, L1, L2 LIGHT
11 PROTECTION FILM (PROTECTION MEMBER)
17, 80 MOLD
17A, 80a SURFACE (MAIN SURFACE)
19 ULTRAVIOLET-CURABLE RESIN
21 OPTICAL ADHESIVE AGENT (FILLING MATERIAL)
22 THERMOPLASTIC RESIN
661 FIRST DAYLIGHTING UNIT
62 SECOND DAYLIGHTING UNIT
68, 97, 98 THIRD DAYLIGHTING UNIT
R1, R3 FIRST AREA
R2, R4 SECOND AREA
300 DAYLIGHTING MEMBER
301 ROLLING SCREEN (DAYLIGHTING DEVICE)
303 WINDING MECHANISM
304 CORE (SUPPORT MEMBER, INSTALLATION-OCCURRING OBJECT)
305 LOWER PIPE (SUPPORT MEMBER, INSTALLATION-OCCURRING OBJECT)
401 BLIND (DAYLIGHTING DEVICE)
403 TILTING MECHANISM (INSTALLATION-OCCURRING OBJECT)
408 ACCOMMODATION MECHANISM
502 FRAME (SUPPORT MEMBER)

The invention claimed is:

1. A daylighting member comprising:
a base that has optical transparency;
multiple first daylighting units that are defined on a first surface of the base, the multiple first daylighting units having optical transparency;
first opening spaces that are provided between the multiple first daylighting units; and
a filling material that fills some of the first opening spaces, the filling material defining an index that is provided on the first surface, and the index including information relating to the daylighting member, wherein
the filling material is provided only in the first opening spaces,
the filling material is not provided outside of the first opening spaces, and
the index is defined in at least a peripheral portion of the daylighting member.

2. The daylighting member according to claim 1, wherein the index indicates a direction of installation with respect to an installation-occurring object.

3. The daylighting member according to claim 1, wherein any one of a transparent resin, a colorized resin, and a scatter-containing resin is used as the filling material.

4. The daylighting member according to claim 1, further comprising:
multiple second daylighting units that have a different light control characteristic than the multiple first daylighting units, the multiple second daylighting units being provided on a second surface of the base; and
second opening spaces that are defined between the multiple second daylighting units.

5. The daylighting member according to claim 1, wherein a second surface that is opposite to the first surface of the base has light scattering properties.

6. A method of manufacturing the daylighting member according to claim 1, the method comprising:
supplying ultraviolet-curable resin on a mold that has a concavity and convexity shape on a main surface of the mold;

positioning a base on the mold through the ultraviolet-curable resin;

transferring the concavity and convexity shape to the ultraviolet-curable resin by radiating ultraviolet light from a side of the base and thus curing the ultraviolet-curable resin;

separating the mold from the ultraviolet-curable resin and forming the multiple first daylighting units in a convexity shape and the first opening spaces between the multiple first daylighting units on one surface of the base; and providing on the base a filling material that fills some of the first opening spaces, the filling material forming an index indicating a direction of installation with respect to an installation-occurring object.

7. The method of manufacturing the daylighting member according to claim 6, wherein the mold takes the concavity and convexity shape that corresponds to the multiple first daylighting units, and a concavity and convexity shape that corresponds to multiple second daylighting units that have a different light control characteristic than a flat surface that corresponds to the index, or than the multiple first daylighting units.

8. A method of manufacturing the daylighting member according to claim 1, the method comprising:

transferring a concavity and convexity shape of a mold to a thermoplastic resin and forming the multiple first daylighting units in a convexity shape and the first opening spaces between the multiple first daylighting units on one surface of the thermoplastic resin by performing thermal pressing on the thermoplastic resin using the mold that has the concavity and convexity shape on a main surface of the mold; and providing a filling material that fills some of the first opening spaces, the filling material forming an index indicating a direction of installation with respect to an installation-occurring object, to the thermoplastic resin.

9. A daylighting device comprising:

the daylighting member according to claim 1; and a support member that supports the daylighting member, wherein outdoor light is allowed to travel indoors through the daylighting member.

10. The daylighting device according to claim 9, further comprising:

a winding mechanism that winds the support member in such a manner that the support member is able to be taken out and put in.

11. The daylighting device according to claim 9, the daylighting device further comprising:

an accommodation mechanism that accommodates the support member in a state where the support member and the daylighting member are on top of one another in such a manner that the support member is able to be taken out and put in.

12. The daylighting member according to claim 1, wherein, when seen from a first direction perpendicular to the first surface of the base, a shape of the index is asymmetric along both a second direction and a third direction, the second direction being a longitudinal direction along which the multiple first daylighting units extend and the third direction being perpendicular to the second direction.

13. The daylighting member according to claim 1, wherein the daylighting member includes only the index and no other index.

14. The daylighting member according to claim 1, further comprising:

an adhesive portion provided only in a second some of the first opening spaces, the adhesive portion adhering the second some of the first opening spaces to an installation-occurring object.

15. The daylighting member according to claim 14, wherein the adhesive portion is made of an adhesive sheet.

* * * * *